(12) United States Patent
Walters et al.

(10) Patent No.: US 10,422,901 B2
(45) Date of Patent: Sep. 24, 2019

(54) ANALYZING GEOMECHANICAL PROPERTIES OF SUBTERRANEAN ROCK BASED ON SEISMIC DATA

(71) Applicant: Halliburton Energy Services, Inc., Houston, TX (US)

(72) Inventors: Harold Grayson Walters, Tomball, TX (US); Ronald Glen Dusterhoft, Katy, TX (US); Priyesh Ranjan, Houston, TX (US); Ken Smith, Houston, TX (US); Glenn Robert McColpin, Katy, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 354 days.

(21) Appl. No.: 15/308,997

(22) PCT Filed: Jun. 4, 2014

(86) PCT No.: PCT/US2014/040857
§ 371 (c)(1),
(2) Date: Nov. 4, 2016

(87) PCT Pub. No.: WO2015/187150
PCT Pub. Date: Dec. 10, 2015

(65) Prior Publication Data
US 2017/0075007 A1    Mar. 16, 2017

(51) Int. Cl.
*G01V 1/30* (2006.01)
*G01V 1/42* (2006.01)

(52) U.S. Cl.
CPC .............. *G01V 1/306* (2013.01); *G01V 1/303* (2013.01); *G01V 1/42* (2013.01); *G01V 2210/62* (2013.01)

(58) Field of Classification Search
CPC .......... G01V 1/306; G01V 1/303; G01V 1/42; G01V 2210/62
See application file for complete search history.

(56) References Cited

U.S. PATENT DOCUMENTS 5,242,025 A * 9/1993 Neill .................... E21B 7/04
                                                       175/26
5,363,094 A * 11/1994 Staron .................. E21B 47/123
                                                     166/254.2

(Continued)

FOREIGN PATENT DOCUMENTS

WO        2015187150 A1    12/2015

OTHER PUBLICATIONS

Dozier et al., Refracturing Works, Oilfield Review Autumn 2003 pp. 38-53 (Year: 2003).*

*Primary Examiner* — Regis J Betsch
(74) *Attorney, Agent, or Firm* — John W. Wustenberg; Parker Justiss, P.C.

(57) ABSTRACT

Some aspects of what is described here relate to seismic data analysis techniques. A seismic excitation is generated in a first directional wellbore section in a subterranean region. A seismic response associated with the seismic excitation is detected in a second directional wellbore section in the subterranean region. Seismic response data based on the seismic response are analyzed to identify geomechanical properties of subterranean rock in a fracture treatment target region in the subterranean region. In some cases, the geomechanical properties include pore pressure, stress, or mechanical properties.

24 Claims, 25 Drawing Sheets

(56) References Cited

U.S. PATENT DOCUMENTS

| | | | | |
|---|---|---|---|---|
| 5,481,501 A * | 1/1996 | Blakeslee | G01V 1/42 | 367/57 |
| 5,537,364 A * | 7/1996 | Howlett | G01V 1/46 | 181/106 |
| 6,065,538 A * | 5/2000 | Reimers | E21B 23/03 | 166/250.01 |
| 6,175,536 B1 * | 1/2001 | Khan | G01V 1/42 | 367/30 |
| 6,456,566 B1 * | 9/2002 | Aronstam | G01V 1/40 | 181/105 |
| 2002/0188407 A1 * | 12/2002 | Khan | G01V 1/40 | 702/16 |
| 2003/0125879 A1 * | 7/2003 | Khan | G01V 1/005 | 702/14 |
| 2004/0112594 A1 * | 6/2004 | Aronstam | G01V 1/133 | 166/249 |
| 2004/0112595 A1 * | 6/2004 | Bostick, III | E21B 21/08 | 166/250.01 |
| 2004/0129424 A1 * | 7/2004 | Hosie | E21B 21/08 | 166/332.8 |
| 2008/0159075 A1 * | 7/2008 | Underhill | G01V 1/42 | 367/50 |
| 2010/0262372 A1 * | 10/2010 | Le Calvez | G01V 1/288 | 702/14 |
| 2011/0174490 A1 * | 7/2011 | Taylor | E21B 28/00 | 166/308.1 |
| 2011/0182144 A1 * | 7/2011 | Gray | G01V 1/30 | 367/75 |
| 2011/0188347 A1 * | 8/2011 | Thiercelin | G01V 1/00 | 367/38 |
| 2011/0267921 A1 * | 11/2011 | Mortel | G01V 1/28 | 367/25 |
| 2012/0273191 A1 | 11/2012 | Schmidt et al. | | |
| 2012/0318500 A1 | 12/2012 | Urbancic et al. | | |
| 2013/0128693 A1 | 5/2013 | Geiser | | |
| 2013/0238304 A1 | 9/2013 | Glinsky | | |
| 2015/0268365 A1 * | 9/2015 | Djikpesse | G01V 1/42 | 702/14 |

* cited by examiner

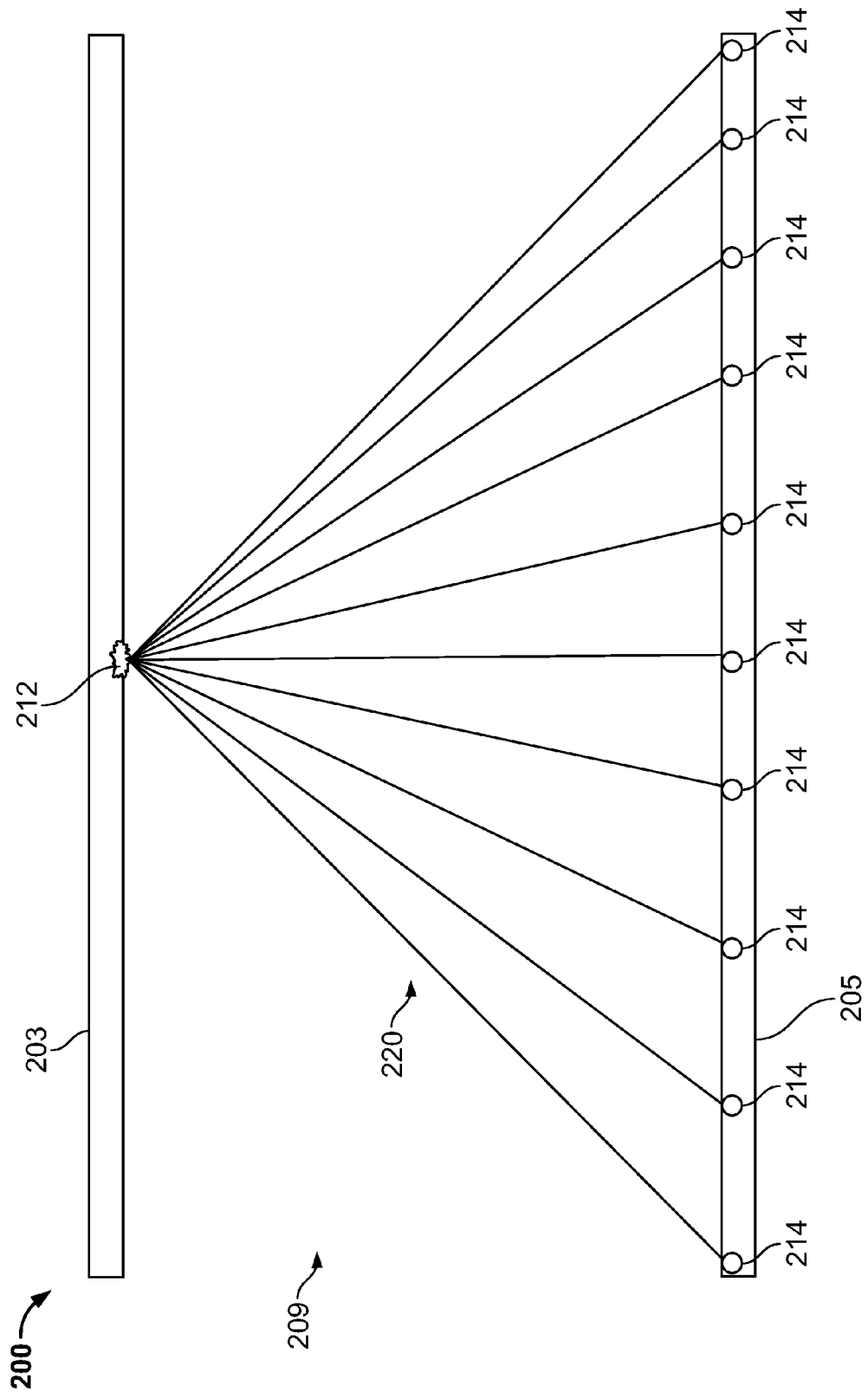

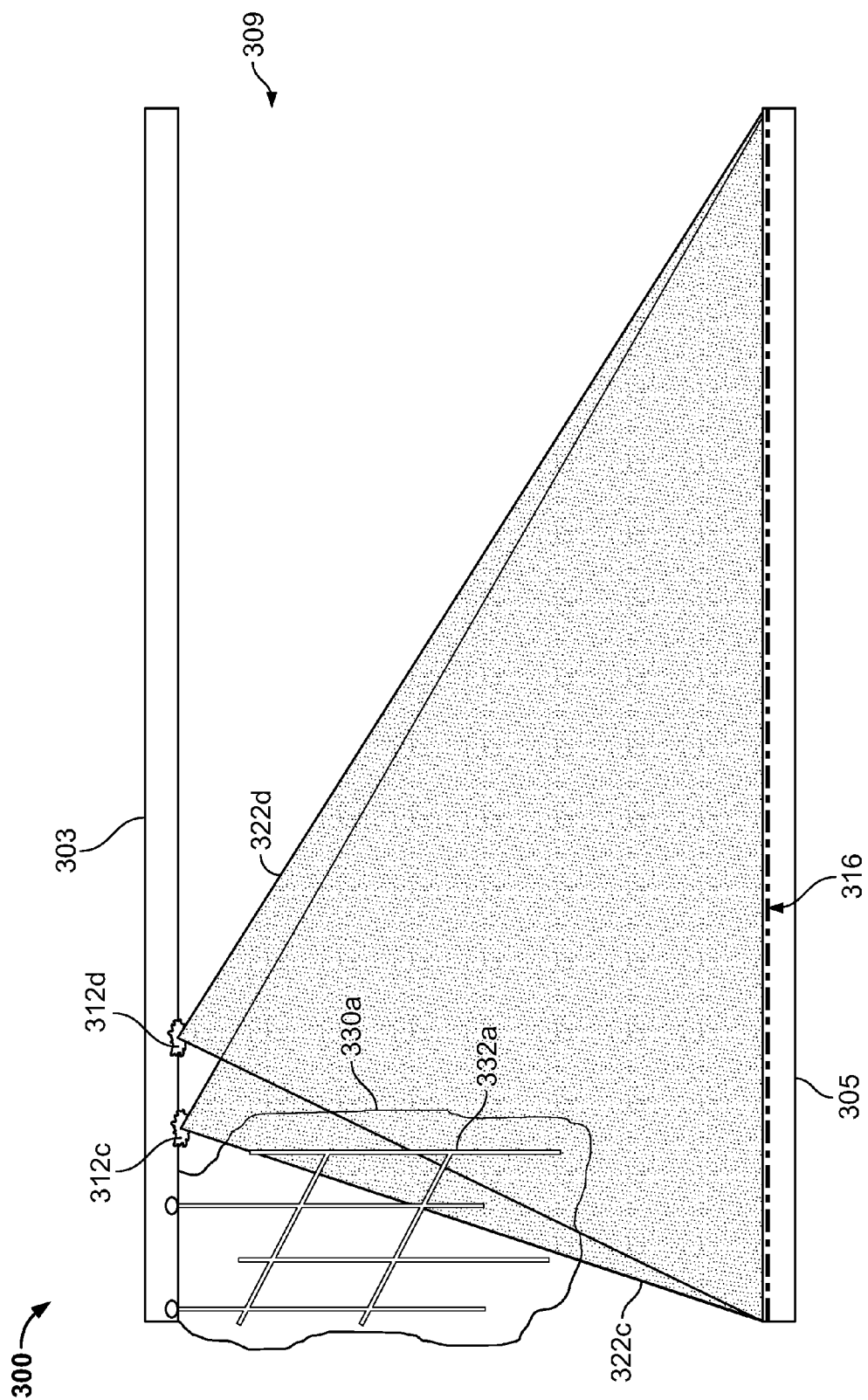

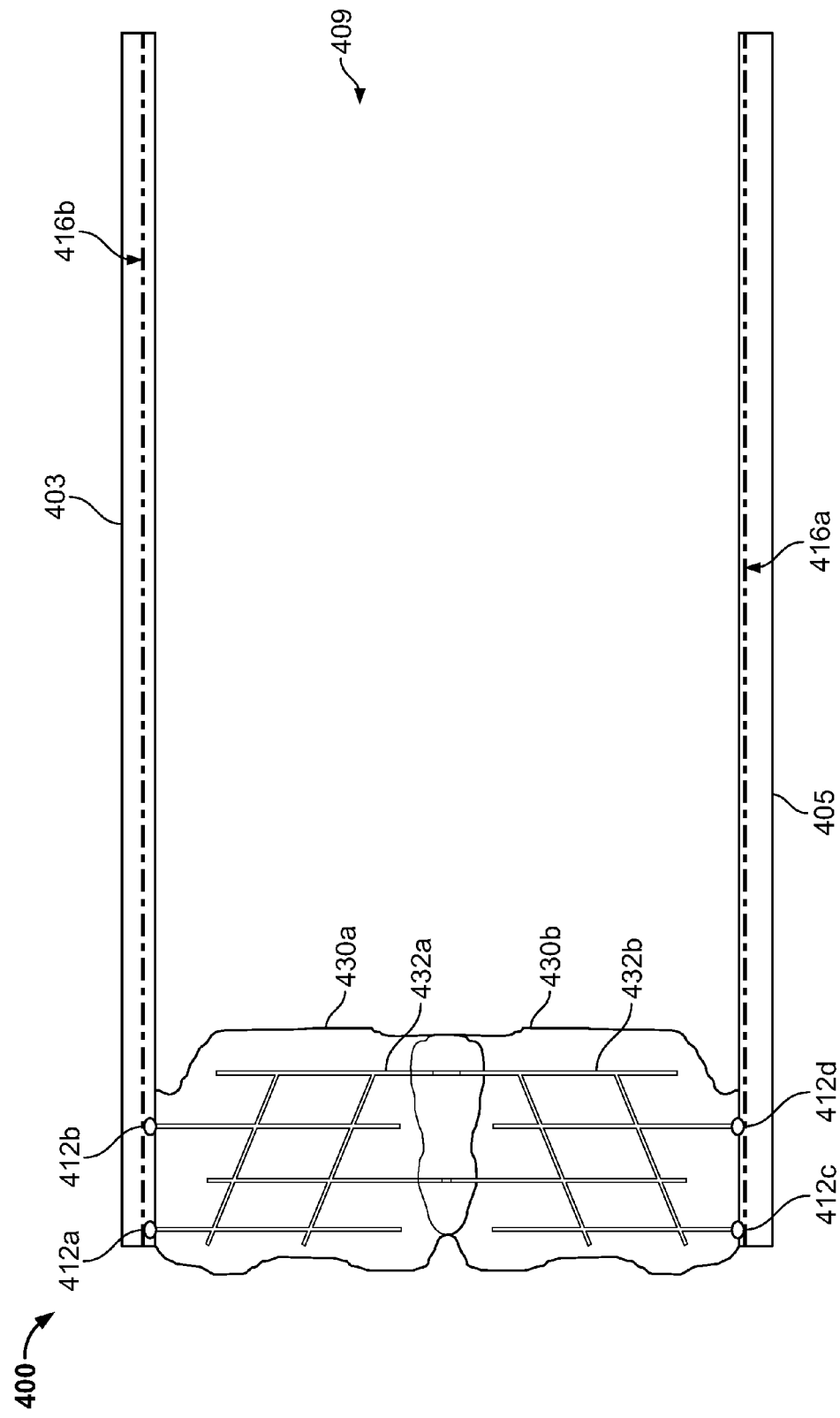

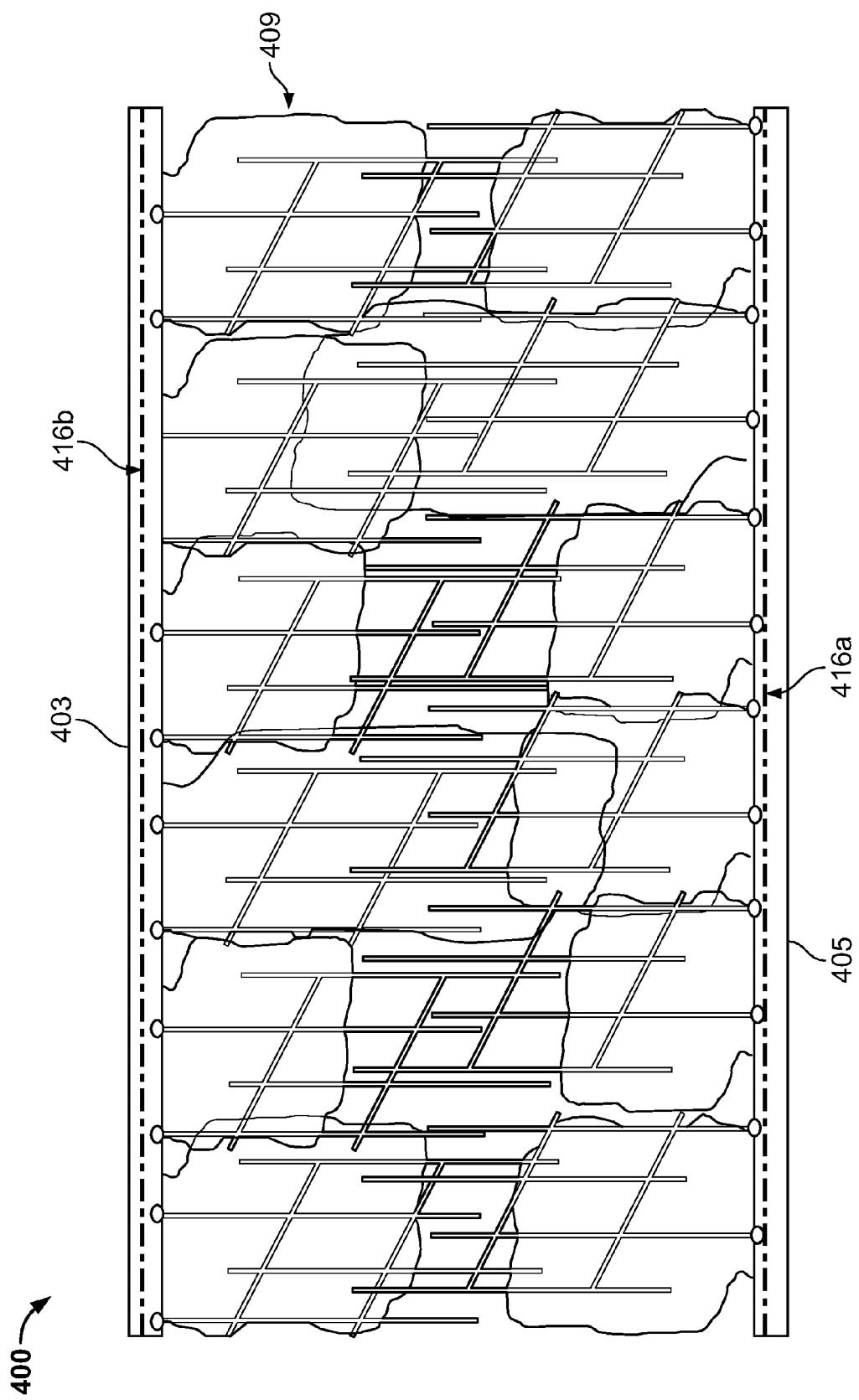

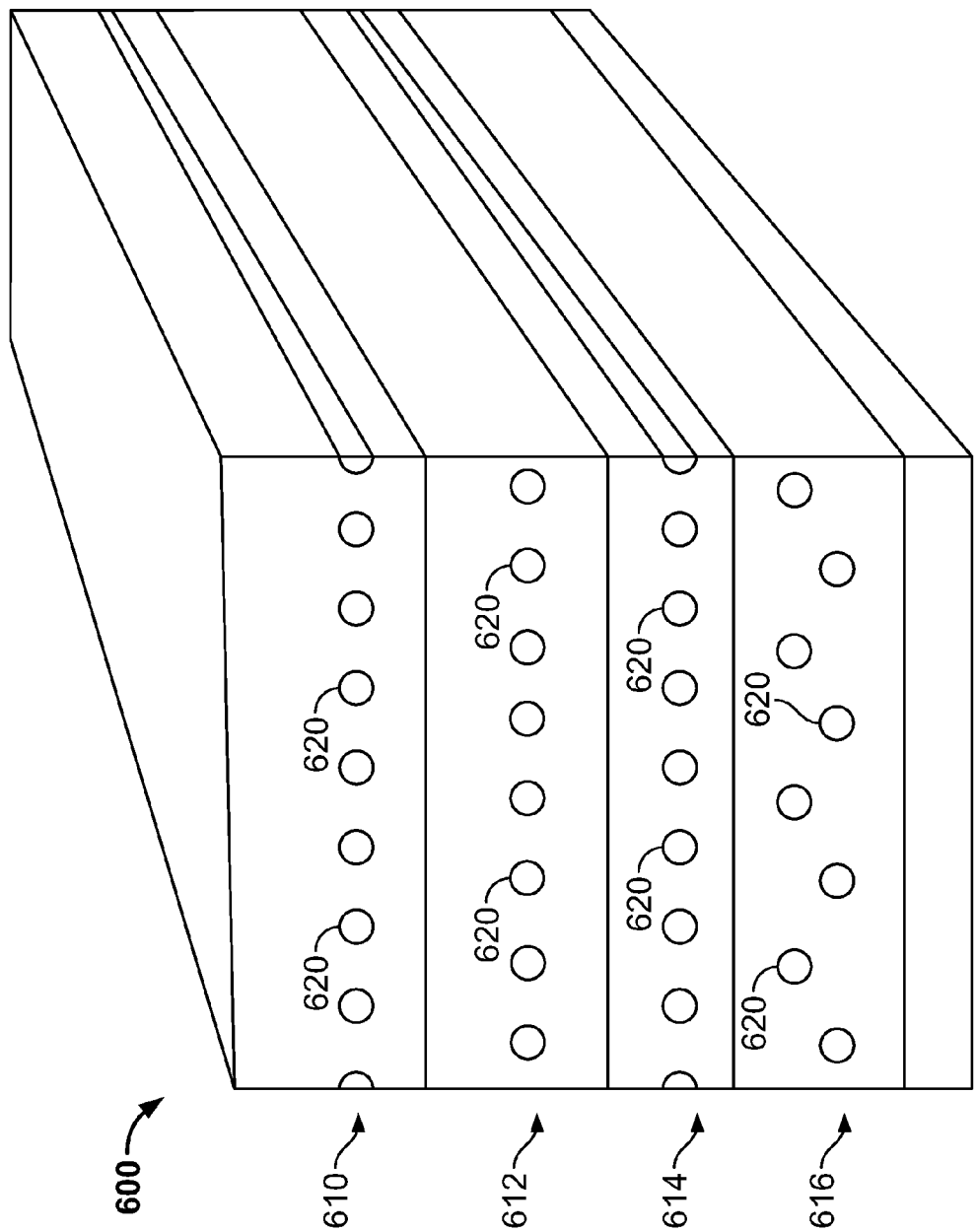

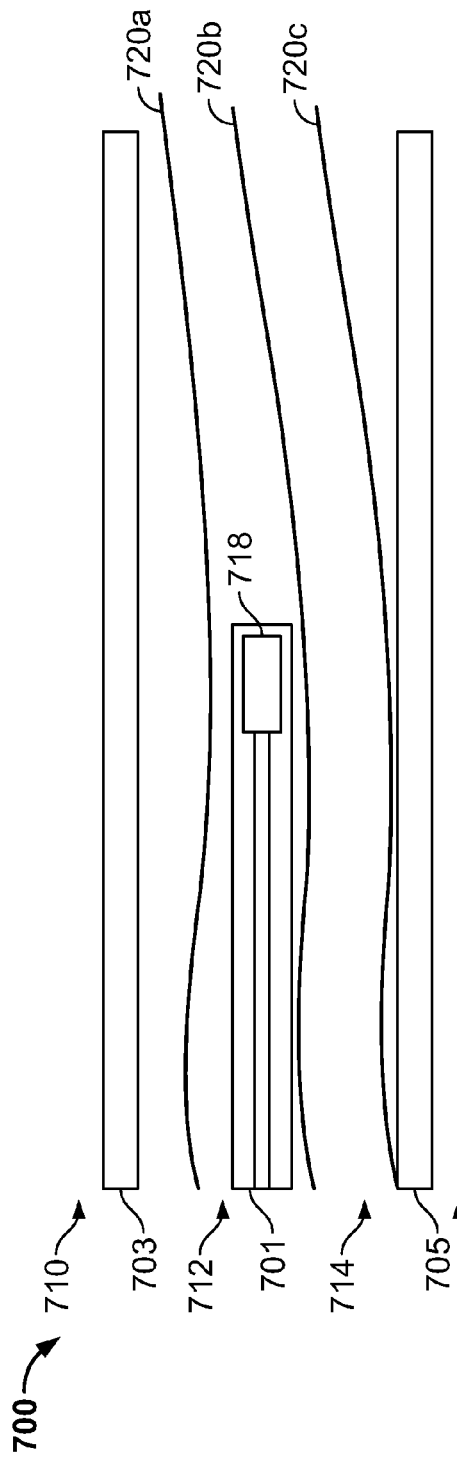
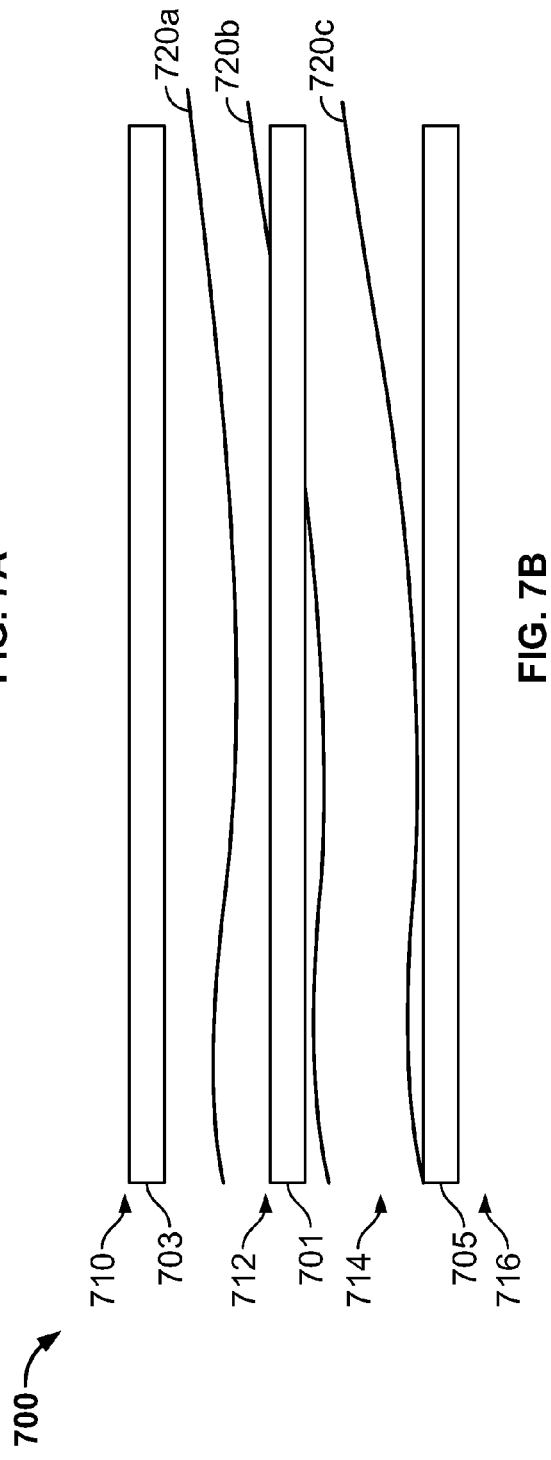

ANALYZING GEOMECHANICAL PROPERTIES OF SUBTERRANEAN ROCK BASED ON SEISMIC DATA

CROSS-REFERENCE TO RELATED APPLICATION

This application is the National Stage of, and therefore claims the benefit of, International Application No. PCT/US2014/040857 filed on Jun. 4, 2014, entitled "ANALYZING GEOMECHANICAL PROPERTIES OF SUBTERRANEAN ROCK BASED ON SEISMIC DATA," which was published in English under International Publication Number WO 2015/187150 on Dec. 10, 2015. The above application is commonly assigned with this National Stage application and is incorporated herein by reference in its entirety.

BACKGROUND

The following description relates to analyzing geomechanical properties of subterranean rock based on seismic data.

Seismic imaging has been used to obtain geological information on subterranean formations. In some conventional systems, seismic waves are generated by an artificial seismic source at the ground surface, and reflected seismic waves are recorded by geophones. Geological information can be derived from the recorded seismic data, for example, using a velocity model constructed from the reflected seismic waves.

DESCRIPTION OF DRAWINGS

FIGS. 2A-2C are schematic diagrams showing aspects of seismic data acquisition in an example subterranean region.

FIGS. 3A-3F are schematic diagrams showing aspects of seismic data acquisition in connection with a fracture treatment.

FIGS. 4A-4D are schematic diagrams showing aspects of seismic data acquisition in connection with another fracture treatment.

FIGS. 6A-6D are schematic diagrams showing an example subterranean region and examples of seismic data analysis.

FIGS. 7A and 7B are schematic diagrams of an example subterranean region.

Like reference symbols in the various drawings indicate like elements.

DETAILED DESCRIPTION

Figure 1:
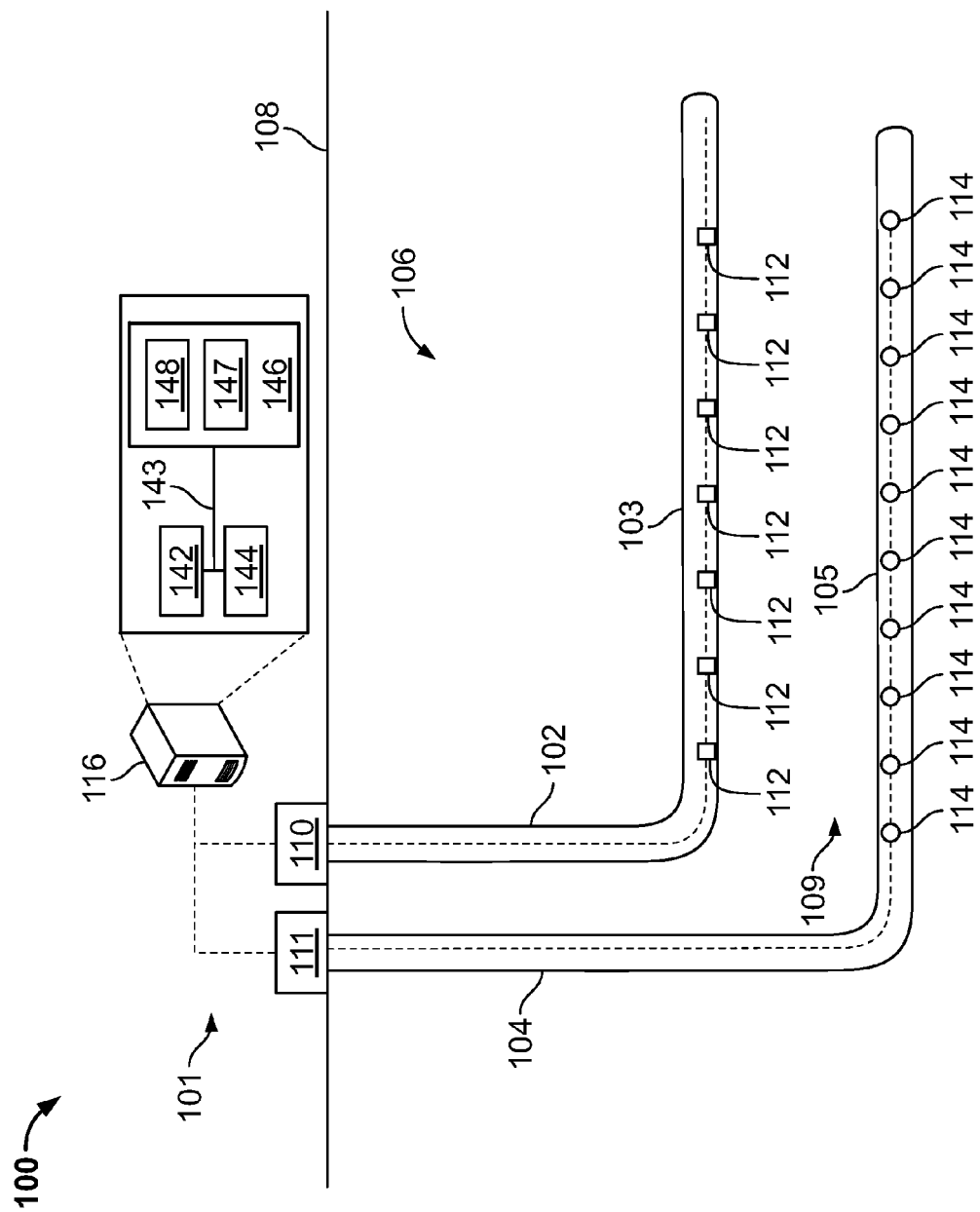
FIG. 1 is a schematic diagram of an example well system.

FIG. 1 is a schematic diagram of an example well system 100 and a computing system 116. The example well system 100 shown in FIG. 1 includes two wellbores 102, 104 in the subterranean region 106 beneath the ground surface 108. The well system 100 includes a seismic profiling system 101 arranged to obtain seismic data from a region of interest 109 in the subterranean region 106. The well system 100 can include additional or different features, and the features of a well system can be arranged as shown in FIG. 1 or in another manner.

In the example shown in FIG. 1, the seismic profiling system 101 includes a seismic source system and a seismic sensor system. The seismic profiling system 101 can include additional or different features, and the components of a seismic profiling system can be arranged as shown in FIG. 1 or in another manner. The seismic source system includes an array of seismic sources 112 along a horizontal wellbore section 103 of the first wellbore 102; the seismic sensor system includes an array of seismic sensors 114 along a horizontal wellbore section 105 of the second wellbore 104. The seismic sensor system can collect seismic data and, in some instances, detect the seismic excitations generated by the seismic source system.

In some cases, the seismic profiling system 101 includes a seismic control system. For instance, the seismic profiling system 101 may include one or more controllers or command centers that send control signals to the seismic source system, to the seismic sensor system, and possibly to other components of the well system 100. In some examples, the seismic control system is included in the surface equipment 110, 111, the computing system 116, or other components or subsystems. The seismic control system can include software applications, computer systems, machine-interface and communication systems, or a combination of these and other systems. In some cases, a seismic control system includes human-interface components, for example, that allow an engineer or other user to control or monitor seismic profiling operations.

In some cases, the seismic profiling system 101 includes data storage systems, data analysis systems, or other components for processing seismic data. For instance, the seismic profiling system 101 may store and analyze the signals detected by the seismic sensors 114, the control data from the seismic sources 112, and other related information. In some examples, the data can be collected, stored and analyzed by the surface equipment 110, 111, the computing system 116, or a combination of these and other systems.

In some instances, data collected by the example seismic profiling system 101 are used to analyze the region of interest 109. The region of interest 109 can include a hydrocarbon reservoir, another type of fluid reservoir, one or more rock formations or subsurface layers, or a combination of these or other geological features. In some examples, the region of interest 109 includes all or part of an unconventional reservoir, such as, for example, tight-gas sands, gas and oil shales, coalbed methane, heavy oil and tar sands, gas-hydrate deposits, etc. In some instances, the region of interest 109 includes all or part of a conventional reservoir.

In the example shown in FIG. 1, the region of interest 109 resides between two horizontal wellbore sections 103, 105 that are offset from each other in the subterranean region 106. The horizontal wellbore sections 103, 105 can be offset from each other in a vertical direction, horizontal direction, or both. In some cases, a seismic profiling system includes two, three, four or more wellbore sections about a central region of interest. In some cases, the region of interest resides in a non-central location that is offset from the wellbores in a vertical direction, a horizontal direction, or both.

In some implementations, the example seismic profiling system 101 can be used for cross-well seismic profiling. In a cross-well seismic profiling configuration, an active seismic source generates a seismic excitation in a wellbore, and seismic sensors in one or more other wellbores detect a response from the subterranean region. In some instances, the seismic profiling system 101 can perform other types of seismic monitoring (e.g., seismic reflection monitoring, vertical seismic profiling, etc.) in addition to, or instead of, cross-well seismic profiling.

In some instances, the seismic profiling system 101 can identify changes in the region of interest 109 over time. For example, the seismic profiling system 101 may provide high-resolution, time-lapse imaging of the region of interest 109 during treatment or production operations. In some cases, seismic images or other seismic profiling data are used to construct or calibrate models of the subsurface, which can be used, for example, in computer simulations, geological or engineering analysis, and other applications. In some instances, the seismic profiling system provides information for subsurface evaluation that can be used to design well completion attributes, fracture treatments, well placement and spacing, re-stimulation operations (e.g., in unconventional reservoirs), etc.

In some examples, the seismic profiling system 101 can be used in connection with stimulation treatments, and perforation charges used to perforate a wellbore casing can be used as seismic sources. In some instances, the seismic data may provide high-resolution images of rock anisotropy, measurements for calculating stimulated reservoir volume or reservoir drainage, data for analyzing net effective fracture length, and other types of information. In some cases, perforations in a fracture stimulation stage can be spaced out in time, and the seismic profiling system 101 can process data in real time to provide a continuously-developing image of a fracture network being created. Information from the fracture network imaging can be used, for example, to control the fracture treatment in real time, to improve the volume of rock stimulated, to reduce the expense required to achieve stimulation, or for other purposes.

As shown in FIG. 1, the region of interest 109 resides relatively close to the horizontal wellbore sections 103, 105 (e.g., close, relative to the surface 108 or another reference location). In some instances, operating the seismic sources 112 and the seismic sensors 114 within the subterranean region 106 and near the region of interest 109 can provide advantages, such as, for example, higher signal-to-noise ratio, higher spatial or temporal resolution, reduced location uncertainty, higher precision control, and possibly other advantages.

The example seismic sources 112 can generate seismic excitations that have sufficient energy to provide seismic analysis of the region of interest 109. Examples of seismic sources include electronically-driven vibrational systems, seismic air guns, explosive devices, perforating charges, and others. The seismic sources 112 can include continuously-driven sources, pulsed sources, or a combination of these and other types of systems. The seismic sources 112 can be located at regular or random intervals along the length of a wellbore, and in some cases, multiple seismic sources can operate in substantially the same location in a wellbore.

The seismic sources 112 can be operated at distinct times and in any order, and in some cases, multiple seismic sources 112 can operate concurrently, in repeated cycles, or in another manner. For example, an array of seismic sources can be staged at discrete time intervals and shot in sequence (e.g., seconds apart), or multiple sources can be shot simultaneously (e.g., within a few milliseconds of each other). In some cases, hundreds of source shots can be leveraged to allow data stacking, which can increase the signal-to-noise ratio, reduce location uncertainty, or provide other advantages.

The example seismic sensors 114 can detect seismic activity in the region of interest 109. In some instances, the seismic sensors detect a response to excitations generated by the seismic sources 112. Examples of seismic sensors include geophones, hydrophones, fiber optic distributed acoustic sensing (DAS) systems, time domain interferometry systems, and others. Geophones (e.g., single-component geophones, multi-component geophones) can be used with fiber optic DAS systems in the same receiver well or in a different receiver well. Geophones can be used without fiber optic DAS systems, or fiber optic DAS systems can be used without geophones.

The seismic sensors 114 can be located at regular or random intervals along the length of a wellbore, and in some cases, multiple seismic sensors can operate in substantially the same location in a wellbore. In some implementations, additional seismic sensors are deployed at the ground surface 108 above the subterranean region 106, for example, to improve seismic coverage or for another purpose.

The seismic responses detected by the seismic sensors 114 can include seismic waves that are initially generated by the seismic sources 112, and then propagated (or reflected) through the region of interest 109 to the seismic sensors 114. The seismic waves are typically modified (e.g., attenuated, phase-shifted, etc.) as they are propagated or reflected in the subterranean region 106. In some cases, placing the sensor array near a region of interest provides a more direct acoustic interface with the subterranean formation or layer of interest. For example, in some instances, a horizontal sensor array in the formation of interest can image rock between the wellbores 102, 104 without having to accommodate multiple formation interfaces and attenuation associated with some conventional seismic imaging techniques.

The seismic sensors 114 can include permanently-installed sensors (e.g., for life-of-the well monitoring), temporary sensors (e.g., for short-term monitoring), or a combination of these and other types of sensor installations. For example, in some cases, one or more of the seismic sensors 114 is cemented in place between a wellbore casing (e.g., production casing) and the wall of the horizontal wellbore section 105, or one or more of the seismic sensors 114 is embedded in a working string installed in the horizontal wellbore section 105. Such installations may be useful, for example, in a dedicated receiver well, in production wells, or in other types of wells. In some cases, one or more of the seismic sensors 114 is positioned in the horizontal wellbore section 105, for example, by deployment through coiled tubing or wireline cable. Such installations may be useful, for example, before or during wellbore completion, before or during wellbore drilling, or in connection with other operations.

In some implementations, the seismic profiling system 101 includes one or more fiber optic DAS systems. In some example fiber optic DAS systems, a length of optical fiber is installed in a wellbore (e.g., the wellbore 104), and a DAS controller (e.g., included in the surface equipment 111) is coupled to the optical fiber. The DAS controller can include an optical interrogator that can interrogate the optical fiber in the wellbore. For example, the optical interrogator may generate light pulses that are launched into the optical fiber, and the DAS controller can collect and analyze optical signals that are backscattered from within the optical fiber.

By analyzing the backscattered optical signals, the DAS controller can detect seismic signals incident on the optical fiber in the wellbore.

In some example implementations of a fiber optic DAS system, the length of the optical fiber in the wellbore can be analyzed as a series of discrete seismic sensing portions. For example, the backscattered optical signals can be analyzed in bins associated with respective properties of the interrogation pulses, and the bins can be used to independently analyze signal returns from multiple discrete sensing portions. For instance, each discrete sensing portion may correspond to one of the seismic sensors 114 shown in FIG. 1. In some cases, a single optical fiber can be used as hundreds or thousands of seismic sensors, and multiple optical fibers can be used in each wellbore.

In some example fiber optic DAS systems, a disturbance on any portion of the optical fiber (e.g., a response to a seismic excitation generated in the wellbore 102) can vary the optical signal that is backscattered from that sensing portion. The DAS controller can detect and analyze the variation to measure the intensity of seismic disturbances on the sensing portion of the optical fiber. In some examples, a fiber optic DAS system can detect seismic waves including P and S waves. In some implementations, the DAS controller interrogates the optical fiber using coherent radiation and relies on interference effects to detect seismic disturbances on the optical fiber. For example, a mechanical strain on a section of optical fiber can modify the optical path length for scattering sites on the optical fiber, and the modified optical path length can vary the phase of the backscattered optical signal. The phase variation can cause interference among backscattered signals from multiple distinct sites along the length of the optical fiber and thus affect the intensity of the optical signal detected by the DAS controller. In some instances, the seismic disturbances on the optical fiber are detected by analysis of the intensity variations in the backscattered signals.

In the example shown in FIG. 1, the first wellbore 102 serves as a source well and the second wellbore 104 serves as a receiver well. In some cases, a horizontal seismic profiling system can use multiple source wells, multiple receiver wells, or both. The source and receiver wells can be used to study a region of interest around one or more of the wellbores, or at a central location among multiple wellbores. By looking at seismic wave velocity variations from the source to receiver wells, and using enhanced seismic processing techniques to analyze the variations, natural or induced formation properties can be identified. For example, the formation properties may include fluid or rock density, mechanical rock properties (e.g., Young's modulus, Poisson's ratio, etc.), primary stress values and directions, faults, natural fractures and induced fractures, proppant, pore pressure, fluid locations, etc.

The seismic profiling data generated by the example seismic profiling system 101 can include seismic source data describing the timing, type, amplitude, frequency, phase or other properties of the seismic source signals generated by the seismic sources 112. The seismic profiling data generated by the example seismic profiling system 101 can include sensor data describing the timing, type, amplitude, frequency, phase or other properties of the seismic signals acquired by the seismic sensors 114. The seismic profiling data can include additional or different information, such as, for example, velocity profile data, source or sensor location data, etc.

The seismic profiling data generated by the example seismic profiling system 101 can be communicated within the well system 100 or to a remote system, and the seismic profiling data can be stored, processed, or analyzed by one or more storage or processing components in the well system 100, in the computing system 116, or in another location. For example, in some instances, the seismic profiling data are processed using reflection seismic processing techniques, which may include, for example, inversion techniques or energy intensity imaging processing used in passive surface seismic processing.

In some cases, the seismic profiling data are used to construct a seismic velocity profile for all or part of the region of interest 109. For example, the time duration for seismic propagation from a seismic source 112 to a seismic sensor 114 can be identified based on timing data describing the excitation at the source and the response detected at the sensor. In some cases, the first-arrival time or other properties of the detected response signal can be used to construct the velocity profile. The velocity profiles from multiple seismic excitations or multiple seismic responses can be used to construct a seismic velocity model for a subterranean region. In some cases, the seismic velocity model includes a two-dimensional, three-dimensional, or four-dimensional model of the subterranean region.

A seismic velocity model can represent the relative or absolute velocities of seismic waves in the subterranean region 106. The velocity of seismic waves in a medium typically depends on properties of the seismic excitation (e.g., frequency) and the properties (e.g., acoustic impedance) of the medium. As such, the velocity profile can be used to calculate values of geomechanical properties that affect the acoustic impedance of the subterranean region 106 or other properties that affect the seismic velocity. A higher-resolution seismic velocity model can provide higher-resolution information on the material properties of the medium. In some cases, the velocity model can be used to compute properties such as fracture conductivity, pore pressure, Young's modulus, Poisson's ratio, stress magnitude, stress direction, stress anisotropy, or others.

In some implementations, the relative intensity, phase, or other properties of seismic response data can be interpreted to identify the locations of discontinuities or other types of structural variations in the region of interest 109. For example, hydraulically-created fractures, natural fractures, subsurface layer boundaries, wellbores, and other features can be identified in some cases. In some instances, such features can be identified based on phase shifts or intensity attenuation in reflected seismic signals, transmitted seismic signals, or a combination of these and other seismic data attributes.

In some implementations, the information derived from the seismic profiling data can be used for engineering interpretation, such as, for example, interpreting fracture geometry and complexity, fracture stage overlap, inter-well interference, stimulated reservoir volume analysis, and other types of analysis. Such analysis can be used to improve completion designs (clusters, stages) and fracture designs, well placement and spacing, re-stimulation decisions, etc.

In some implementations, the seismic profiling data can be used for well placement in connection with well system planning or drilling operations. For example, the seismic profiling data may be used to determine (e.g., prospectively, before drilling or while drilling) the azimuth or spacing of one or more directional wells, the vertical depth or spacing of one or more directional wells, the placement of a directional well within the stratigraphic layering in a formation, or other well placement considerations; the seismic profiling data may be used to identify such parameters after the well has been drilled.

In some implementations, the seismic profiling data can be used for high-resolution, time-lapse imaging to identify changes in formation properties in the region of interest 109. Such techniques may be useful, for example, where two or more horizontal wells have been placed to drain the formation, or in other instances.

In some implementations, seismic wave velocity can be recorded between horizontal wellbores with high accuracy. The accuracy may provide a basis for mapping formation properties in the region of interest 109. The formation properties may include, for example, Poisson's Ratio, Young's Modulus, pore pressure, density, stress anisotropy, open natural fractures, hydraulically-created fractures, and others. In some instances, the formation properties can be mapped to provide a detailed subsurface model of the region of interest 109.

In some implementations, the seismic profiling data can be used with fracturing operations during a completion of a well. For example, the regions of altered properties can be mapped to capture information on the stimulated volume and the fracture intensity within the stimulated volume. Such information may provide a basis for constructing a calibrated fracture model and reservoir model to predict flowback and production. In some instances, the seismic profiling data can be processed in real time, and the subsurface information may allow control of the fracturing operations using near-wellbore and far-field diversion to effectively increase the stimulated area and volume of the reservoir.

In some implementations, the seismic profiling data can be used for dynamic fracture mapping of fractures created by a fracture treatment. For example, changes in velocity profiles can be used to assess fracture network growth and intensity. Time-lapse analysis may enable a four-dimensional (4D) solution to visualize and model fracture growth after each fracturing stage in a completion. The 4D solution can include three-dimensional (3D) spatial modeling, with an additional time dimension showing changes in the 3D spatial model over time. In some cases, the analysis can also model localized changes in pore pressure due to fluid loss and fluid volumes injected into the reservoir.

In some implementations, the seismic profiling data can be used to capture detailed reservoir information, for example, around a wellbore in a target region. For instance, multi-directional velocity interpretation and detailed seismic interpretation techniques, including the use of inversion solutions, can be used for reservoir characterization (e.g., to calculate mechanical properties, density, pore pressure, natural fractures, faults, stress, hydraulically-created fractures). In some instances, an artificially-induced seismic source is used for reservoir characterization. For example, perforating guns that perforate individual stages along a wellbore can provide energy for seismic data acquisition for reservoir characterization. In some cases, a velocity model constructed from horizontal seismic profiling can improve interpretation capability available from other data sources, such as, for example, other 3D or 4D seismic information.

In some implementations, the seismic profiling data can be used to assess local stress changes around the wellbore. For example, changes in horizontal or vertical stress in the local rock formation can result in changes in the local velocity model. In some instances, based on changes in the velocity model or other types of changes in seismic data, the degree of stress alteration and changes in stress anisotropy can be calculated. For example, a time-lapse method over an entire completion or series of completions can be used to evaluate stress interference between individual fractures along one wellbore or stress interference between fractures from adjacent or nearby wells.

In some instances, the seismic profiling data are analyzed in real time during the fracture treatment. For example, the data can be analyzed using seismic energy releases during a fracture treatment to observe growth and changes in geometry. Real time analysis can be used, for example, to calibrate and fine-tune fracture propagation models. In some cases, a hybrid fracture modeling solution takes input from multiple sources (e.g., including active seismic sources, passive microseismic sources, micro-deformation and near-wellbore pressure, temperature and strain monitoring, or a combination of these), and the modeling solution can provide information on fracture width, fracture length, fracture height, degree of fracture complexity and the total stimulated volume, or a combination of these. In some instances, the model can be calibrated and used as a predictive fracture growth tool for new completion designs, or it can be used for other applications.

In some implementations, the seismic profiling data can be used in connection with production operations. For example, passive or actively-induced seismic monitoring during production can enable the tracking of fluid movement for understanding reservoir drainage or well interference within the reservoir over time. In some cases, the seismic profiling system 101 can provide fluid tracking with high resolution, for example, due to the close proximity of the measurement apparatus. In some instances, detailed pore pressure imaging allows critical well parameters and completion parameters to be observed and validated. Such parameters may include wellbore spacing, hydraulic fracture length, hydraulic fracture spacing, etc. In some instances, regions with poor reservoir drainage can be identified as possible infill drilling or re-stimulation candidates.

In some implementations, seismic profiling data can be collected and used at different points during the productive life of a reservoir, for example, to monitor reservoir depletion and pore pressure changes, to evaluate the effectiveness of the drilling and completion program, to identify opportunities for improved well designs, opportunities for infill drilling or re-fracturing operations. The seismic profiling data may also allow better history matching of a reservoir simulator over the life of the well.

As shown in FIG. 1, the seismic sources 112 and the seismic sensors 114 are positioned and operate in the respective horizontal wellbore sections 103, 105. The horizontal wellbore sections 103, 105 are examples of directional wellbore sections that deviate from vertical. Directional wellbore sections can include one or more wellbore sections that are curved, slanted, horizontal (i.e., precisely horizontal or substantially horizontal, for example, following the dip of a formation or other geological attribute), or otherwise non-vertical.

In some implementations, one or more of the wellbores 102, 104 include other sections (e.g., horizontal, curved, slanted, or vertical wellbore sections), and the seismic profiling system 101 can include seismic sources or seismic sensors (or both) in one or more other sections of a wellbore. For example, one or more of the seismic sources 112 can be positioned in a vertical, slanted, curved, or other section of the wellbore 102; or one or more of the seismic sensors 114 can be positioned in a vertical, slanted, curved, or other section of the wellbore 104. In some instances, one or more of the seismic sources 112 are positioned and operate in the same wellbore as the seismic sensors 114.

As shown in FIG. 1, the example well system 100 includes surface equipment 110, 111 associated with each of the respective wellbores 102, 104. The surface equipment associated with a wellbore may vary according to the type of wellbore, the stage of wellbore operations, the type of wellbore operations, and other factors. Generally, the surface equipment can include various structures and equipment attached to a well head or another structure near the ground surface 108. For example, the surface equipment may include pumping equipment, fluid reservoirs, proppant storage, mixing equipment, drilling equipment, logging equipment, control systems, etc.

In the example shown in FIG. 1, the surface equipment 110, 111 can communicate with components in the respective wellbores 102, 104 (e.g., the seismic sources 112, the seismic sensors 114, etc.) and possibly other components of the well system 100. For example, the seismic profiling system 101 may include one or more transceivers or similar apparatus for wired or wireless data communication. In some cases, the well system 100 includes systems and apparatus for fiber optic telemetry, wireline telemetry, wired pipe telemetry, mud pulse telemetry, acoustic telemetry, electromagnetic telemetry, or a combination of these and other types of telemetry.

Some of the techniques and operations described herein may be implemented by a one or more computing systems configured to provide the functionality described. In various instances, a computing system may include any of various types of devices, including, but not limited to, personal computer systems, desktop computer systems, laptops, mainframe computer systems, handheld computer systems, application servers, computer clusters, distributed computing systems, workstations, notebooks, tablets, storage devices, or another type of computing system or device.

The example computing system 116 in FIG. 1 can include one or more computing devices or systems located at one or both of the wellbores 102, 104 or other locations. The computing system 116 or any of its components can be located apart from the other components shown in FIG. 1. For example, the computing system 116 can be located at a data processing center, a computing facility, a command center, or another location. The example computing system 116 can communicate with (e.g., send data to or receive data from) the seismic profiling system 101. In some examples, all or part of the computing system 116 may be included with or embedded in the surface equipment 110, 111 associated with or one or both of the wellbores 102, 104. In some examples, all or part of the computing system 116 may communicate with the surface equipment 110, 111 over a communication link. The communication links can include wired or wireless communication networks, other types of communication systems, or a combination thereof. For example, the well system 100 may include or have access to a telephone network, a data network, a satellite system, dedicated hard lines, or other types of communication links.

As shown in the schematic diagram in FIG. 1, the example computing system 116 includes a memory 146, a processor 144, and input/output controllers 142 communicably coupled by a bus 143. A computing system can include additional or different features, and the components can be arranged as shown or in another manner. The memory 146 can include, for example, a random access memory (RAM), a storage device (e.g., a writable read-only memory (ROM) or others), a hard disk, or another type of storage medium. The computing system 116 can be preprogrammed or it can be programmed (and reprogrammed) by loading a program from another source (e.g., from a CD-ROM, from another computer device through a data network, or in another manner).

In some examples, the input/output controllers 142 are coupled to input/output devices (e.g., a monitor, a mouse, a keyboard, or other input/output devices) and to a network. The input/output devices can communicate data in analog or digital form over a serial link, a wireless link (e.g., infrared, radio frequency, or others), a parallel link, or another type of link. The network can include any type of communication channel, connector, data communication network, or other link. For example, the network can include a wireless or a wired network, a Local Area Network (LAN), a Wide Area Network (WAN), a private network, a public network (such as the Internet), a WiFi network, a network that includes a satellite link, or another type of data communication network.

The memory 146 can store instructions (e.g., computer code) associated with an operating system, computer applications, and other resources. The memory 146 can also store application data and data objects that can be interpreted by one or more applications or virtual machines running on the computing system 116. As shown in FIG. 1, the example memory 146 includes data 148 and applications 147. The data 148 can include well system data, geological data, fracture data, seismic data, or other types of data. The applications 147 can include seismic analysis software, fracture treatment simulation software, reservoir simulation software, or other types of applications. In some implementations, a memory of a computing device includes additional or different data, application, models, or other information.

In some instances, the data 148 include treatment data relating to fracture treatment plans. For example, the treatment data can indicate a pumping schedule, parameters of an injection treatment, etc. Such parameters may include information on flow rates, flow volumes, slurry concentrations, fluid compositions, injection locations, injection times, or other parameters. In some cases, the treatment data indicate parameters for one or more stages of a multi-stage injection treatment In some instances, the data 148 include wellbore data relating to one or more wellbores in a well system. For example, the wellbore data may include information on wellbore orientations, locations, completions, or other information. In some cases, the wellbore data indicate the locations and attributes of completion intervals in an individual wellbore or an array of wellbores.

In some instances, the data 148 include geological data relating to geological properties of a subterranean region. For example, the geological data may include information on the lithology, fluid content, stress profile (e.g., stress anisotropy, maximum and minimum horizontal stresses), saturation profile, pressure profile, spatial extent, or other attributes of one or more rock formations in the subterranean zone. The geological data can include information derived from well logs, rock samples, outcroppings, microseismic monitoring, seismic analysis, or other sources of information.

In some instances, the data 148 include fracture data relating to fractures in the subterranean region. The fracture data may indicate the locations, sizes, shapes, and other properties of fractures in a model of a subterranean zone. The fracture data can include information on natural fractures, hydraulically-induced fractures, or another type of discontinuity in the subterranean region. The fracture data can include fracture planes calculated from microseismic data or other information. For each fracture plane, the fracture data can include information indicating an orientation (e.g., strike angle, dip angle, etc.), shape (e.g., curvature, aperture, etc.), boundaries, or other properties of the fracture.

In some instances, the data 148 include fluid data relating to well system fluids. The fluid data may indicate types of fluids, fluid properties, thermodynamic conditions, and other information related to well system fluids. The fluid data can include data related to native fluids that naturally reside in a subterranean region, treatment fluids to be injected into the subterranean region, proppants, hydraulic fluids that operate well system tools, or other fluids.

In some instances, the data 148 include seismic data relating to seismic profiling. The seismic data may include seismic source data, seismic response data, or a combination of these and other types of data. The seismic source data can indicate locations and types of seismic sources, characteristics of seismic excitations generated by seismic sources, or other information. The seismic response data can indicate the locations and types of seismic sensors, characteristics of seismic responses detected by seismic sensors, or other information. In some cases, the seismic data include seismic velocity profiles, seismic reflection profiles, seismic images, or other types of seismic analysis data.

The applications 147 can include software applications, scripts, programs, functions, executables, or other modules that are interpreted or executed by the processor 144. For example, the applications 147 can include a seismic analysis tool, a fracture simulation tool, a reservoir simulation tool, or another type of software tool. The applications 147 may include machine-readable instructions for performing one or more of the operations related to FIGS. 9A-9B or FIG. 10. For example, the applications 147 can include modules or algorithms for analyzing seismic data. The applications 147 may include machine-readable instructions for generating a user interface or a plot, for example, illustrating seismic data or seismic analysis information. The applications 147 can receive input data, such as seismic data, geological data, treatment data, etc., from the memory 146, from another local source, or from one or more remote sources (e.g., over a data network, etc.). The applications 147 can generate output data, such as seismic profiles, seismic images, detailed reservoir characteristics, etc., and store the output data in the memory 146, in another local medium, or in one or more remote devices (e.g., by sending the output data over a data network, etc.).

The processor 144 can execute instructions, for example, to generate output data based on data inputs. For example, the processor 144 can run the applications 147 by executing or interpreting the software, scripts, programs, functions, executables, or other modules contained in the applications 147. The processor 144 may perform one or more of the operations related to FIGS. 9A-9B or FIG. 10. The input data received by the processor 144 or the output data generated by the processor 144 can include any of the treatment data, the geological data, the fracture data, the seismic data, or other information.

Figure 2B:
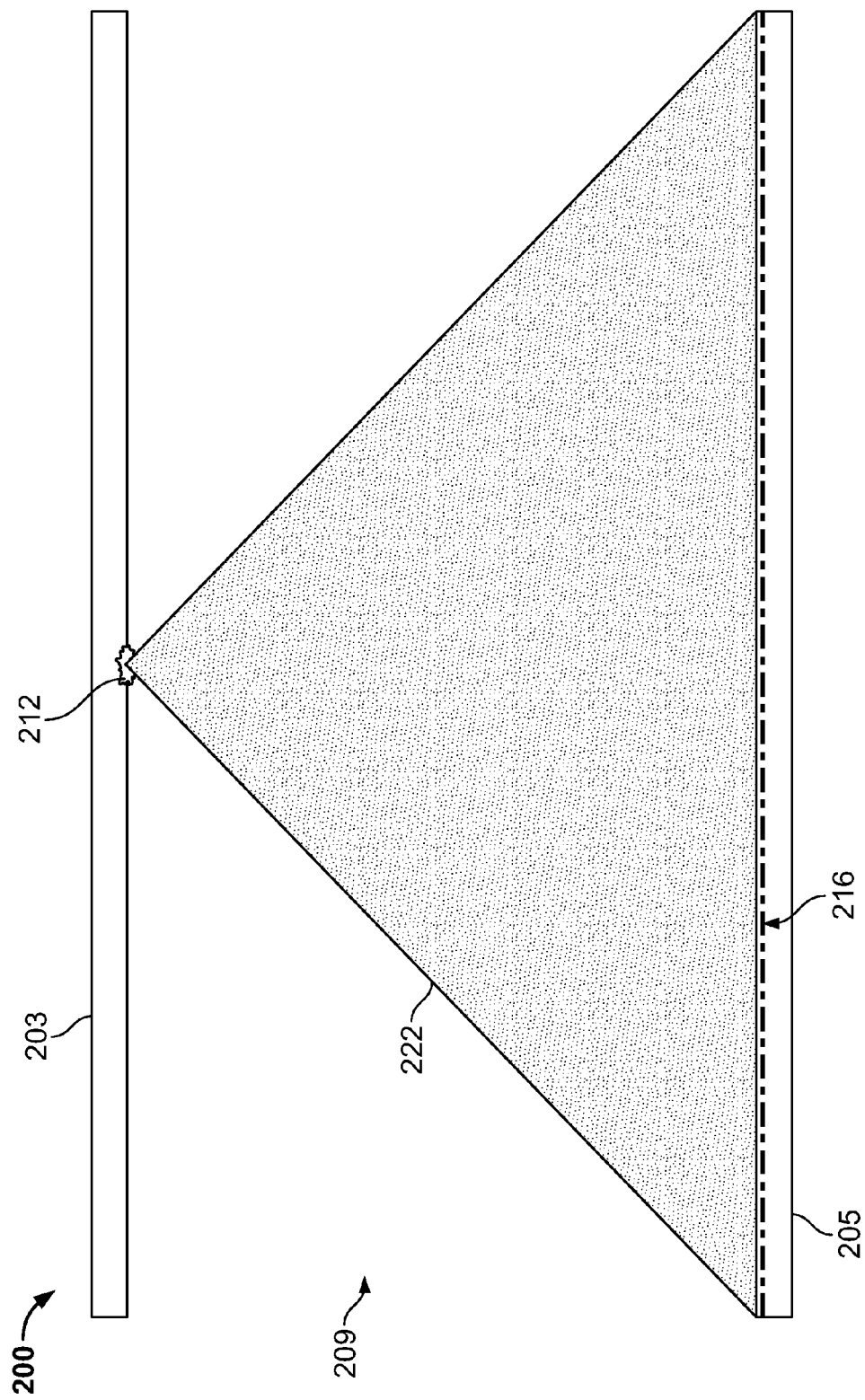
Figure 2C:
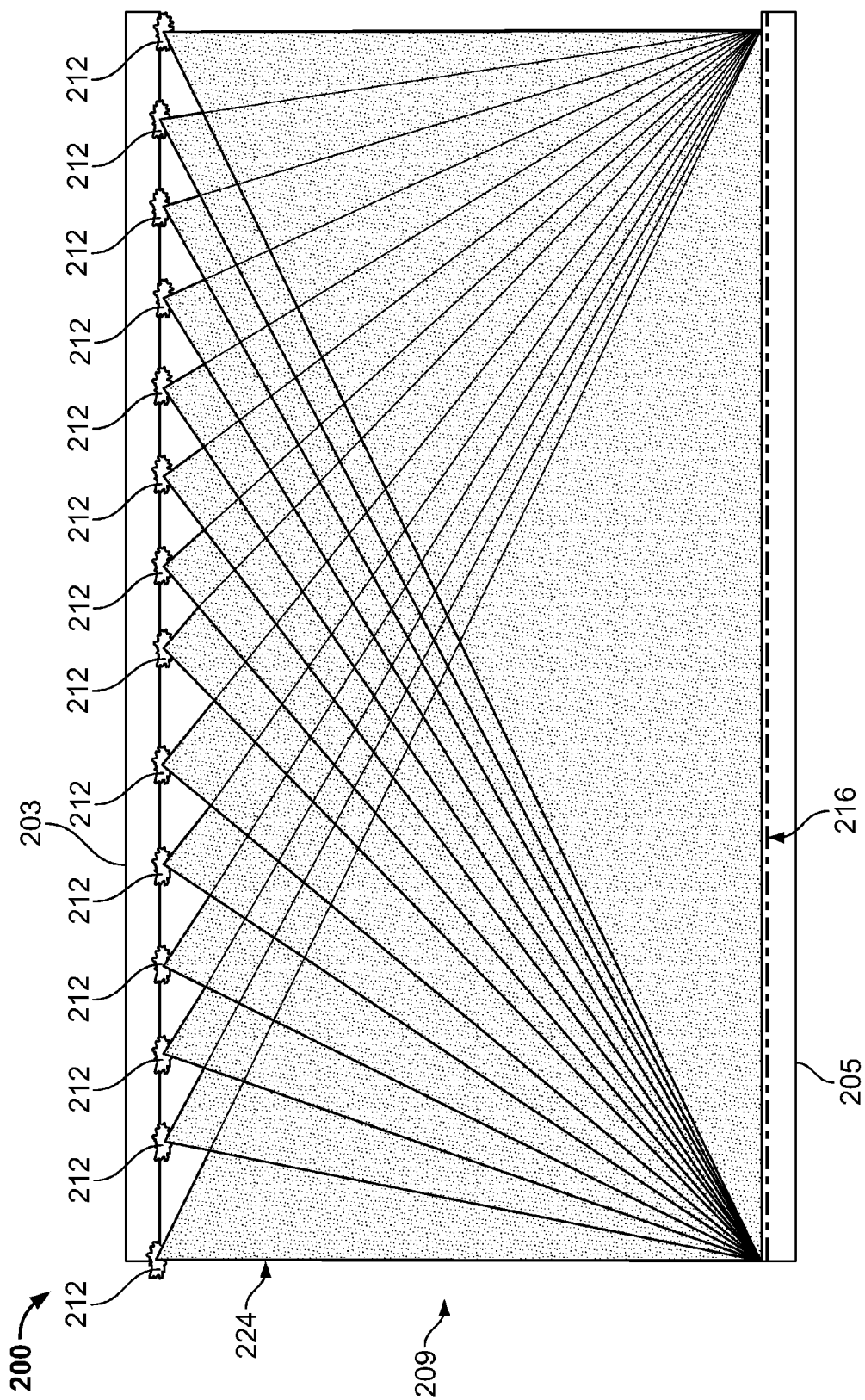

FIGS. 2A-2C are schematic diagrams showing aspects of seismic data acquisition in an example subterranean region 200. The schematic diagrams in FIGS. 2A-2C show a region of interest 209 between two example wellbores 203, 205. As an example, the wellbores 203, 205 shown in FIGS. 2A-2C can be the horizontal wellbore sections 103, 105 shown in FIG. 1, and the region of interest 209 can include a portion of a hydrocarbon reservoir between the horizontal wellbore sections. The techniques described with respect to FIGS. 2A-2C can be applied in other scenarios and other types of well systems.

In the example shown in FIGS. 2A-2C, the wellbores 203, 205 are offset from each other; both have the same orientation and are substantially parallel to each other. In some implementations, the wellbores 203, 205 can be non-parallel, and they can include sections that are curved, slanted, vertical, directional, etc. In some instances, the wellbores 203, 205 have different orientations, and the wellbores 203, 205 may diverge, intersect, or have another spatial relationship relative to one another.

In FIG. 2A, the first wellbore 203 includes a seismic source 212, and the second wellbore 205 includes a seismic sensor array. In the example shown in FIG. 2A, the seismic source 212 generates a seismic excitation in the first wellbore 203, and the seismic sensors 214 detect a seismic response in the second wellbore 205. The lines 220 in FIG. 2A show the direction of seismic waves from the active seismic source 212 to the seismic sensors 214 at discrete, spaced-apart sensor locations in the seismic sensor array. In this example, the velocity of seismic waves through the reservoir can be recorded using an active source in one horizontal well and an array of seismic sensors 214 (e.g., geophones) in an offset horizontal well. In some instances, the seismic velocity is recorded directionally through the reservoir.

In FIG. 2B, the seismic sensor array 216 includes a dense array of sensor locations along the length of the second wellbore 205. For example, a seismic profiling system can use fiber optic distributed acoustic sensing (DAS) or time domain interferometry (TDI) systems, where one or more fiber optic lines can provide an array of thousands (or tens of thousands, or more) seismic sensor locations along a wellbore section. In some instances, the dense array of sensor locations can be used to capture seismic velocity information with high spatial resolution over a region. For example, the shaded region 222 shows the area traversed by seismic waves from the active seismic source 212 to the seismic sensor array 216. In some cases, the seismic source 212 and seismic sensor array 216 can be used to identify and map mechanical properties, faults, fractures, and other properties of the shaded region 222 in FIG. 2B.

In FIG. 2C, the first wellbore 203 includes an array of the active seismic sources 212, and the second wellbore 205 includes the dense array of sensor locations shown in FIG. 2B. The arrays of seismic sources and sensors shown in FIG. 2C can be used to construct seismic velocity profiles for a series of distinct, overlapping regions 224. In some examples, each of the distinct regions includes the area between one of the seismic sources 212 and the ends of the seismic sensor array 216. The distinct regions may overlap (e.g., in two or three spatial dimensions) to a greater or lesser extent, for example, based on the spatial arrangement of the seismic sources 212 and the seismic sensor array 216.

In the example shown, the active seismic sources 212 are used to construct seismic velocity profiles for the distinct, overlapping portions of the region of interest 209. In some cases, the seismic velocity profiles for the series of overlapping regions 224 provide thorough, detailed coverage of the region of interest 209. In some cases, the array of seismic sources 212 are shot along the length of one wellbore with a time increment, and the seismic velocity profiles can be overlaid to create a detailed map of the region of interest 209. The time increment can provide a time-sequence of seismic data for dynamic analysis of the region of interest 209.

In some implementations, the seismic profiling techniques shown in FIGS. 2A-2C can be incorporated into a well completion program with hydraulic fracturing. For example, perforation guns can provide the acoustic source for each stage of the fracture treatment, and the seismic profiling data can be used to map the fracture growth observed in each stage. For instance, open fractures that are fluid-filled will typically have a different acoustic impedance than the unfractured rock material.

FIGS. 3A-3F are schematic diagrams showing aspects of seismic data acquisition in connection with a fracture treatment in a subterranean region 300. The schematic diagrams in FIGS. 3A-3F show a region of interest 309 between two example wellbores 303, 305, which are offset from each other in the subterranean region 300. As an example, the wellbores 303, 305 shown in FIGS. 3A-3F can be the horizontal wellbore sections 103, 105 shown in FIG. 1, and the region of interest 309 can include a portion of a hydrocarbon reservoir between the horizontal wellbore sections. The techniques described with respect to FIGS. 3A-3F can be applied in other scenarios and other types of well systems.

In the example shown in FIGS. 3A-3F, the first wellbore 303 is a fracture treatment injection wellbore. The fracture treatment injection wellbore can be used to perform an injection treatment, whereby fluid is injected into the subterranean region 300 through the wellbore 303. In some instances, the injection treatment fractures part of a rock formation or other materials in the subterranean region 300. In such examples, fracturing the rock may increase the surface area of the formation, which may increase the rate at which the formation conducts fluid resources (e.g., for production).

Generally, a fracture treatment can be applied at a single fluid injection location or at multiple fluid injection locations in a subterranean zone, and the fluid may be injected over a single time period or over multiple different time periods. In some instances, a fracture treatment can use multiple different fluid injection locations in a single wellbore, multiple fluid injection locations in multiple different wellbores, or any suitable combination. Moreover, the fracture treatment can inject fluid through any suitable type of wellbore, such as, for example, vertical wellbores, slant wellbores, horizontal wellbores, curved wellbores, or combinations of these and others.

The fracture treatment can be applied by an injection system that includes, for example, instrument trucks, pump trucks, an injection treatment control system, and other components. The injection system may apply injection treatments that include, for example, a multi-stage fracturing treatment, a single-stage fracture treatment, a test treatment, a follow-on treatment, a re-fracture treatment, other types of fracture treatments, or a combination of these. The injection system may inject fluid into the formation above, at or below a fracture initiation pressure for the formation; above, at or below a fracture closure pressure for the formation; or at another fluid pressure.

In some implementations, the techniques and systems shown in FIGS. 3A-3F can be used for dynamic fracture mapping of created fractures utilizing change in velocity profiles to identify fracture network growth and intensity. The fracture mapping can be used, for example, to determine which perforation clusters have fracture systems initiating from them, the extent of fracture propagation from each perforation cluster, or other information.

In some cases, the techniques and systems shown in FIGS. 3A-3F allow detailed evaluation of completion efficiency and perforation spacing along a wellbore, for example, to help create improved or optimized solutions for perforation spacing based upon actual fracture growth observations. In some implementations, fracture mapping analysis can be performed before and after fractures have time to close or contract, and such analysis can identify which fractures are propped or un-propped, for example, based on changes in fracture width over time.

In some cases, the techniques and systems shown in FIGS. 3A-3F can be used to track fluid flow in a subterranean region. For example, the seismic data can be analyzed to identify the location of a fluid front, to estimate fluid density or other fluid properties, or to otherwise observe the location of fluids in the subterranean formation; and fluid movement or migration can be identified based on changes in the seismic data over time, for example, by time-lapse analysis or other techniques. The seismic data can be acquired using live acoustic sources (e.g., a pressure minigun, perforation charges, etc.), passive acoustic sources (e.g., microseismic or energy imaging data), or both. In some cases, the seismic data can be analyzed in real time, for example, to identify fluid movement during the fracture treatment.

In the example shown in FIGS. 3A-3F, the fracture treatment is a multi-stage fracture treatment, which is applied in stages at a series of injection locations $312a$, $312b$, $312c$, $312d$, $312e$, $312f$, $312g$, $312h$, $312i$, $312j$, $312k$, $312l$. The injection locations shown in FIGS. 3A-3F are formed by perforation clusters at the respective locations. In the example shown, the fracture treatment includes six stages, and each stage includes two of the injection locations (formed by two perforation clusters in each respective stage). Generally, a multi-stage fracture treatment can include a different number of stages (e.g., from two stages, up to tens of stages, or more) in one or more wellbores, and each stage can include any number of injection locations (e.g., one, two, three, four or more injection locations).

Figure 3A:
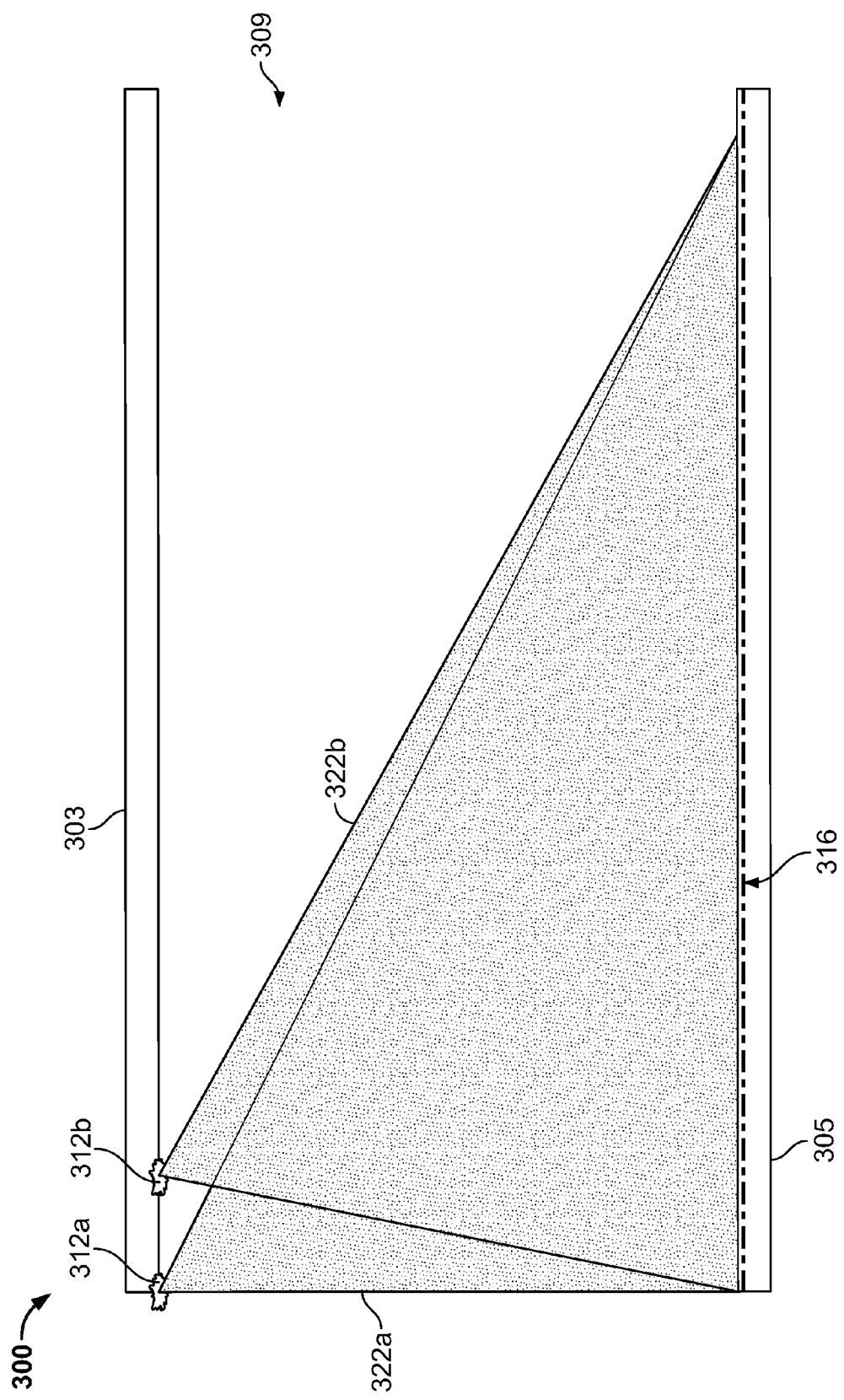

FIG. 3A shows example operations in a first stage of the example multi-stage fracture treatment. In the example shown, the wall of the first wellbore 303 is perforated at the first and second injection locations $312a$, $312b$, and the perforating action generates a seismic excitation in the subterranean region 300. The perforation can be performed, for example, by perforation charges, perforation guns, or other types of perforating equipment. The perforations can be performed concurrently or at distinct times (e.g., seconds, minutes, or hours apart).

In the example shown in FIG. 3A, the first and second injection locations $312a$, $312b$ are axially spaced apart from each other. The injection locations within a stage of a multi-stage fracture treatment may be located at one or more axial positions along the axis of the wellbore, at one or more azimuthal positions about the circumference of the wellbore, or a combination of different axial and azimuthal positions. In some cases, each stage of the injection treatment is performed in a respective completion interval of the first wellbore 303; for example, the completion intervals can be separated by seals, packers, or other structures in the wellbore 303. The first and second injection locations $312a$, $312b$ may reside in the same completion interval or in distinct intervals or other sections of the wellbore 303.

As shown in FIG. 3A, the seismic excitations generated by perforating the wellbore 303 at the first and second injection locations $312a$, $312b$ propagate through the region of interest 309 to the second wellbore 305. In some implementations, another type of seismic source (e.g., an air gun, etc.) can be used at one or more of the injection locations or at other seismic source locations. As such, in some cases, some or all of the seismic source locations do not coincide with a perforation cluster or an injection location, as they do in the examples shown in FIGS. 3A-3F.

The seismic responses detected by the seismic sensor array 316 can include seismic waves that are initially generated in the first wellbore 303, and then propagated (or reflected) through the subterranean region 300 to the second wellbore 305. The seismic waves are typically modified (e.g., attenuated, phase-shifted, etc.) as they are propagated or reflected in the subterranean region 300.

In the example shown in FIG. 3A, the first shaded region 322a represents a region traversed by seismic excitations from the first injection location 312a to the seismic sensor array 316; the second shaded region 322b represents a region traversed by seismic excitations from the second injection location 312b to the seismic sensor array 316. The shaded regions 322a, 322b are distinct, overlapping regions that cover at least a portion of the region of interest 309.

The series of seismic source locations in the first wellbore 303 can be used to produce a time-sequence of seismic responses, which can be used to identify changes in the region of interest 309 over time. In the example shown, the seismic excitations generated at the first and second injection locations 312a, 312b can provide seismic data for one or more initial time points in a seismic profiling time-sequence. The seismic data for the initial time points can be used, for example, to construct an initial seismic velocity profile, an initial seismic image, or other initial seismic data for the first and second shaded regions 322a, 322b. Seismic excitations at the other injection locations 312c, 312d, 312e, 312f, 312g, 312h, 312i, 312j, 312k, 312l can provide seismic data for subsequent time points in the seismic profiling time-sequence.

Figure 3B:
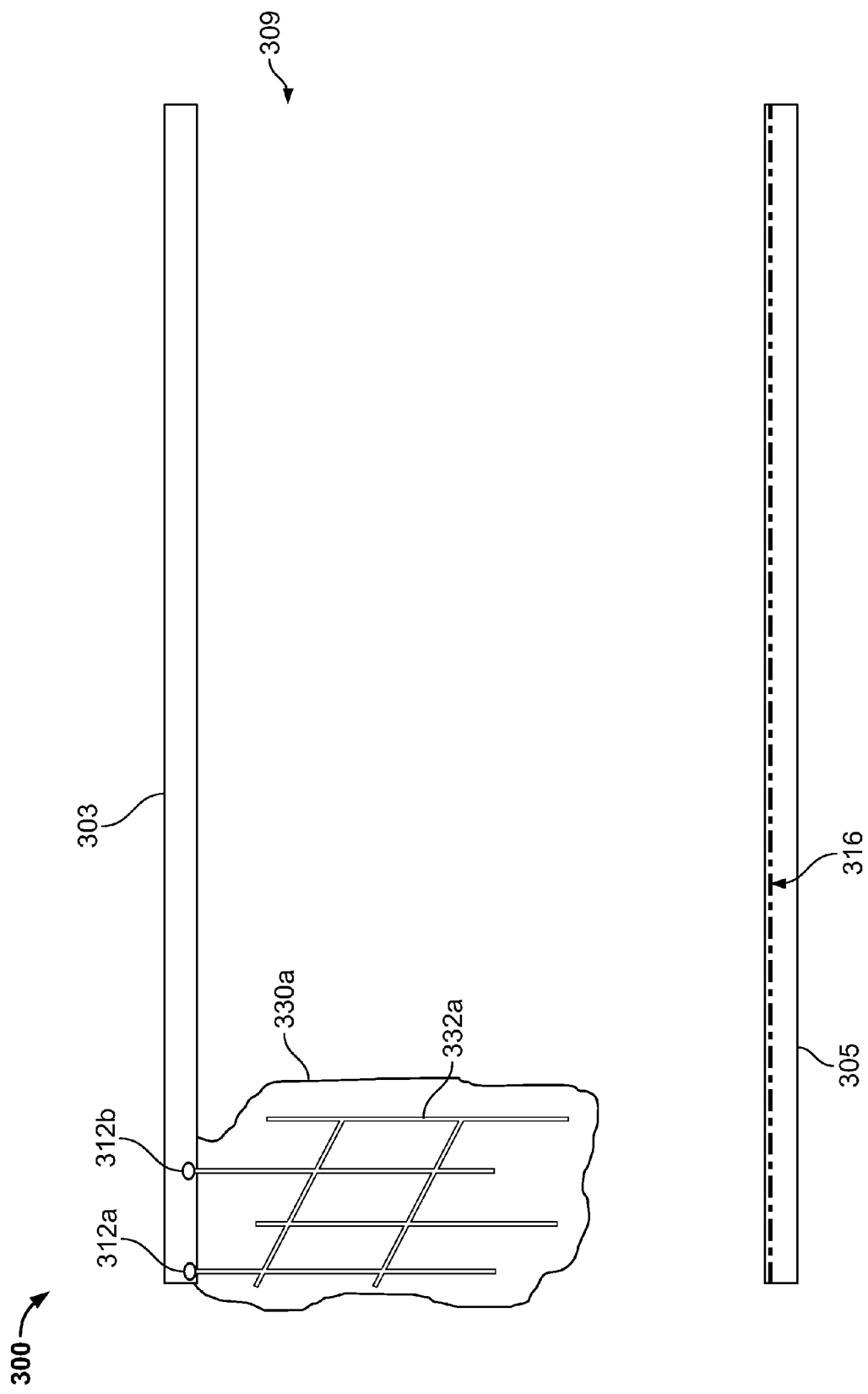

FIG. 3B shows an example of a stimulated region 330a and fractures 332a associated with the first stage of the multi-stage fracture treatment. As shown in this example, the process of hydraulic fracturing can create a pattern of fluid-filled fractures 332a and a stimulated region 330a around the fractures, where the stress and other properties are altered due to deformation and fluid invasion. The fractures 332a can include fractures of any type, number, length, shape, geometry or aperture. The fractures 332a can extend in any direction or orientation, and they may be formed over one or more periods of fluid injection. In some cases, the fractures 332a include one or more dominant fractures, which may extend through naturally fractured rock, regions of un-fractured rock, or both.

During the first stage of the fracture treatment, fracture fluid can flow from the wellbore through the injection locations 312a, 312b. The injected fluid can flow into dominant fractures, the rock matrix, natural fracture networks, or in other locations in the subterranean region 300. The pressure of the injected fluid can, in some instances, initiate new fractures, dilate or propagate natural fractures or other pre-existing fractures, or cause other changes in the rock formation. In the example shown in FIG. 3B, the fractures 332a conduct fluid from the wellbore 303, and the high-pressure fluid invades the rock matrix about the fractures 332a; the high-pressure fluid in the rock matrix increases pore pressure in the stimulated region 330a surrounding the fractures 332a. The fracture growth and increased pore pressure can, in some cases, alter stresses and other geomechanical conditions in the stimulated region 330a.

FIG. 3C shows example operations in a second stage of the example multi-stage fracture treatment. In the example shown, the wall of the first wellbore 303 is perforated at the third and fourth injection locations 312c, 312d, and the perforating action generates seismic excitations in the subterranean region 300. The seismic excitations in the second stage can be generated as in the first stage (shown in FIG. 3A) or in another manner.

As shown in FIG. 3C, the seismic excitations propagate from the third and fourth injection locations 312c, 312d, through the region of interest 309 to the second wellbore 305. The third and fourth shaded regions 322c, 322d represent the regions traversed by seismic excitations from the third and fourth injection locations 312c, 312d, respectively. The seismic excitations generated at the third and fourth injection locations 312c, 312d can provide seismic data for additional initial time points in the seismic profiling time-sequence. The seismic data can be used, for example, to construct a seismic velocity profile, a seismic image, or other seismic data for the shaded regions 322c, 322d.

The seismic data associated with the third and fourth injection locations 312c, 312d can provide information on changes that have occurred in the region of interest 309, with respect to the earlier time points in the seismic profiling time-sequence. As shown in FIG. 3C, the shaded regions 322c, 322d overlap a portion of the fractures 332a and the stimulated region 330a associated with the first stage of the fracture treatment. Accordingly, in some instances, the seismic data associated with the shaded regions 322c, 322d can indicate properties of the fractures 332a (e.g., size, shape, location, etc.), properties of the stimulated region 330a (e.g., pore pressure, stress, etc.), and other information.

In some implementations, the seismic data are used along with other types of data to identify the locations of fractures, stimulated reservoir volume, and other information. For example, the seismic data from the shaded regions 322a, 322b, 322c, 322d can be used along with microseismic data, injection pressure data, and other information collected during the first stage of the fracture treatment.

Figure 3D:
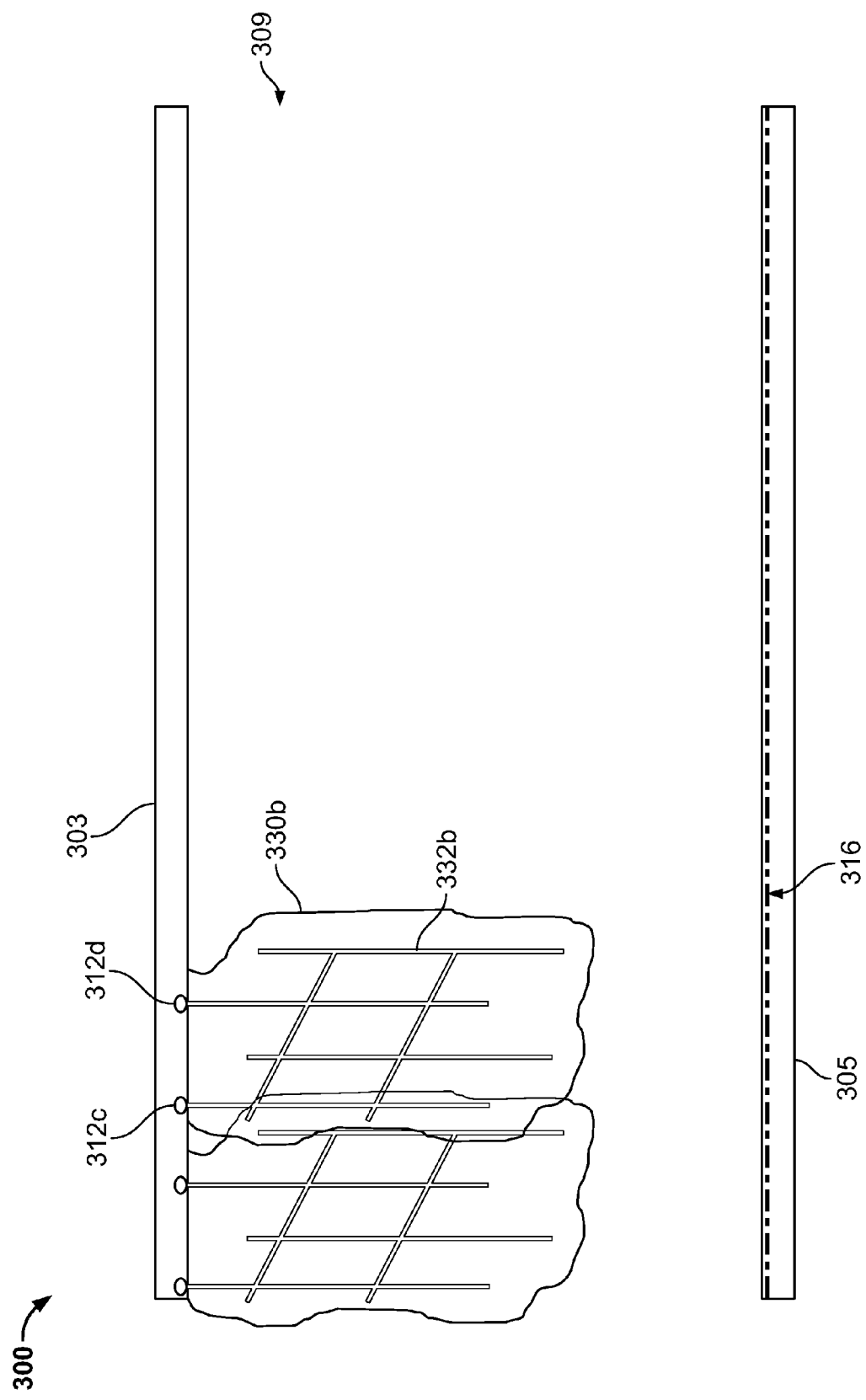

FIG. 3D shows an example of a stimulated region 330b and fractures 332b associated with the second stage of the multi-stage fracture treatment. The stimulated region 330b and the fractures 332b associated with the second stage are different from the stimulated region 330a and fractures 332a associated with the first stage. For example, the fractures and the stimulated regions associated with each stage may have a distinct size, shape, orientation, and other properties. In some cases, the fractures formed during one stage intersect the fractures formed during another stage, or the volumes stimulated by two different stages may overlap.

Figure 3E:
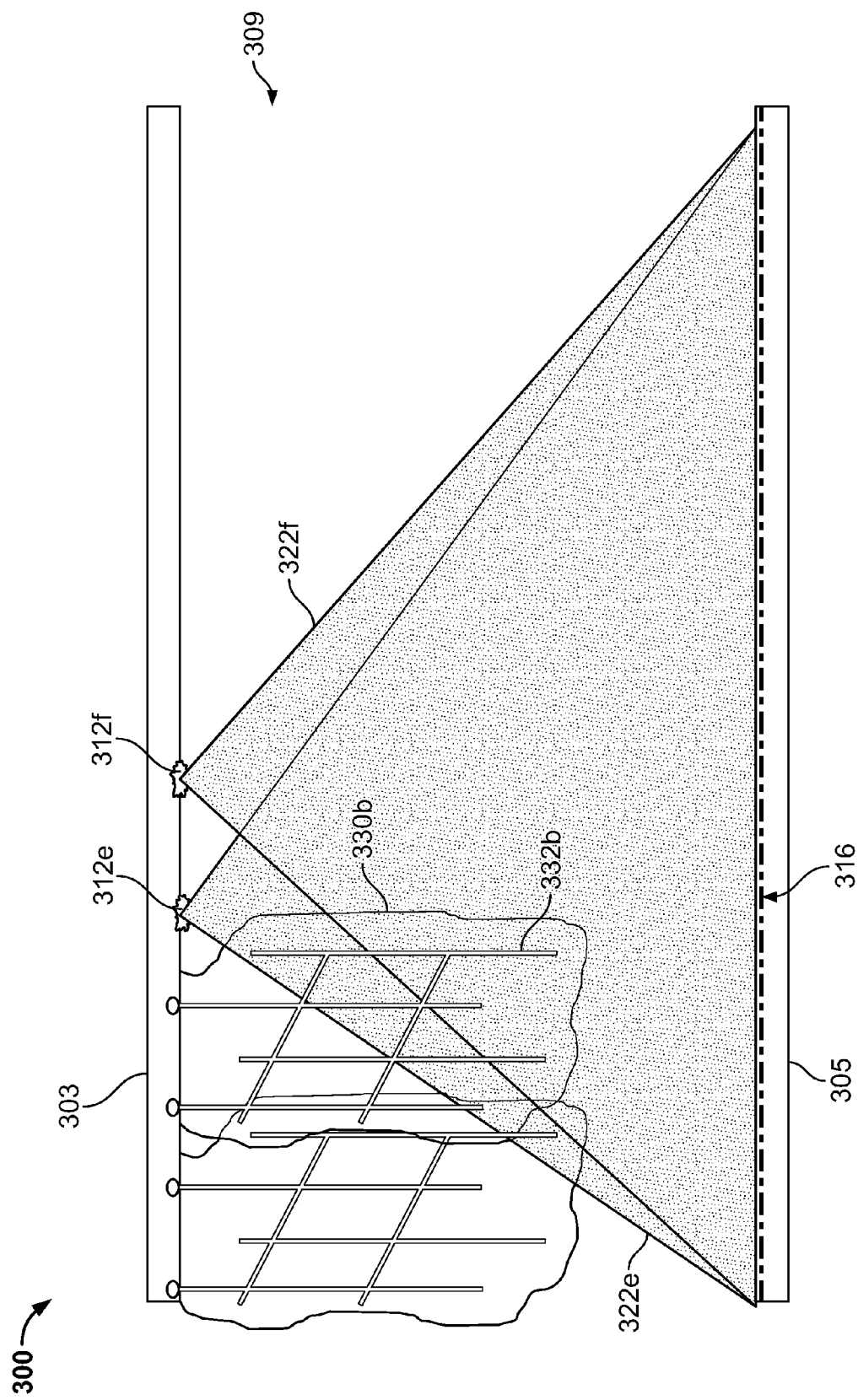

FIG. 3E shows example operations in a third stage of the example multi-stage fracture treatment. In the example shown, the wall of the first wellbore 303 is perforated at the fifth and sixth injection locations 312e, 312f, and the perforating action generates seismic excitations in the subterranean region 300. The seismic excitations in the third stage can be generated as the seismic excitations in the first and second stages (shown in FIGS. 3A, 3C) or in another manner.

As shown in FIG. 3E, the seismic excitations propagate from the fifth and sixth injection locations 312e, 312f, through the region of interest 309 to the second wellbore 305. The fifth and sixth shaded regions 322e, 322f represent the regions traversed by seismic excitations from the fifth and sixth injection locations 312e, 312f, respectively. The seismic excitations generated at the fifth and sixth injection locations 312e, 312f can provide seismic data for additional time points in the seismic profiling time-sequence. The seismic data for the fifth and sixth shaded regions 322e, 322f can be analyzed, for example, as the seismic data for the shaded regions 322c, 322d or in another manner. For example, the seismic data associated with the shaded regions 322e, 322f can indicate properties of the fractures 332a, 332b associated with earlier stages of the fracture treatment, properties of the stimulated regions 330a, 330b associated with earlier stages of the fracture treatment, and other information.

Figure 3F:
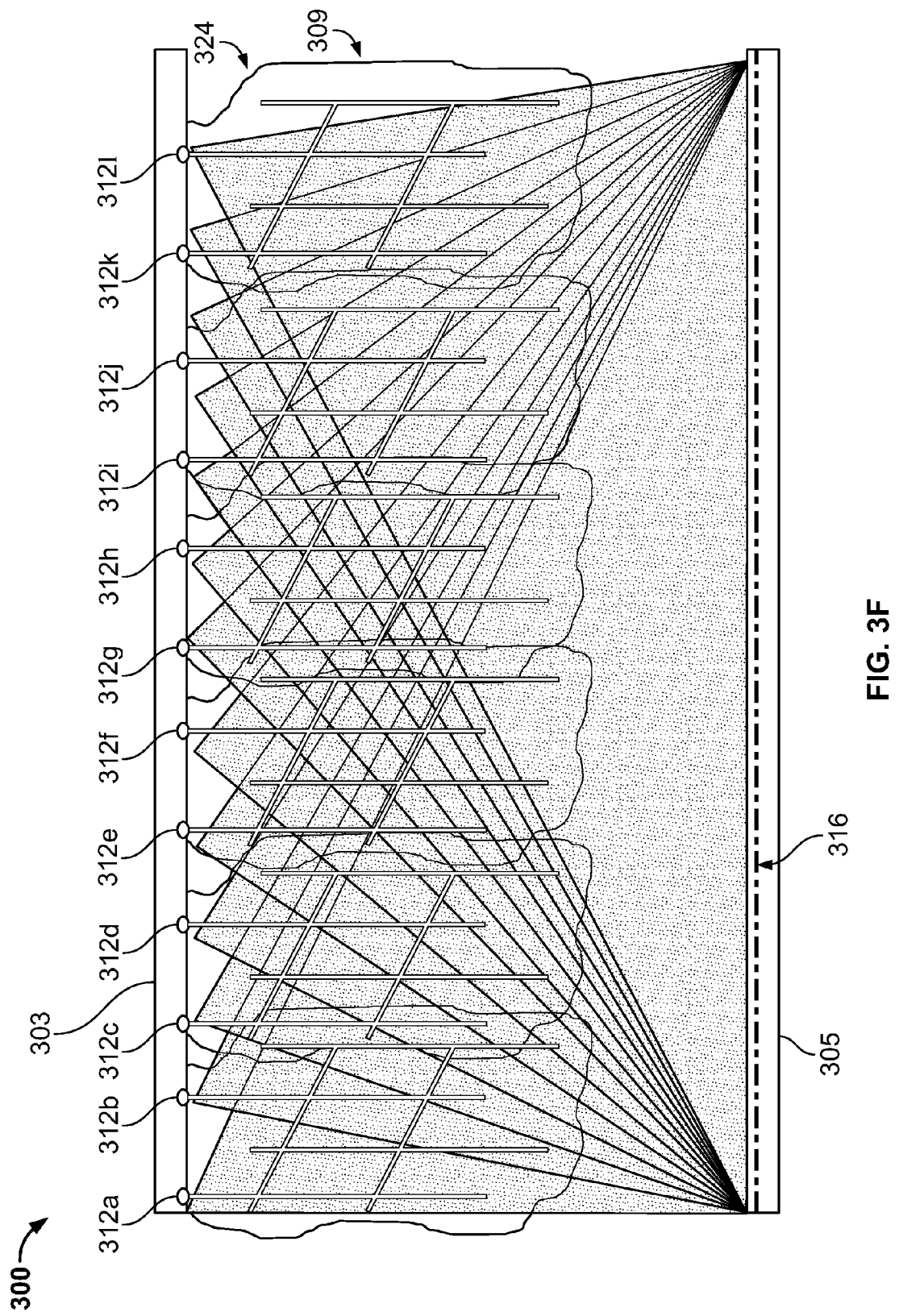

The seismic profiling process shown in FIGS. 3A-3E can proceed in subsequent stages of the fracture treatment, based on seismic excitations generated at additional seismic source locations (e.g., the injection locations 312g, 312h, 312i, 312j, 312k, 312l). As shown in FIG. 3F, the seismic excitations at the series of injection locations can be used to produce response data for a series of distinct, overlapping regions 324. The response data detected by the seismic sensor array 316 can form a time-sequence that collectively covers a significant portion (e.g., substantially all of) the region of interest 309. The response data can be used, for example, to construct seismic velocity profiles for the series of overlapping regions 324, which can provide thorough, detailed coverage of the region of interest 309.

In some cases, recording the seismic information for the perforations from each stage of the fracture treatment provides seismic data that can be used to map a significant volume of the fractured rock. Mapping the subterranean region can provide an understanding of the stimulated volume and the fracture intensity within the stimulated volume. This information can then be used, for example, to optimize or otherwise enhance future fracture treatments or other completion attributes, production planning, computer models and modeling parameters, and other well system activities.

In the example shown in FIGS. 3A-3F, the stages of the fracture treatment are performed in order along the axial dimension of the wellbore 303. In some implementations, the stages are performed in another order. For example, the second stage can be performed at the injection locations 312e, 312f, and the third stage (or any subsequent stage) can be performed at the injection locations 312c, 312d (between the first and second stages). The seismic excitations associated with each stage can be performed in any order, or multiple seismic excitations can be performed concurrently. In some cases, one or more of the seismic excitations are generated from another wellbore (other than the first wellbore 303) or another wellbore section, from the ground surface above the subterranean region 300, or in another location. Moreover, the fracture treatment can include fluid injection through another wellbore or another wellbore section, and the seismic sensor system can include sensors or a sensor array in another wellbore or another wellbore section.

FIGS. 4A-4D are schematic diagrams showing aspects of seismic data acquisition in connection with a fracture treatment in a subterranean region 400. Some aspects of the example fracture treatment shown in FIGS. 4A-4D are similar to the multi-stage fracture treatment shown in FIGS. 3A-3F. For example, the fracture treatment is applied to a region of interest 409 between two wellbores 403, 405, and the fracture treatment includes multiple stages of fluid injection through injection locations in the wellbore 403.

In the example shown in FIGS. 4A-4D, both wellbores 403, 405 are used for injection, and seismic sensor arrays are installed in both wellbores 403, 405, and the stages of the fracture treatment alternate between the wellbores 403, 405. The seismic sensor array 416a in the second wellbore 405 detects seismic responses to the seismic excitations generated in the first wellbore 403; and the seismic sensor array 416b in the first wellbore 403 detects seismic responses to the seismic excitations generated in the second wellbore 405.

Figure 4A:
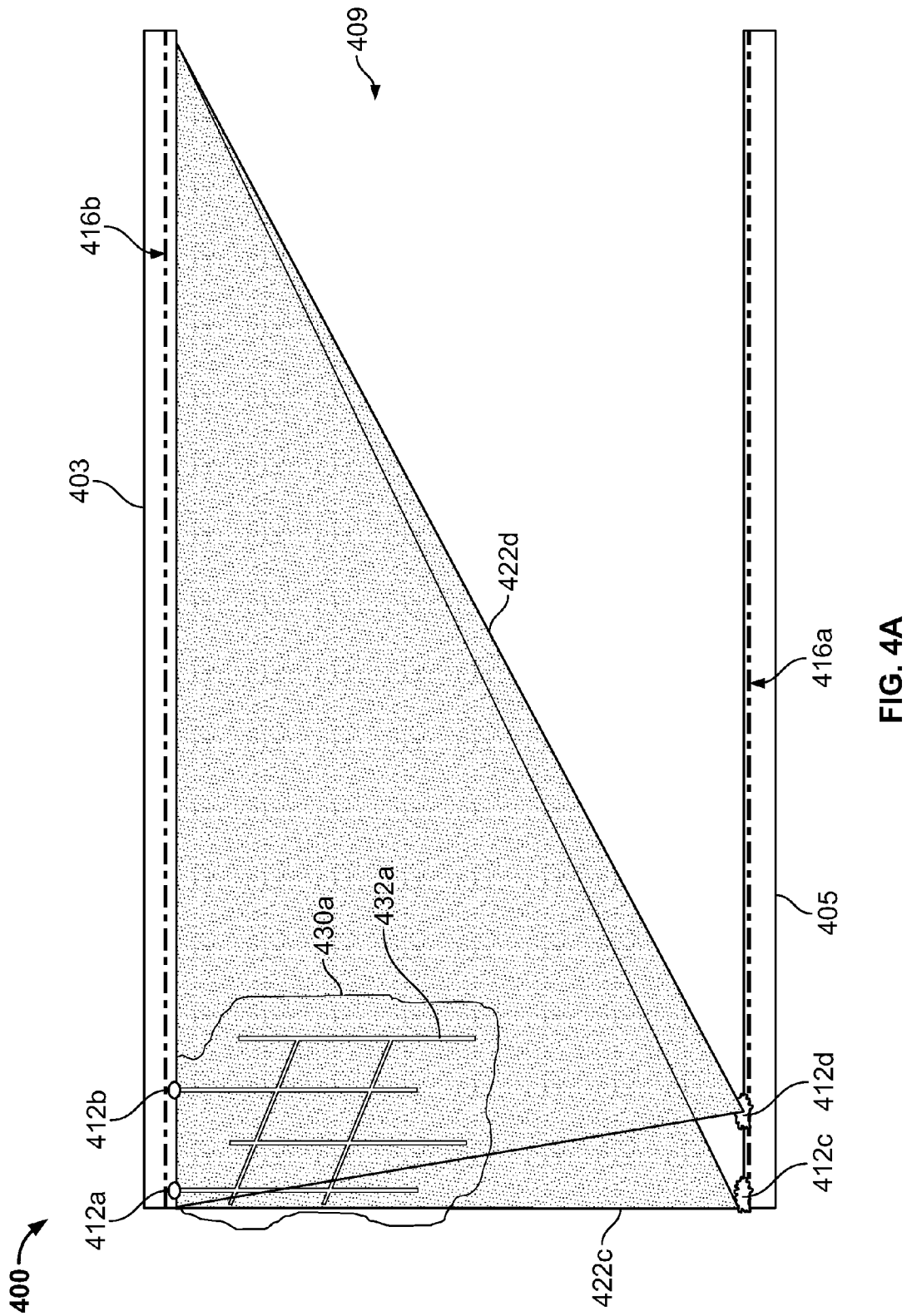

FIG. 4A shows operations in a second stage of an example zipper-frac fracture treatment that alternates stages between the wellbores 403, 405. In the example shown, the second stage is applied through the second wellbore 405, after the first stage has been applied through the first wellbore 403. The first and second stages can be performed as shown in FIGS. 3A and 3B. For example, in the first stage, seismic excitations are generated by perforating at the first and second injection locations 412a, 412b in the first wellbore 403, and a seismic response is detected by the sensor array 416a in the second wellbore 405. Fluid injection through the first and second injection locations 412a, 412b produces the fractures 432a in the stimulated region 430a adjacent to the first wellbore 403.

Similarly, in the second stage (as shown in FIG. 4A), seismic excitations are generated by perforating at the third and fourth injection locations 412c, 412d in the second wellbore 405, and a seismic response is detected by the sensor array 416b in the first wellbore 405. The third and fourth shaded regions 422c, 422d represent regions traversed by seismic excitations from the third and fourth injection locations 412c, 412d, respectively. The seismic excitations generated at the third and fourth injection locations 412c, 412d can provide seismic data for a seismic profiling time-sequence. For example, the seismic data associated with the shaded regions 422c, 422d can be analyzed to identify properties of the fractures 432a and the stimulated region 430a associated with the first stage of the zipper-frac fracture treatment.

Figure 4C:
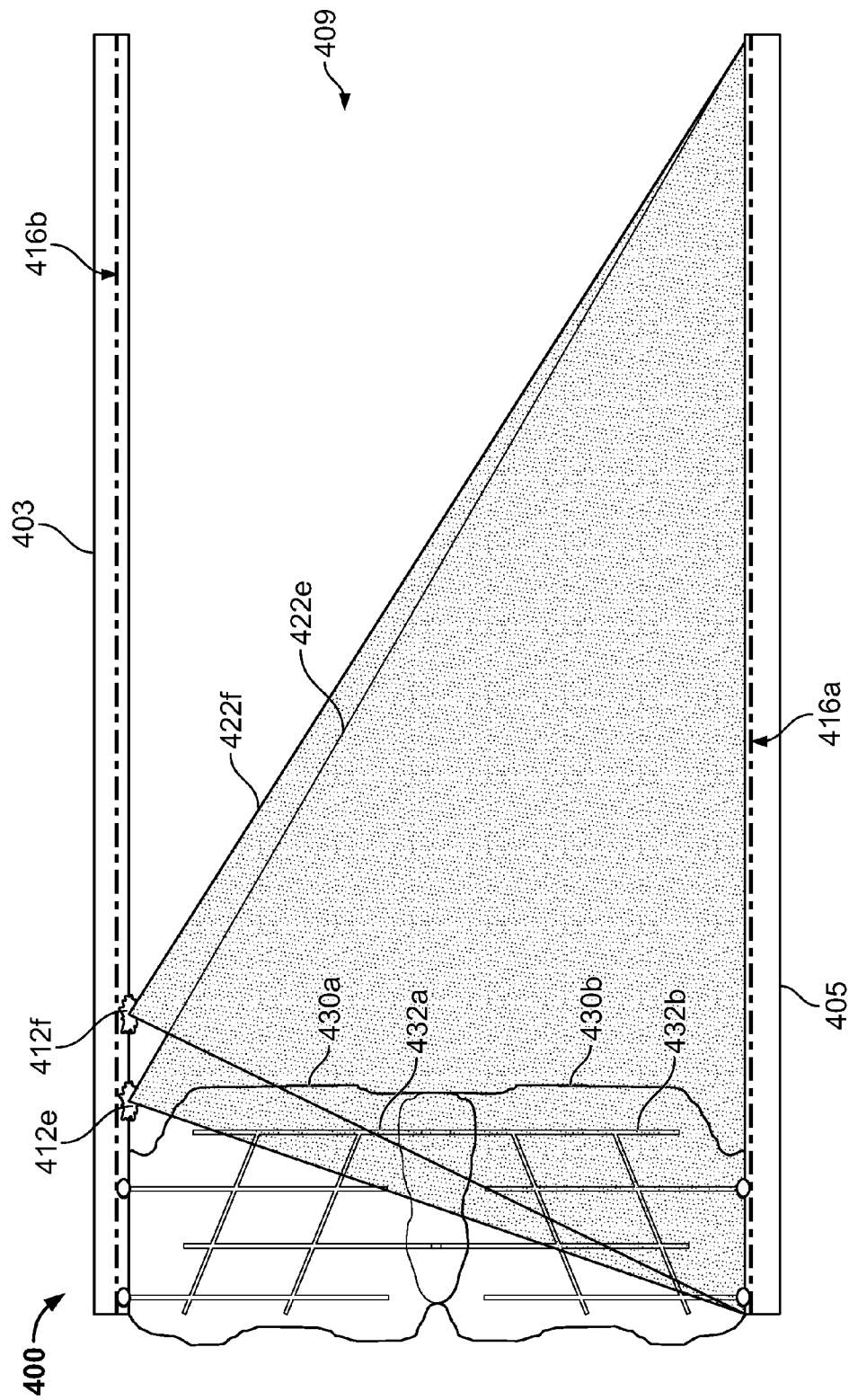

As shown in FIG. 4B, fluid injection through the third and fourth injection locations 412c, 412d produces fractures 432b in the stimulated region 430b adjacent to the second wellbore 405. As shown in FIG. 4C, properties of the fractures 432b and the stimulated region 430b can be analyzed in connection with the third stage of the fracture treatment. In the third stage (as shown in FIG. 4C), seismic excitations are generated by perforating at the fifth and sixth injection locations 412e, 412f in the first wellbore 403, and seismic responses are detected by the sensor array 416a in the second wellbore 405. The fifth and sixth shaded regions 422e, 422f include part of the fractures 432a, 432b and part of the stimulated regions 430a, 430b associated with the earlier stages.

In some implementations, reflection monitoring can be used for seismic profiling in the example subterranean region 400, for example, where the seismic source and seismic receiver reside in the same wellbore. For example, each sensor array 416a, 416b can detect reflections of seismic waves from the seismic excitations generated in the same respective wellbore with the sensor array. For example, the sensor array 416b in the wellbore 403 can detect a response to seismic excitations generated at the injection locations 412e, 412f in the wellbore 403. The response can include a seismic reflection from the region of interest 409, and the reflection can be used to analyze the region of interest 409 (e.g., to identify fractures, stimulated volume, mechanical properties, etc.). For example, acoustic reflections from fracture surfaces in the region of interest 409 can be used for fracture mapping. In some cases, seismic reflection monitoring is used in addition to, or instead of, cross-well seismic velocity monitoring. In some cases, seismic reflection monitoring can be performed with seismic sensors or seismic sources in multiple wells (e.g., where the seismic source and seismic receiver reside in different wellbores).

The process illustrated with respect to FIGS. 4A-4C can be continued for any number of subsequent stages in the zipper-frac fracture treatment. Seismic profiling data can be collected at each stage of the fracture treatment, for example, to construct a time-sequence of seismic velocity profiles, seismic reflection profiles, seismic images, or other types of seismic analysis. The time-sequence of seismic data can be used to track the fracture treatment in real time (e.g., during the fracture treatment), to analyze the fracture treatment after completion, to simulate the fracture treatment on a computing system, or for a combination of these and other purposes.

FIG. 4D shows examples of fractures and stimulated regions after the example zipper-frac fracture treatment has been applied to the region of interest 409 along both wellbores 403, 405. In some instances, passive seismic data (e.g., microseismic data, other acoustic information based on passive seismic sources) can be collected during production through the wellbores 403, 405. The passive seismic data can be interpreted alone or in combination with active seismic data or other information, and the interpretation can reveal reservoir drainage, well interference, and other types of phenomena.

Figure 5:
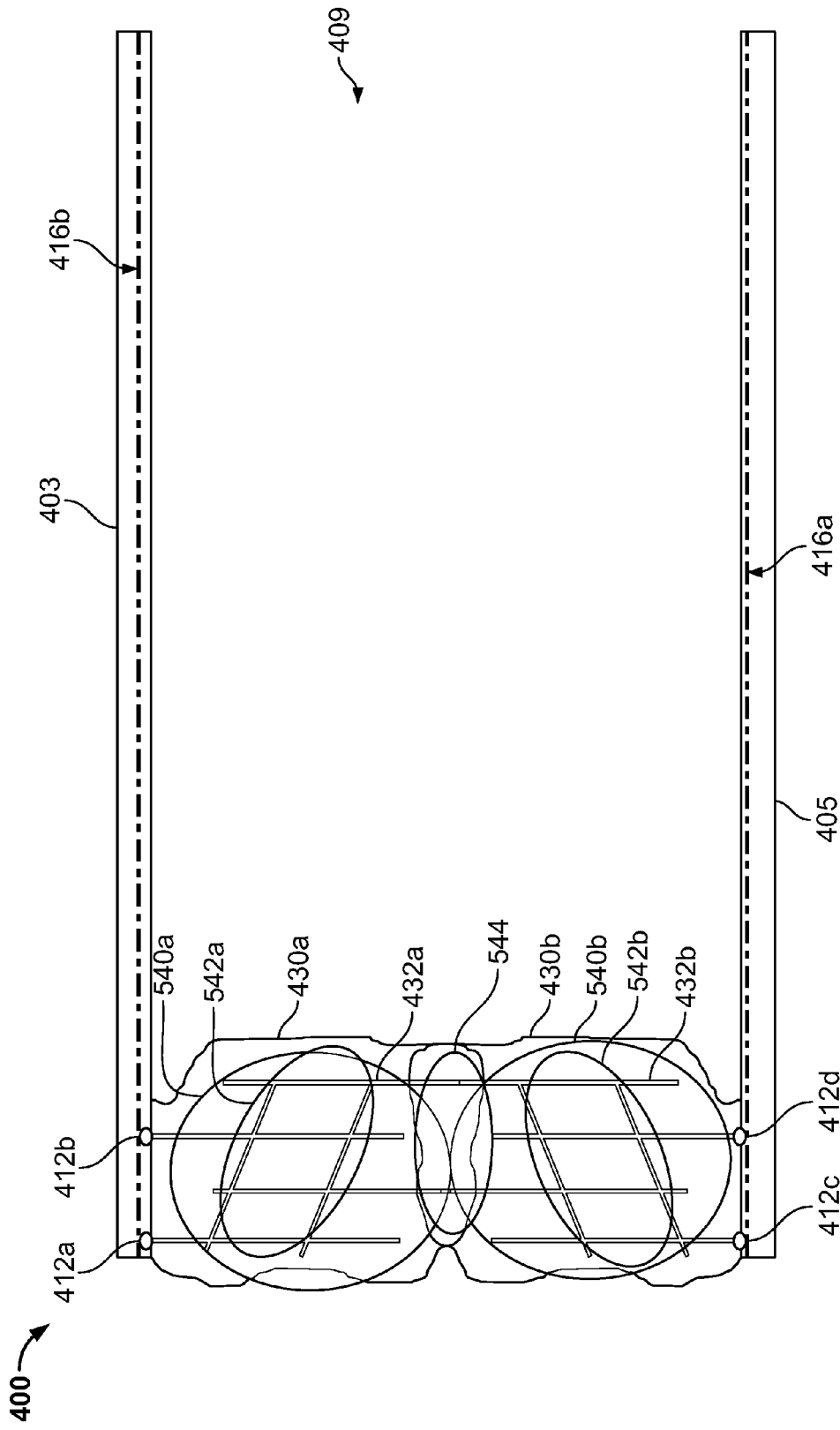
FIG. 5 is a schematic diagram showing example information obtained from the seismic data acquisition shown in FIGS. 4A-4D.

FIG. 5 is a schematic diagram showing example information obtained from the seismic data acquisition shown in FIGS. 4A-4D. In particular, FIG. 5 shows the example subterranean region 400 after the first and second stages of the zipper-frac fracture treatment of the region of interest 409, and the ellipsoids 540a, 540b, 542a, 542b, and 544 superimposed on the diagram represent information extracted from the seismic data. In this example, the ellipsoids 540a, 540b, 542a, 542b, and 544 represent various degrees of fracture intensity identified from seismic data detected by sensor arrays 416a, 416b based on the seismic excitations at the first, second, third, and fourth injection locations 412a, 412b, 412c, 412d in the respective first and second wellbores 403, 405.

In some cases, the example information shown in FIG. 5 can be obtained based on seismic energy imaging, or other types of data analysis. In some implementations, seismic energy imaging techniques are used to visualize fracture intensity within a stimulated volume around the wellbore. Seismic energy imaging techniques can be used with active sources, passive sources (e.g., shear events and microseismic activity) for fracture mapping or other applications. In some cases, active and passive monitoring can be combined. Mapping energy from seismic reflections and seismic velocity profiles can be used to identify areas of more intense fracturing and fluid invasion. Such information can provide insight on the stimulated volume and the fracture intensity, which can be used, for example, to define inputs in a reservoir simulation tool to predict or match resource production.

In the example shown in FIG. 5, the two largest ellipsoids 540a, 540b indicate regions of lower fracture intensity within the respective stimulated regions 430a, 430b; the two medium-sized ellipsoids 542a, 542b indicate regions of highest fracture intensity within the respective stimulated regions 430a, 430b; and the smaller ellipsoid 544 indicates a region of intermediate fracture intensity at an overlap between the stimulated regions 430a, 430b. In this example, the fracture intensity indicates the degree to which the rock has been fractured by the fracture treatment.

The relative fracture intensities shown in FIG. 5 can be identified, for example, based on a seismic velocity model of the region of interest 409. In some cases, spatial variations in the seismic velocity model indicate spatial variations in fracture intensity. The fracture intensity within a reservoir medium often correlates with the fracture conductivity of the medium. For example, subterranean rock having higher fracture intensity will typically be more conductive than subterranean rock having lower fracture intensity.

In some instances, the spatial variations in fracture conductivity identified from energy imaging or other analysis techniques can be used to calibrate a reservoir model. For example, the conductivity layers in a reservoir model can be defined and manipulated at higher resolution to reflect the spatial variations in fracture conductivity induced by the fracture treatment. For example, the fracture conductivity data can be used by the example reservoir simulator 952 in FIG. 9B, or the fracture conductivity data can be used in another manner.

FIG. 6A is a schematic diagram of another example subterranean region 600. The example subterranean region 600 includes multiple subsurface layers 610, 612, 614, 616, with an array of horizontal wellbores 620 defined in each of the layers. The subterranean region 600 can include additional subsurface layers (e.g., layers above, below, or between the layers shown), additional wellbores (e.g., wellbores defined in one or more of the layers shown or in other layers), and other features, and the wellbores can be arranged as shown in the figure or in another manner.

In some cases, the subterranean region 600 includes vertical, slanted, curved, or other types of wellbores or wellbore sections. The subterranean region 600 may include one or more multilateral wells. For example, two or more of the horizontal wellbores 620 can be implemented as branches from a common vertical wellbore. In some implementations, each horizontal wellbore 620 extends from a respective vertical wellbore that does not include any other substantial branches or horizontal components.

In some instances, one or more of the wellbores 620 shown in FIG. 6A can be used for seismic profiling. For example, two or more of the wellbores 620 shown in FIG. 6A may be used to implement the systems and techniques shown and described with respect to the first and second wellbores 102, 104 in FIG. 1. For instance, one or more of the wellbores 620 can operate as a source well, and one or more of the wellbores 620 can operate as a receiver well.

The subterranean region 600 can include multiple receiver wells, multiple source wells, or both. For example, one or more of the wellbores 620 in each of the layers 610, 612, 614, 616 may include a seismic sensor array, and the other wellbores may include a seismic source array. In some cases, one of the wellbores 620 serves as a receiver well for all seismic sources or a subset of seismic sources associated with the subterranean region 600 (which may include seismic sources in some or all of the wellbores 620, at the ground surface above the subterranean region 600, etc.).

In some implementations, one or more of the wellbores 620 is used for seismic reflection monitoring. For example, a wellbore can include an acoustic source and a fiber optic DAS system to detect seismic reflections from the subterranean region 600. In some cases, the sensor array can detect reflections based on seismic excitations generated in the same well as the sensor array, or in a different well. The reflective monitoring can be used to identify fractures in the subterranean region 600, to identify fluid or mechanical properties in the subterranean region 600, to identify the boundaries of one or more subsurface layers 610, 612, 614, 616, or for a combination of these and other types of analysis. For example, acoustic reflections from fracture surfaces may be used to map fractures within a reservoir, and reflections from different subsurface layers may be used to map the surface layers above or below a target reservoir.

In some cases, two or more of the wellbores 620 serve as receiver wells for an individual seismic source or source well. In some implementations, one seismic source can be captured by multiple wells deployed with geophones or distributed acoustic monitoring to capture reservoir information over a larger area. Seismic sources can be located, for example, in the subsurface layers along one of the wellbores 620, on the ground surface, or at multiple locations.

One or more of the wellbores 620 can be used for other well system operations (e.g., drilling, fracturing or other injection treatments, production, observation, etc.) in addition to, or instead of, seismic profiling activities. For example, one or more of the wellbores 620 can be used for detecting seismic data while one or more of the other wellbores is used for performing fracture treatments, for producing resources to the surface, or for other types of well system activities. In some implementations, two or more of the wellbores 620 shown in FIG. 6A are used to implement the techniques shown and described with respect to the horizontal wellbores (303, 305, 403, 405) shown in FIGS. 3A-3F, 4A-4D and 5. In some cases, such techniques are used to collect detailed reservoir information around multiple treatment wells in the subterranean region 600.

In some instances, a series of acoustic sources are fired at multiple, distinct locations in the subterranean region 600 to increase seismic coverage of the area between and around the wellbores 620. For example, in a completion program or fracture mapping application, the stimulated volume, well spacing and completion effectiveness can be mapped and assessed over a broad scale. As another example, in production monitoring applications, seismic data collected over the life of the reservoir can be used to identify reservoir fluid movement and depletion over time, and this information can be used to assess completion effectiveness, well spacing, infill drilling opportunities, and other aspects of the well system.

In some instances, the seismic profiling data can be used to track movement of a fluid front through the subterranean region 600 over time. The fluid front can be the interface between regions of distinct fluid content in the subterranean region 600. The fluids can include liquids, gases, or multiphase fluids. As an example, in a fracture treatment, the fluid front can represent the interface between the injected fracturing fluid and the native reservoir fluids (e.g., natural gas, water, oil). As another example, in a production context, the fluid front can represent the interface between hydrocarbon fluids and brine, or between hydrocarbon fluids and a treatment fluid, etc.

The orientation and spacing of the horizontal wellbores 620 can be adapted for various applications and environments. For example, the orientation and spacing of the wellbores 620 can be determined based on the lithology and orientation of the subsurface layer in which the wellbore is defined, the lithology and orientation of other subsurface layers, the type of completion or treatment planned for the wellbore, the fluid content of the subterranean region, or a combination of these and other considerations. In some examples, the spacing between adjacent wellbores in the same layer can range from approximately 500 feet (or smaller) to 5,000 feet (or larger). In some examples, the spacing between wellbores in adjacent layers can range from approximately 50 feet (or smaller) to 5,000 feet (or larger).

Figure 6B:
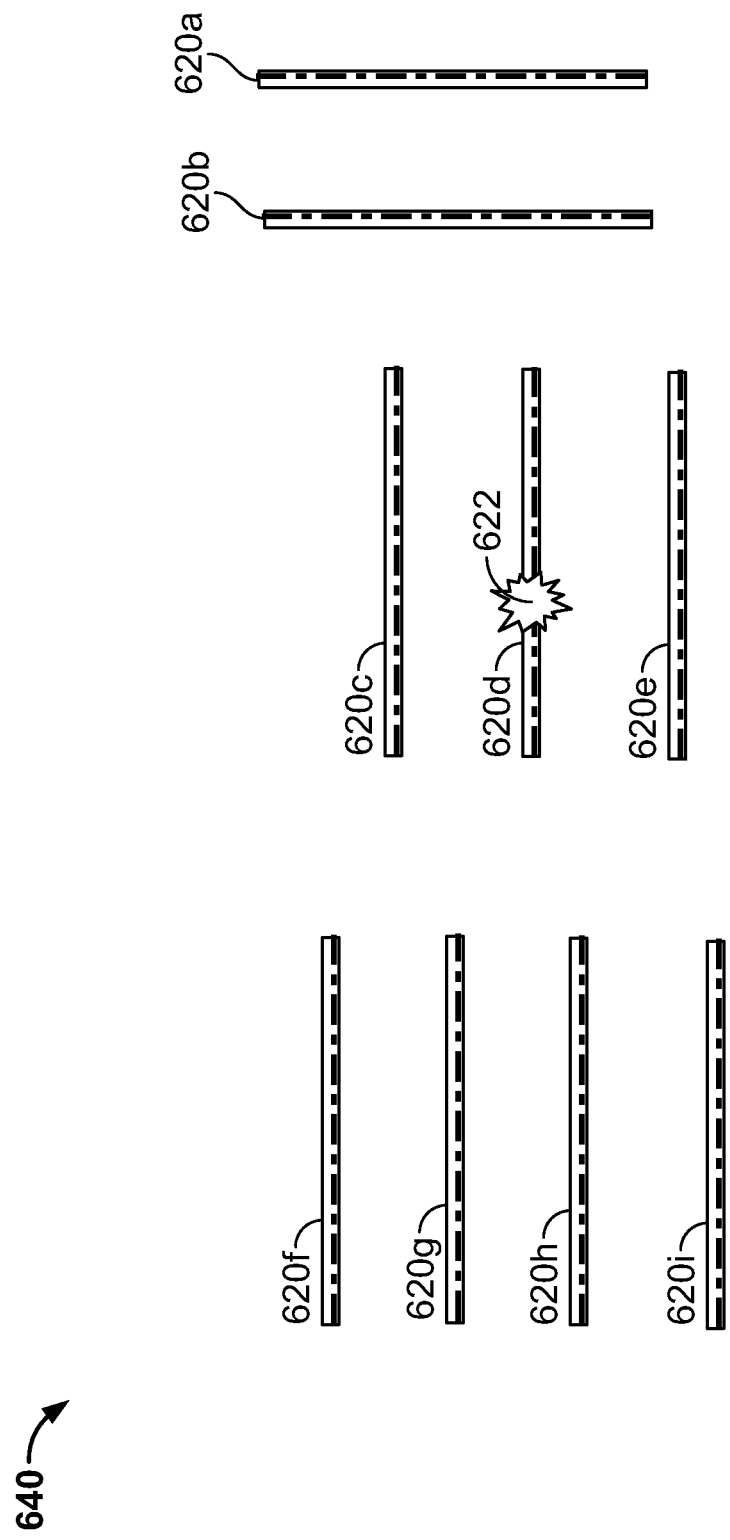

FIG. 6B is a schematic diagram of another example subterranean region 640. The example subterranean region 640 includes nine horizontal wellbore sections 620a, 620b, 620c, 620d, 620e, 620f, 620g, 620h, 620i. The horizontal wellbore sections shown in FIGS. 6B-6D can be an array of horizontal wellbores in a single subsurface layer or in multiple different subsurface layers. For example, the example wellbores 620 shown in FIG. 6A can include some or all of the parallel horizontal wellbore sections (620c, 620d, 620e, 620f, 620g, 620h, 620i) shown in FIGS. 6B-6D. Two of the horizontal wellbore sections (620a, 620b) shown in FIGS. 6B-6D are oriented perpendicular to the other example wellbore sections shown.

As shown in FIG. 6B, a seismic excitation 622 is generated in one of the wellbores, and all of the horizontal wellbore sections shown include a respective seismic sensor array. For example, each of the horizontal wellbore sections may include a fiber optic DAS system, geophones, or another type of sensor. In the example shown, the seismic sensor arrays in the subterranean region 640 detect a response to the seismic excitation 622. The horizontal wellbore section 620d can detect a response based on a reflection of the seismic excitation 622. FIGS. 6C and 6D show examples of information that can be derived from the seismic data.

Figure 6C:
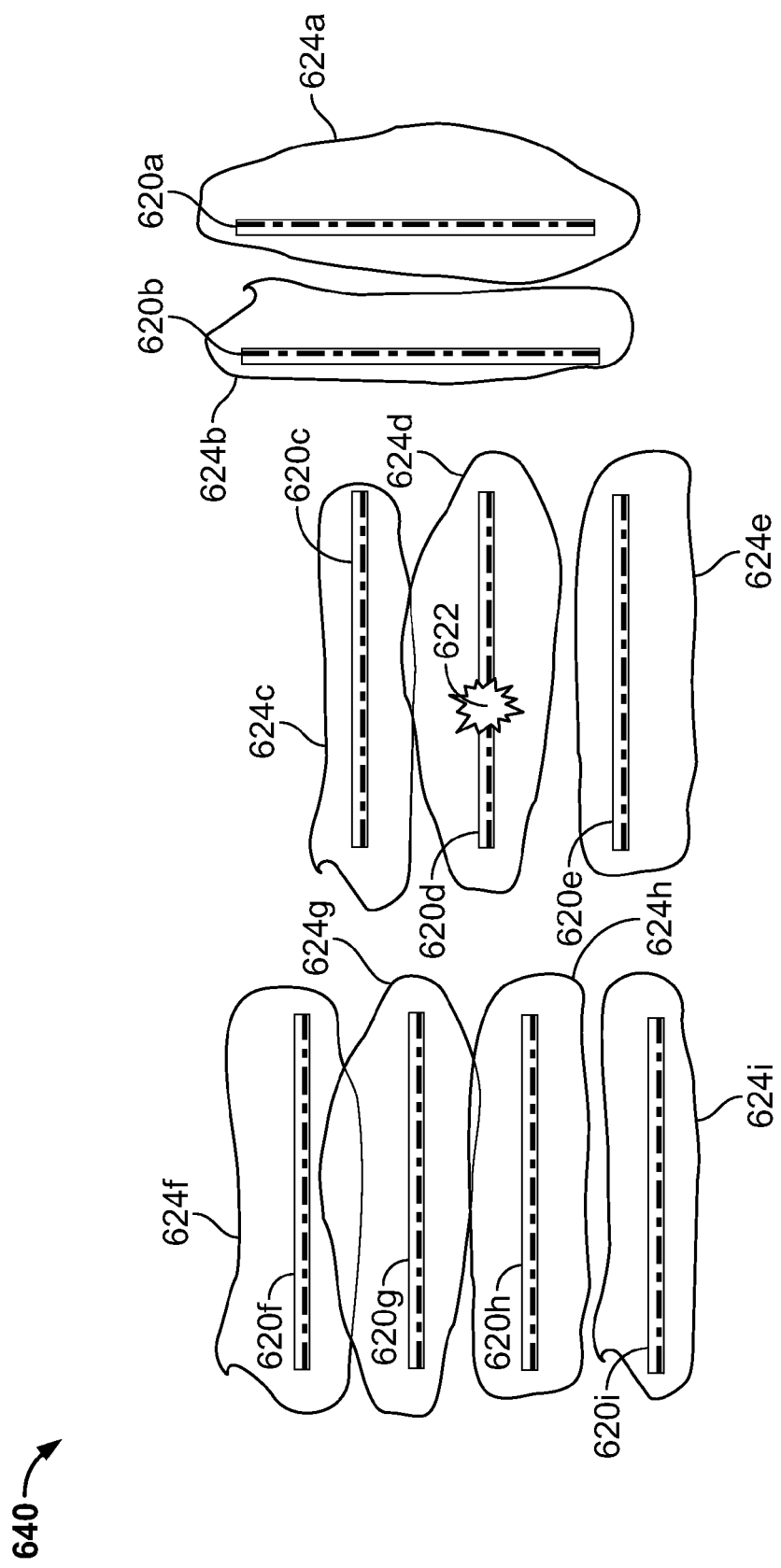
Figure 6D:
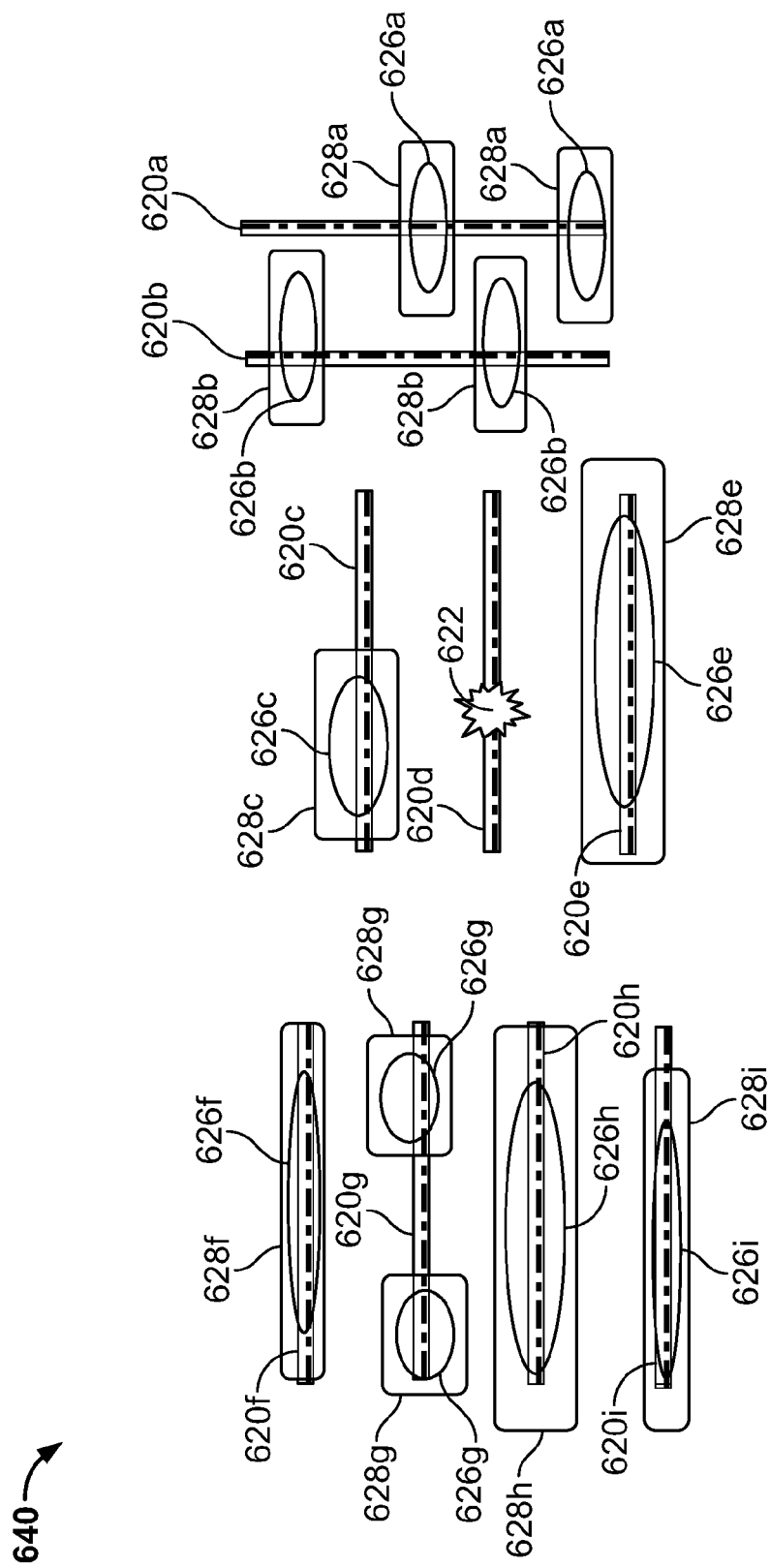

As shown in FIG. 6C, the seismic data are used to identify a stimulated region 624a, 624b, 624c, 624d, 624e, 624f, 624g, 624h, 624i about each respective horizontal wellbore section. For example, each stimulated region may represent an area of affected stress, increased pore pressure, an area of increased fracture intensity, or another type of stimulated area. In some instances, the stimulated regions represent a stimulated reservoir volume affected by one or more fracture treatments applied to the subterranean region. In some cases, the information shown in FIG. 6C can be used to assess the effectiveness of the well system completion or other aspects of the well system.

In some implementations, seismic data are collected for a sequence of time points for time-transient analysis of a fracture treatment, production operations, or other activities. The seismic data can be used to model the subterranean region 640 in three dimensions (i.e., three spatial dimensions), in four dimensions (i.e., three spatial dimensions plus a time dimension), or in another manner. For example, the time-sequence of seismic data can be used to track pore pressure changes, fracture intensity changes, stress changes, and other types of changes in the subterranean region.

As shown in FIG. 6D, the seismic data can be used to identify regions of high pore pressure and regions of high resource production. In the example shown, the larger highlighted regions indicate high-pressure volumes 628a, 628b, 628c, 628e, 628f, 628g, 628h, 628i about each respective horizontal wellbore section. In the high-pressure volumes, the pore pressure is elevated compared to surrounding areas in the subterranean region 640. For example, the high-pressure volume 628e surrounds the entire length of the horizontal wellbore section 620e; and two smaller high-pressure volumes 628b surround respective sub-lengths of the horizontal wellbore section 620b. In some cases, the information shown in FIG. 6C can be used to assess fluid movement in the subterranean region 640.

In the example shown in FIG. 6D, the smaller highlighted regions indicate high-producing volumes 626a, 626b, 626c, 626e, 626f, 626g, 626h, 626i about each respective horizontal wellbore section. The observed resource production from the high-producing volume is elevated compared to surrounding areas in the subterranean region 640. The regions of high-producing volume can be used to identify "hot spots" in a well (e.g., high-production perforations or intervals). For example, the high-production volume 626e surrounds the majority of the length of the horizontal wellbore section 620e, which suggests that several intervals are producing relatively uniformly along the length of the wellbore section 620e; and two smaller high-production volumes 626b surround respective sub-lengths of the horizontal wellbore section 620b, which suggests non-uniform production along the length of the wellbore section 620b.

FIGS. 7A and 7B are schematic diagrams of an example subterranean region 700. The example subterranean region 700 includes multiple subsurface layers 710, 712, 714, 716, and three horizontal wellbores 701, 703, 705. Neighboring subsurface layers meet at respective layer boundaries 720a, 720b, 720c. The subterranean region 700 can include additional subsurface layers (e.g., layers above, below, or between the layers shown), additional wellbores (e.g., wellbores defined in one or more of the layers shown or in other layers), and other features, and the wellbores can be arranged as shown in the figure or in another manner.

In the example shown in FIGS. 7A and 7B, each subsurface layer represents a distinct stratigraphic position in the subterranean region 700. For example, each subsurface layer can have lithographic properties that are substantially uniform within the layer and distinct from adjacent layers. In some instances, a characteristic lithographic property of a subterranean layer includes the type of rock, the porosity of the rock, the fractured density of the rock, the hydrocarbon content of the rock, or other properties of the rock in the subterranean layer.

FIG. 7A shows the first wellbore 701 while it is being drilled, and FIG. 7B shows the first wellbore 701 after drilling has stopped. In particular, in FIG. 7A, a drill string resides in the first wellbore 701; the drill string includes a bottom hole assembly 718 near the bottom hole position in the wellbore 701. The bottom hole assembly 718 can include drill bits, drill collars, or other components adapted to drill the borehole in the subterranean region 700. In some cases, the subterranean region 700 includes vertical, slanted, curved, or other types of wellbores or wellbore sections. The subterranean region 700 may include one or more multilateral wells.

In the example shown in FIGS. 7A and 7B, the second and third wellbores 703, 705 are used for seismic profiling while drilling. For example, the second and third wellbores 703, 705 may be used to implement the systems and techniques shown and described with respect to the first and second wellbores 102, 104 in FIG. 1. One or both of the wellbores 703, 705 can operate as a source well, and one or both of the wellbores 703, 705 can operate as a receiver well. For example, the second wellbore 703 may include a seismic sensor array, and the third wellbore 705 may include a seismic source array. The subterranean region 700 can include one or more additional receiver wells or one or more additional source wells.

As shown in FIG. 7A, a seismic profiling system can be used to identify the location of the wellbore 701 while the wellbore is being drilled. For example, seismic excitations can be generated in the second wellbore 703, and responses can be detected in the third wellbore 705. The seismic profiling data can be collected and analyzed to identify the location of the first wellbore 701 while the drill string resides in the first wellbore 701. In some cases, the seismic profiling data are used for steering the drilling string. For example, the location data can be used to compare the actual wellbore location against a well plan, and correct the drilling direction if necessary. In some instances, the drilling direction can be modified or corrected, for example, when the wellbore is too close to a layer boundary, a fault, another wellbore, etc.

As shown in FIG. 7B, a seismic profiling system can be used to identify the location of the wellbore 701 before, during, or after wellbore completion. The location of the first wellbore 701 can be identified in absolute coordinates (e.g., depth, latitude, longitude), or relative to other structures in the subterranean region 700. For example, the seismic profiling system can identify the location of the first wellbore 701 relative to one or more of the layer boundaries 720a, 720b, 720c, relative to one or both of the wellbores 703, 705, relative to one or more fractures in the subsurface layers 712, 714, or relative to a combination of these and other structural features of the subterranean region 700.

In some cases, a seismic profiling system can be used to identify the locations of the subsurface layer boundaries 720a, 720b, 720c at any point during drilling, fracturing, production, or other well system activities. For example, the subsurface layer boundaries can be identified before or after the first wellbore 701 is drilled, or at any intermediate time. A seismic profiling system can acquire and analyze various types of seismic data to characterize the subterranean region 700. In some cases, transmitted seismic waves, reflected seismic waves, or both, are used to identify the locations of the layer boundaries, the locations of the wellbores, and other structural features in the subterranean region 700.

In the example shown in FIGS. 7A and 7B, the subsurface layers 710, 712, 714, 716 each have a distinct, respective acoustic impedance. The acoustic impedance of a subsurface layer can depend on the stratigraphic properties of the layer, such as, for example, the density, porosity, material composition, or other properties. The example subsurface layers 710, 712, 714, 716 shown in FIGS. 7A and 7B each propagate seismic signals at a distinct seismic velocity, based on the acoustic impedance of the respective subsurface layer. For example, subsurface layers 710, 712 may propagate seismic excitations at different velocities. The subsurface layer boundaries 720a, 720b, 720c can act as reflective surfaces. For example, the degree to which the acoustic impedance changes at an interface can determine the degree to which the interface reflects (instead of transmitting or absorbing) an incident seismic wave. In some cases, a seismic velocity model for the subterranean region 700 can indicate the locations of the subsurface layer boundaries 720a, 720b, 720c.

In some cases, the subterranean region 700 is heterogeneous, and the layer boundaries 720a, 720b, 720c frequently change direction in one or more spatial dimensions. In such instances, seismic profiling data can provide information about the subsurface layers and layer boundaries, for example, to improve stratigraphic well placement within the subterranean region 700. For example, the seismic profiling data may be combined with other information, such as a well survey, to improve the precision or accuracy of well placement. In some cases, seismic profiling data can account for the different rock properties in the stratigraphic layers, including the acoustic velocity, and reflections from the stratigraphic layers, to provide information on the well location within the stratigraphic layering of a reservoir.

Figure 8A:
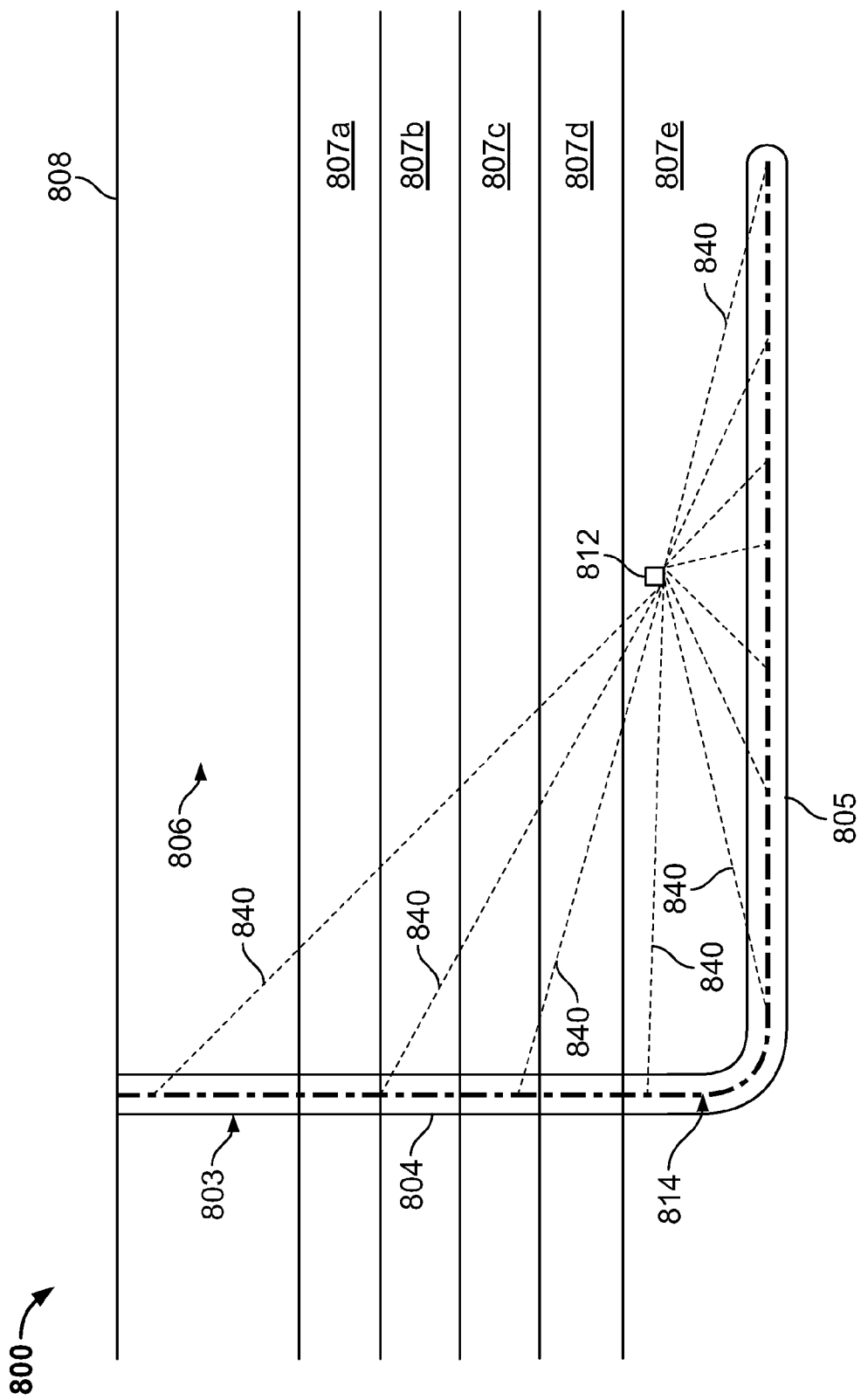
FIGS. 8A and 8B are schematic diagrams of an example well system.
Figure 8B:
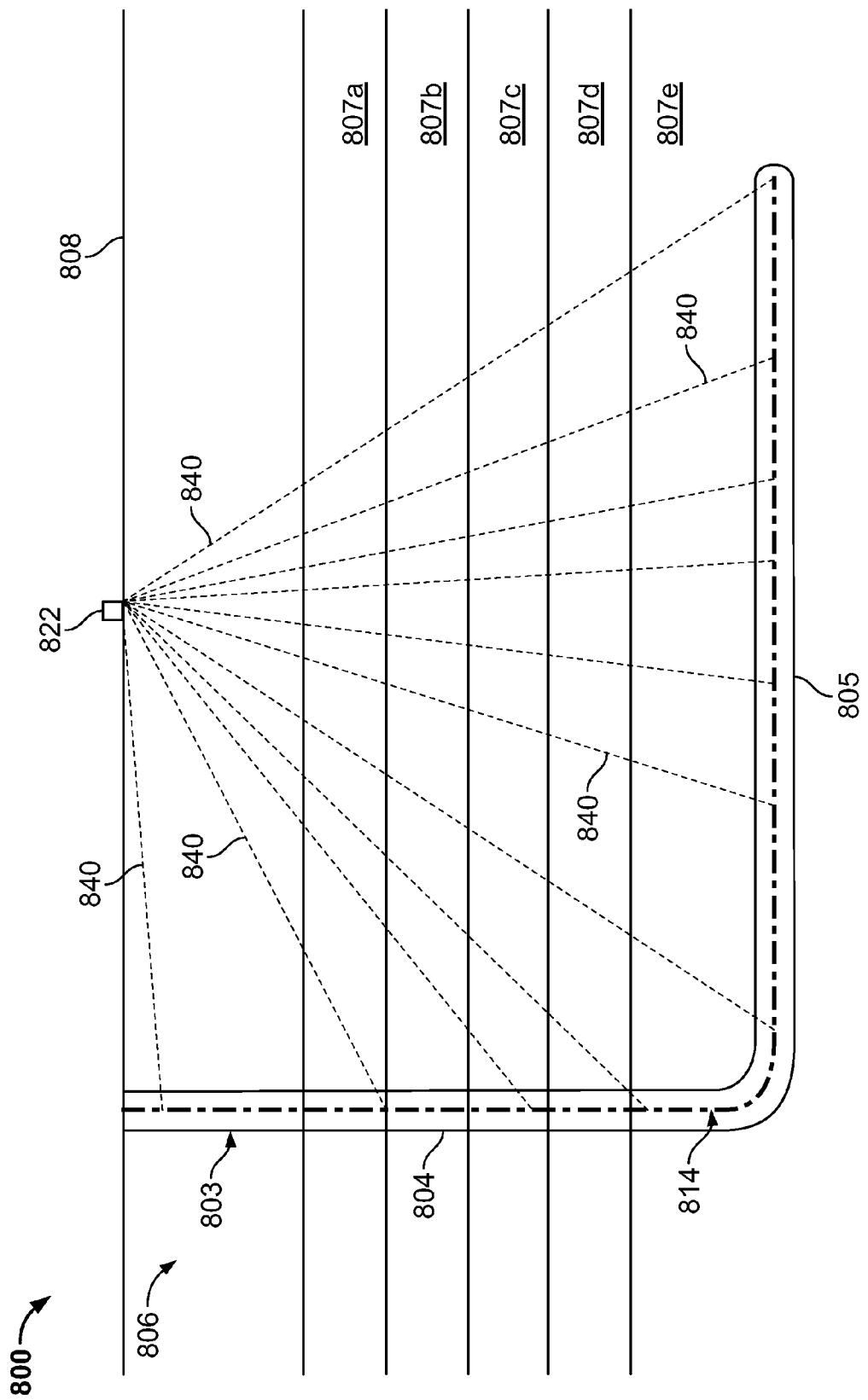

FIGS. 8A-8B are schematic diagrams of an example well system 800. The example well system 800 shown in FIGS. 8A and 8B can include some or all of the features of the well system 100 shown in FIG. 1, or the well system 800 can have additional or different features. As shown in FIGS. 8A and 8B, the well system 800 includes a wellbore 803 defined in a subterranean region 806 beneath the ground surface 808. The well system 800 can include additional wellbores or other features not shown in the figures, and the features of the well system 800 can be arranged as shown or in another manner.

The subterranean region 806 can include all or part of one or more subterranean formations or zones. The example subterranean region 806 shown in FIGS. 8A and 8B includes multiple subsurface layers 807*a*, 807*b*, 807*c*, 807*d*, 807*e*. The subsurface layers can include sedimentary layers, rock layers, sand layers, or combinations of these other types of subsurface layers. One or more of the subsurface layers can include all or part of a subterranean reservoir, which may or may not contain fluids, such as brine, oil, gas, etc. In the example shown, the wellbore 803 includes a horizontal wellbore section 805 that is defined in a reservoir layer 807*e*, and the wellbore 803 also includes a vertical wellbore section 804 penetrated through multiple other subsurface layers 807*a*, 807*b*, 807*c*, 807*d* above the reservoir layer 807*e*.

The example well system 800 includes a seismic profiling system arranged to obtain seismic data from the subterranean region 806. The seismic profiling system includes a seismic source system and a seismic sensor system. The seismic source system can include one or both of the example seismic sources 812, 822 shown in FIGS. 8A, 8B, respectively. The seismic source system can include, for example, electronically-driven vibrational systems, seismic air guns, explosive devices, perforating charges, and others. The example seismic source 812 shown in FIG. 8A resides in the subterranean region 806 beneath the ground surface. For example, the seismic source 812 in FIG. 8A may reside in a wellbore or another location. The example seismic source 822 shown in FIG. 8B resides at the ground surface 808 above the subterranean region 806. The seismic source system can include additional or different seismic sources in any of the subsurface layers, at the ground surface 808, or in another location.

The seismic sensor system includes a seismic sensor array 814. As shown in FIGS. 8A and 8B, the example seismic sensor array 814 includes sensor locations in both the vertical wellbore section 804 and the horizontal wellbore section 805. The seismic sensor array 814 can include a single array or multiple sub-arrays, and the seismic sensor locations can be distributed along all or part of the respective wellbore sections. In some cases, the seismic sensor locations are spaced apart, for example, at irregular or regular intervals along the vertical wellbore section 804 and the horizontal wellbore section 805. The seismic sensor system can include additional seismic sensors in other wellbores, other wellbore sections, or in other locations in the well system 800.

The seismic sensor system can collect seismic data and, in some instances, detect a response to the excitations generated by the seismic source system. In some instances, seismic responses (e.g., based on excitations generated by the seismic sources 812, 822, or other seismic sources) are detected by the seismic sensor array 814 in the vertical wellbore section 804, in the horizontal wellbore section 805, or in both wellbore sections. In FIGS. 8A and 8B, the lines 840 show examples of the paths traversed by the seismic waves propagating in the subterranean region 806 from the seismic sources 812, 822 to the seismic sensor array 814. In some cases, the seismic sensor array 814 detects seismic responses based on excitations generated by one or both of the seismic sources 812, 822. In some instances, the response data associated with one of the sources is used in combination with the response data associated with the other source, for example, to supplement or validate the analysis.

In some implementations of the example well system 800 shown in FIGS. 8A and 8B, acoustic sensors located along a horizontal section of a wellbore within a reservoir target are combined with vertical acoustic sensors along the vertical portion of the wellbore to obtain detailed information about the reservoir rock. The acoustic sensors in the horizontal and vertical sections can also provide information about the properties and layering within the overburden formations above the reservoir target.

In the example shown in FIG. 8A, the seismic source 812 generates seismic excitations in the reservoir layer 807*e*, and the seismic waves from the excitation propagate to the vertical wellbore section 804 and the horizontal wellbore section 805. In some cases, analysis of the seismic data collected from the seismic sensor array in both wellbore sections provides useful information on the subterranean region 806. Some of the seismic waves detected in the horizontal wellbore section 805 traverse only the reservoir layer 807*e*, and as a result, the seismic data may provide a higher degree of accuracy or spatial-resolution. For example, the seismic waves that propagate from the seismic source 812 to the horizontal wellbore section 805 may have less attenuation than seismic waves generated at another source (e.g., a more distant source or a source in another subsurface layer).

In the example shown in FIG. 8A, some of the seismic waves detected in the vertical wellbore section 804 traverse one or more of the subsurface layers 807*a*, 807*b*, 807*c*, 807*d* above the reservoir layer 807*e*, and as a result, the seismic data may provide information on one or more of the subsurface layers 807*a*, 807*b*, 807*c*, 807*d* above the reservoir layer 807*e*. For example, a seismic velocity profile or seismic image may indicate properties of one or more of the subsurface layers. In some of the subsurface layers, the seismic waves that propagate from the seismic source 812 to the vertical wellbore section 804 may have less attenuation than seismic waves generated at another source (e.g., a source at the surface, etc.).

In the example shown in FIG. 8B, the seismic source 822 generates seismic excitations at the ground surface 808, and the seismic waves from the excitation propagate to the vertical wellbore section 804 and the horizontal wellbore section 805. In some cases, analysis of the seismic data collected from the seismic sensor array in both wellbore sections provides useful information on the subterranean region 806. In some of the subsurface layers, the seismic waves that propagate from the seismic source 822 to the vertical wellbore section 804 may have less attenuation than seismic waves generated at another source, or the seismic response based on surface excitations may provide additional or different advantages.

In some implementations, the seismic profiling system includes a computing system that collects seismic data from the seismic source system and the seismic sensor system. The computing system can store, manipulate, or analyze the seismic data, and in some cases, analysis of the seismic data provides information on the reservoir layer 807*e* and one or more of the other subsurface layers above the reservoir layer. For example, the seismic data may be used to identify layer boundaries, geomechanical properties (e.g., pore pressures in the rock material, stresses on the rock material, mechanical properties of the rock material, etc.), and other attributes of one or more layers.

In some cases, the seismic data are used with other types of information (e.g., resistivity logging data, magnetic resonance logging data, microseismic data, etc.) to estimate properties of the subterranean region 806. For example, the seismic data may be used along with microseismic data to map the locations of fractures or discontinuities in the subterranean region 806.

In some instances, the seismic data are used to identify the location of the wellbore 803. The wellbore location can be identified with respect to the subsurface layer boundaries, with respect to faults or other wellbores in the subterranean region 806, with respect to the ground surface 808, or with respect to other reference locations. In some instances, the wellbore location is identified in terms of vertical and horizontal coordinates (e.g., coordinates for a series of points along the wellbore trajectory). The wellbore location can be identified with uncertainty bounds and other related information.

Figure 9A:
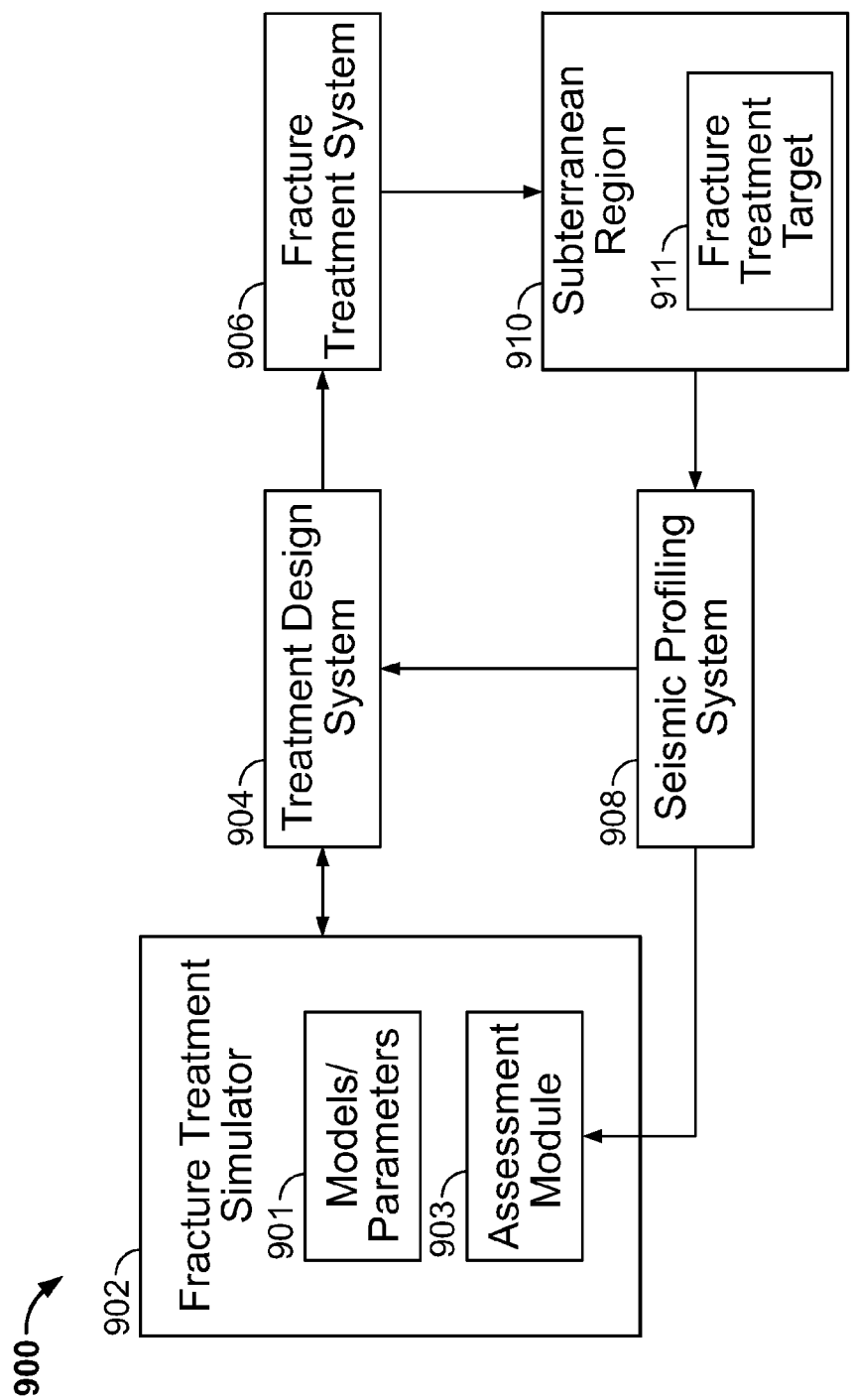
FIG. 9A is a schematic diagram showing example data flow in fracture treatment operations.

FIG. 9A is a schematic diagram showing an example data flow 900 in fracture treatment operations. The example data flow 900 shown in FIG. 9A includes a fracture treatment simulator 902, a treatment design system 904, a fracture treatment system 906, a seismic profiling system 908, and a subterranean region 910. Work and data flow in a fracture treatment operation can include additional or different systems or components, and the systems and components can operate as shown in FIG. 9A or in another manner. The systems shown in FIG. 9A can be located near each other, for example, at or near a well system associated with the subterranean region 910. In some cases, one or more of the systems or system components in FIG. 9A are located remotely from the other systems or components, for example, at a remote computing facility or control center.

In some implementations, some or all of the operations in the data flow 900 are executed in real time during a fracture treatment. An operation can be performed in real time (which encompasses real time and pseudo-real time), for example, by performing the operation in response to receiving data (e.g., from a sensor or monitoring system) without substantial delay. An operation can be performed in real time, for example, by performing the operation while monitoring for additional input data from the fracture treatment or other well system operations. Some real time operations can receive an input and produce an output during a fracture treatment or other well system operations; in some instances, the output is made available to a user or system within a time frame that allows the user or system to respond to the output, for example, by modifying the fracture treatment or other well system operations.

In some implementations, some or all of the operations in the data flow 900 are executed in a post-process manner, for example, after a fracture treatment has completed or after all data from a fracture treatment has been collected. Post-process analysis can be used, for example, in designing completion attributes, production processes, or subsequent fracture treatments for the subterranean region 910 or for another region.

The example fracture treatment simulator 902 is a computer-implemented simulation system that simulates fracture treatments. In some instances, the fracture treatment simulator 902 can be implemented by a computer system adapted to execute a fracture treatment simulation software program or another type of computer program. The example fracture treatment simulator 902 shown in FIG. 9A includes models and parameters 901 and an assessment module 903. A fracture treatment simulator can include additional or different features, and the features of a fracture treatment simulator can operate as shown in FIG. 9A or in another manner.

In some aspects, the fracture treatment simulator 902 obtains inputs describing the subterranean region 910 and a fracture treatment to be applied to the subterranean region 910, and the fracture treatment simulator 902 generates outputs describing predicted results of applying the fracture treatment. For example, the fracture treatment simulator 902 may use a fracture propagation model, a fluid flow model, or other models to simulate application of the fracture treatment. In some aspects, the fracture treatment simulator 902 assesses the models or parameters that were used to simulate the fracture treatment. For example, the fracture treatment simulator 902 may compare the simulated results against observed results, and calibrate or validate the models or parameters based on the comparison. In some instances, the observed results include geomechanical properties or fracture maps identified by the seismic profiling system 908.

The models and parameters 901 can include fracture propagation models, flow models, and other types of models used to simulate application of a fracture treatment. For example, the models may include governing equations and other information representing dynamical aspects of a fracture treatment. The models and parameters 901 can include geomechanical parameters (e.g., pore pressures in the rock material, stresses on the rock material, mechanical properties of the rock material, etc.), fracture network parameters (e.g., the fractures' locations, sizes, shapes, orientations, etc.), fluid parameters (e.g., fluid type, fluid density, etc.), and other types of parameters used to simulate application of a fracture treatment.

The assessment module 903 can include hardware, software, firmware, or a combination thereof, adapted to assess the models and parameters 901. The example assessment module 903 can assess the models and parameters 901 by comparing geomechanical parameters of the fracture treatment simulator to observed geomechanical properties identified by the seismic profiling system 908. For example, the seismic profiling system 908 may identify mechanical properties of the subterranean region 910 (e.g., Young's modulus, Poisson's ratio, etc.) based on seismic data, and the assessment module 903 may update corresponding parameters of the fracture treatment simulator 902 based on the mechanical properties.

The example assessment module 903 can assess the models and parameters 901 by comparing simulated fracture propagation to observed fracture propagation identified by the seismic profiling system 908. For example, the seismic profiling system 908 may identify fracture propagation generated by application of a fracture treatment to the subterranean region 910, and the assessment module 903 may update a fracture propagation model of the fracture treatment simulator to reflect the fracture propagation identified by the seismic profiling system 908.

The example treatment design system 904 can design a fracture treatment to be applied to the subterranean region 910. In some cases, the treatment design system 904 is implemented on a computer system or includes an automated or computer-implemented component. The treatment design system 904 can interact with the fracture treatment simulator 902 to determine parameters of the fracture treatment based on production objectives (e.g., profitability, production volume, production value, etc.), treatment objectives (e.g., stimulated reservoir volume, cost objectives, etc.), system constraints, etc. For example, the treatment design system 904 may provide a range of parameters to the fracture treatment simulator 902 and analyze the simulated results of the fracture treatment.

In some instances, the treatment design system 904 designs the fracture treatment based on information provided by the seismic profiling system 908. For example, the seismic profiling system 908 may identify geomechanical properties or fractures in the subterranean region based on seismic data, and the treatment design system 904 can design the fracture treatment based on such data. In some instances, the treatment design system 904 determines the attributes of a fracture treatment by comparing the geomechanical properties, fracture data, or other information against a database of pre-selected fracture treatment attributes. In some instances, the treatment design system 904 provides the geomechanical properties, fracture data, or other information as input to the fracture treatment simulator 902, and determines treatment attributes based on simulated results produced by the fracture treatment simulator 902.

In some implementations, the treatment design system 904 generates outputs that include a treatment plan, a pumping schedule, or other information describing one or more treatments to be applied to the subterranean region 910. In some cases, the treatment plan indicates parameters for each stage of a multi-stage fracturing treatment. For example, the treatment plan may specify injection locations, treatment fluids, proppant mixtures, injection rates, injection pressures, treatment duration, etc.

The example fracture treatment system 906 applies fracture treatments to a fracture treatment target region 911 in the subterranean region 910. For example, the fracture treatment system can include an injection control system, fluid tanks, fluid mixers, pumping systems, flow control devices, and various other hardware used to apply a fracture treatment to a subterranean region. In some instances, the fracture treatment system 906 applies the fracture treatment by injecting fluid into the subterranean region 910 through one or more directional wellbores in the subterranean region 910.

The example subterranean region 910 includes a fracture treatment target region 911. The fracture treatment target region 911 can include all or part of a subterranean reservoir or another type of subsurface formation. The subterranean region 910 can include one or more wellbores that are used for injecting fluids at high pressure to fracture treatment target region 911. As an example, the subterranean region 910 can be any of the subterranean regions shown in FIG. 1, 2A-2C, 3A-3F, 4A-4D, 5, 6A-6D, 7, or 8A-8B, and the fracture treatment target region 911 can include all or part of the regions of interest shown in those figures.

The example seismic profiling system 908 obtains seismic data from the subterranean region 910. The seismic profiling system 908 can include seismic sources and sensors installed in the wellbores in the subterranean region 910, at the ground surface above the subterranean region 910, or at other locations. The seismic profiling system 908 can include communication equipment, controllers, computing systems, and other components for collecting and analyzing the seismic data. The example seismic profiling system 908 may operate as shown in one or more of FIG. 1, 2A-2C, 3A-3F, 4A-4D, 5, 6A-6D, 7, or 8A-8B, or the seismic profiling system may operate in another manner. In some cases, the seismic profiling system 908 can operate on-demand at any point during a fracture treatment, and the acquired seismic data can be used to perform analysis in two or three spatial dimensions, to perform time-transient analysis, or other types of analysis.

In the example shown in FIG. 9A, the seismic profiling system 908 can analyze seismic data and provide the output to the treatment design system 904, the fracture treatment simulator 902, or both. In some cases, the seismic profiling system 908 provides outputs to other systems or components. The seismic profiling system 908 can analyze the seismic data, for example, by constructing a seismic velocity model and extracting information from the seismic velocity model. In some examples, the seismic data analysis includes calculating geomechanical properties of the fracture treatment target region 911, identifying fractures or fracture networks in the fracture treatment target region 911, or performing other types of analysis. In some cases, the seismic profiling system 908 identifies properties of the subterranean region 910 by analyzing seismic reflection data or other information.

In some aspects of operation, the example data flow 900 shown in FIG. 9A can be implemented as control flow for optimizing or otherwise improving a fracture treatment. The control flow can operate iteratively, for example, in real time during the fracture treatment, between stages or at other thresholds in the fracture treatment, or at a combination of these and other times. Some aspects of the control flow may be executed during application of the fracture treatment, before the fracture treatment begins, after the fracture treatment ends, or a combination of these.

In some examples, the seismic profiling system 908 collects initial seismic data and detects initial properties of the subterranean region 910 before application of the fracture treatment. The treatment design system 904 then designs a fracture treatment based on the initial properties detected by the seismic profiling system 908. The fracture treatment parameters are determined (e.g., selected, calculated, etc.) by the treatment design system 904 based on simulated results predicted by the fracture treatment simulator 902. The fracture treatment system 906 applies the fracture treatment to the subterranean region 910, and the seismic profiling system collects additional seismic data and detects properties of the subterranean region 910 for a second time point. Based on the detected properties of the subterranean region 910, the assessment module 903 assesses the models and parameters 901 that were used to design the fracture treatment. If the models and parameters 901 are validated based on the observed data, then the fracture treatment proceeds. If the models and parameters 901 are not validated based on the observed data, then the models and parameters 901 can be calibrated (or re-calibrated), and the treatment design system 904 can modify the fracture treatment based on the calibrated models and parameters 901.

The systems and processes represented in FIG. 9A can operate in another manner, for example, based on additional data and using additional system components. As an example, the fracture treatment simulator 902, the treatment design system 904, and other systems may operate based on seismic data, microseismic data, well logging data (e.g., resistivity logging data, magnetic resonance logging data, etc.), and other types of information. As another example, the treatment design system 904 may utilize additional or different simulators (e.g., reservoir simulator, etc.) in designing fracture treatments.

Figure 9B:
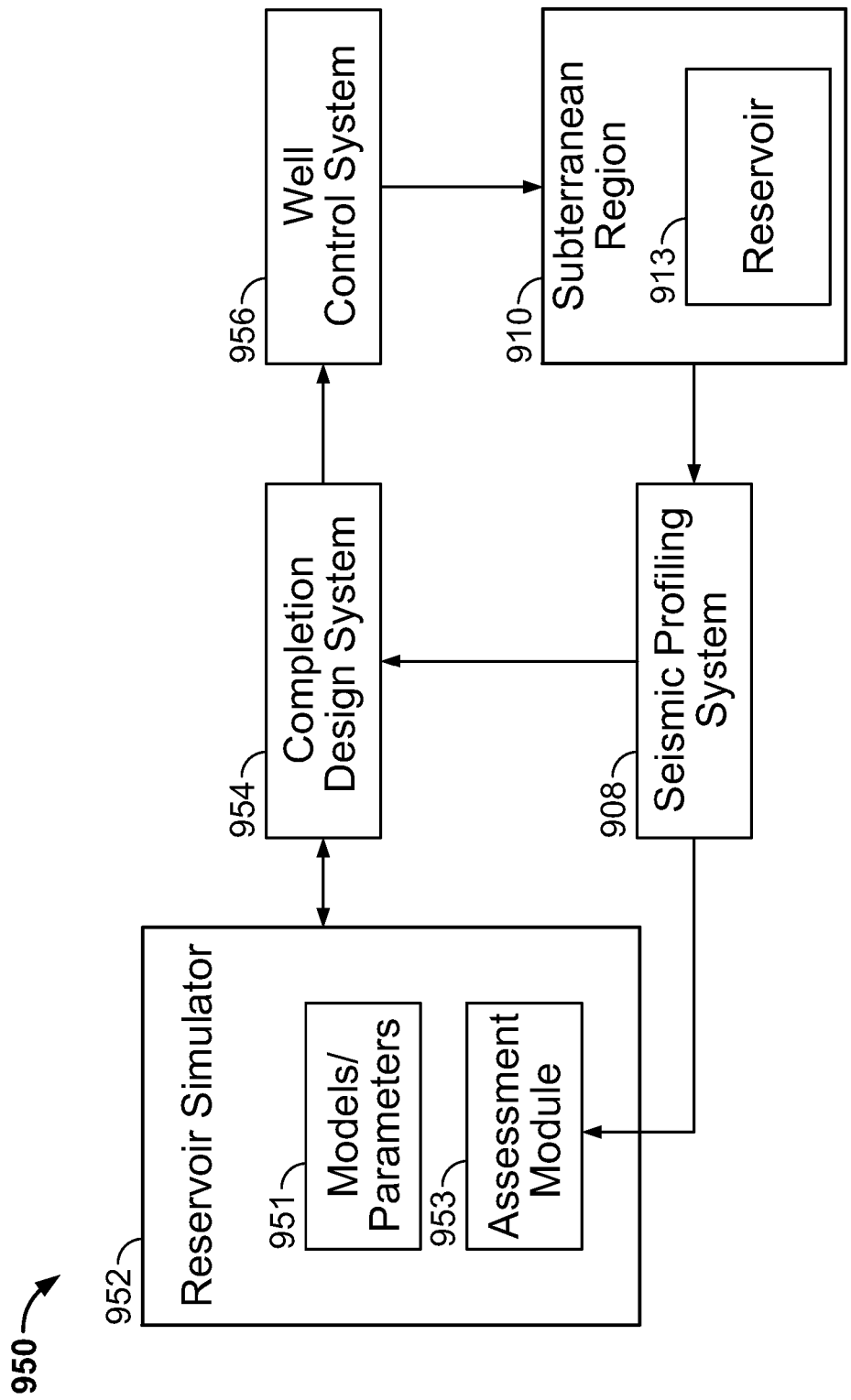
FIG. 9B is a schematic diagram showing example data flow in production operations.

FIG. 9B is a schematic diagram showing an example data flow 950 in production operations. The example data flow 950 shown in FIG. 9B includes the seismic profiling system 908 and the subterranean region 910 represented in FIG. 9A; the data flow 950 also includes a reservoir simulator 952, a completion design system 954, and a well control system 956. Work and data flow in production operations can include additional or different systems or components, and the systems and components can operate as shown in FIG. 9B or in another manner. The systems shown in FIG. 9B can be located near each other, for example, at or near a well system associated with the subterranean region 910. In some cases, one or more of the systems or system components in FIG. 9B are located remotely from the other systems or components, for example, at a remote computing facility or control center.

Some aspects of the example data flow 950 shown in FIG. 9B are similar to the data flow 900 shown in FIG. 9A. For example, FIG. 9B shows examples of how seismic profiling data can be collected, analyzed, and used in a well system. In some implementations, some or all of the operations in the data flow 950 are executed in real time during production. In some implementations, some or all of the operations in the data flow 950 are executed in a post-process manner, for example, after a production has completed or after all production data has been collected.

The example reservoir simulator 952 is a computer-implemented simulation system that simulates fluid flow in the reservoir 913. In some instances, the reservoir simulator 952 can be implemented by a computer system adapted to execute a reservoir simulation software program or another type of computer program. The example reservoir simulator 952 shown in FIG. 9B includes models and parameters 951 and an assessment module 953. A reservoir simulator can include additional or different features, and the features of a reservoir simulator can operate as shown in FIG. 9B or in another manner.

In some aspects, the reservoir simulator 952 obtains inputs describing the subterranean region 910 and completion attributes of a well system associated with the reservoir 913, and generates outputs describing predicted resource production from the reservoir 913. For example, the reservoir simulator 952 may use a fluid flow model, a conductivity model, a fracture model, a wellbore model, or other models to simulate production. In some aspects, the reservoir simulator 952 assesses the models or parameters that were used to simulate production. For example, the reservoir simulator 952 may compare the simulated results against observed results, and calibrate or validate the models or parameters based on the comparison. In some instances, the observed results include fluid volumes, fluid saturations, and other data detected by the seismic profiling system 908.

The models and parameters 951 can include fracture models, wellbore models, flow models, conductivity models, and other types of models used to simulate fluid flow in the reservoir 913. For example, the models may include governing equations and other information representing dynamical aspects of production. The models and parameters 951 can include rock parameters, fracture network parameters, conductivity layers, fluid parameters, and other types of parameters used to simulate fluid flow.

In some implementations, the reservoir simulator 952 simulates flow of hydrocarbon fluids from the subterranean region 910 into one or more wellbores based on a reservoir model defined by the models and parameters 951. The reservoir model represents the conditions for fluid flow in the reservoir 913. For example, the reservoir model may also include a fracture model that represents the conductivity and connectivity of fractures defined in the subterranean rock. In some fracture models, the fractures are represented as open fluid flow paths, and the fracture model may account for proppant or flow resistance within the fractures.

The reservoir model can also include a rock model that represents the effective permeability of the subterranean rock. The rock model can include multiple distinct cells that define conductivity layers of the reservoir 913, and the fracture conductivity in each cell can account for fracture intensity and other properties within a sub-volume of the reservoir 913. In some instances, each cell of the rock model represents the effective permeability of the rock between the dominant fractures in the reservoir 913. The effective permeability may account for the actual permeability of the rock, discontinuities that are not included in the fracture model, and other aspects of the rock. In some instances, the conductivity values for some or all of the cells in the reservoir model are computed based on seismic data or other information.

The assessment module 953 can include hardware, software, firmware, or a combination thereof, adapted to assess the models and parameters 951. The example assessment module 953 can assess the models and parameters 951 by comparing reservoir pressures predicted by the reservoir simulator 952 against observed reservoir pressures detected by the seismic profiling system 908. In some instances, the seismic profiling system 908 may identify changes in hydrocarbon saturation or changes in water saturation in the reservoir 913 during production, and the assessment module 903 may update a model of the reservoir simulator 952 to reflect the saturation identified by the seismic profiling system 908.

The example completion design system 954 can design a fracture treatment to be applied to the subterranean region 910. In some cases, the completion design system 954 is implemented on a computer system or includes automated or computer-implemented components. The completion design system 954 can interact with the reservoir simulator 952 to select or otherwise determine completion attributes or production operations based on production objectives (e.g., profitability, production volume, production value, etc.), completion objectives (e.g., cost objectives, etc.), system constraints, etc. For example, the completion design system 954 may provide a range of parameters to the reservoir simulator 952 and analyze the simulated resource production parameters.

In some instances, the completion design system 954 designs the completion attributes based on information provided by the seismic profiling system 908. For example, the seismic profiling system 908 may identify reservoir conductivity, reservoir pressure, or the location of a producing well in the subterranean region based on seismic data, and the completion design system 954 can design the completion based on such data. In some instances, the completion design system 954 determines the completion attributes by comparing the stratigraphic position of the wellbore against a database of completion attributes, and selecting one or more of the attributes from the database. In some instances, the completion design system 954 provides the wellbore position, reservoir conductivity, reservoir pressure, or other information as input to the reservoir simulator 952, and determines completion attributes based on simulated results produced by the reservoir simulator 952. In some implementations, the completion design system 954 determines completion and production attributes that include, for example, completion equipment (e.g., the type, configuration, or location of packers, inflow control devices, perforations, or other components), stimulation treatments (e.g., the type or timing or one or more injection treatments), time periods for producing one or more wells or wellbore stages, etc.

In some implementations, the completion design system 954 designs the completion attributes based on seismic data collected over the life of the well system. For example, the completion design system 954 may identify infill drilling opportunities, re-fracturing opportunities, and other opportunities for increasing or continuing production from the subterranean region 910. In some instances, such opportunities are identified based on seismic data indicating the location or rate of resource depletion in the reservoir 913, the locations of low or high reservoir pressure, changes in reservoir pressure over time, etc.

The example well control system 956 controls production of subterranean resources from the reservoir 913. For example, the well control system 956 may include completion strings, seals, flow control devices, fluid separators, pumps, and various other hardware used to produce oil, gas, or other resources. In some instances, the fracture treatment system 906 applies the fracture treatment by injecting fluid into the subterranean region 910 through one or more directional wellbores in the subterranean region 910.

The example subterranean region 910 includes a reservoir 913, which may include all or part of the fracture treatment target region 911 shown in FIG. 9A. The subterranean region 910 can include one or more wellbores that are used for producing fluids from the reservoir 913. The example seismic profiling system 908 can be the same seismic profiling system 908 shown in FIG. 9A, and the seismic profiling system 908 can operate in a similar manner during production operations. In some cases, the seismic profiling system 908 can be operated on-demand at any point during production, and the acquired seismic data can be used to perform analysis in two or three spatial dimensions, to perform time-transient analysis, or other types of analysis.

In the example shown in FIG. 9B, the seismic profiling system 908 can analyze seismic data and provide the output to the completion design system 954, the reservoir simulator 952, or both. In some cases, the seismic profiling system 908 provides outputs to other systems or components. The seismic profiling system 908 can analyze the seismic data, for example, by constructing a seismic velocity model and extracting information from the seismic velocity model. In some examples, the seismic data analysis includes calculating the conductivity or pressure of the reservoir 913, identifying the location of one or more wellbores, or performing other types of analysis. In some cases, the seismic profiling system 908 identifies properties of the subterranean region 910 by analyzing seismic reflection data or other information.

In some aspects of operation, the example data flow 950 shown in FIG. 9B can be implemented as control flow for optimizing or otherwise improving resource production. The control flow can operate iteratively, for example, in real time during production, between stages or at other thresholds in production, or at a combination of these and other times. Some aspects of the control flow may be executed during production, before production begins, after production ends, or a combination of these.

In some examples, the seismic profiling system 908 collects initial seismic data and detects initial properties of the subterranean region 910 before production. The completion design system 954 then determines (e.g., selects, calculates, etc.) completion attributes based on the initial properties detected by the seismic profiling system 908. The well control system 956 produces resources from the subterranean region 910, and the seismic profiling system 908 collects additional seismic data and identifies properties of the subterranean region 910 for a second time point. Based on the identified properties of the subterranean region 910, the assessment module 953 calibrates the models and parameters 951. The models and parameters 951 can then be used by the reservoir simulator 952, for example, to history-match production or for other types of simulation.

The systems and processes represented in FIG. 9B can operate in another manner, for example, based on additional data and using additional system components. As an example, the reservoir simulator 952, the completion design system 954, and other systems may operate based on seismic data, microseismic data, well logging data (e.g., resistivity logging data, magnetic resonance logging data, etc.), and other types of information.

Figure 10:
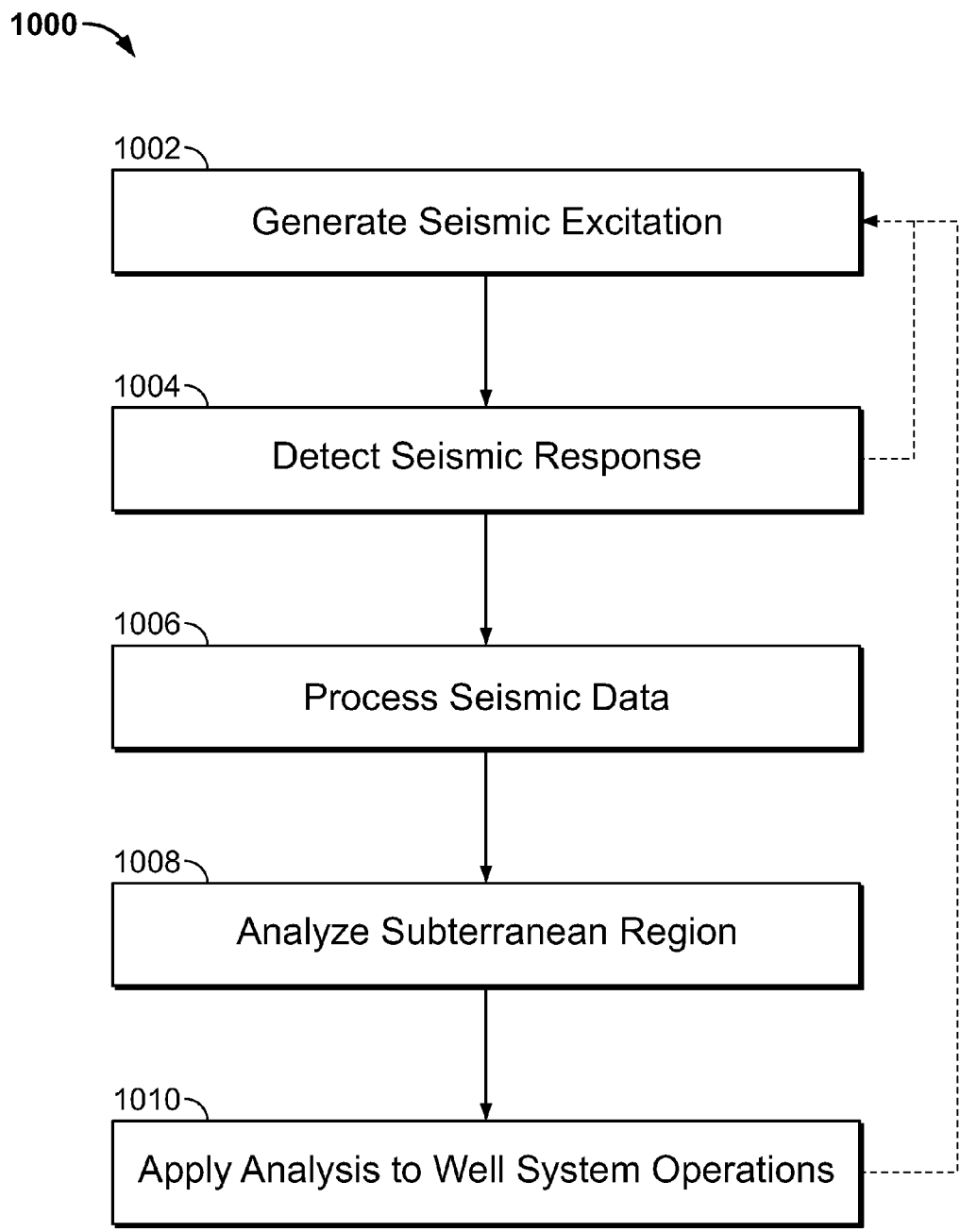
FIG. 10 is a flow chart showing an example technique for seismic profiling.

FIG. 10 is a flow chart showing an example seismic profiling process 1000. The example process 1000 can be performed in a well system, for example, in the example well system 100 shown in FIG. 1 or another type of well system. Aspects of the example process 1000 can be performed in a well system that includes one or more wellbores defined in the subterranean region. Some aspects of the example process 1000 can be performed by a computer system (e.g., the example computing system 116 shown in FIG. 1), which may or may not be associated with a well system.

In some implementations, the seismic profiling process 1000 can include aspect of the example data flows 900, 950 shown in FIG. 9A, 9B, respectively. The example process 1000 can include additional or different operations, and the operations can be performed in the order shown or in another order. In some instances, one or more of the operations in the process 1000 can be repeated or iterated, for example, for a specified number of times or until a terminating condition is reached. In some implementations, some or all of the operations in the process 1000 are executed in real time during well system operations. In some implementations, some or all of the operations in the process 1000 are executed in another manner (e.g., pre-process or post-process).

At 1002, a seismic excitation is generated. The seismic excitation can be generated by an active source, so as to produce a seismic response in a subterranean region. The seismic excitation can be generated, for example, by an active source at the ground surface above the subterranean region, by an active source in a wellbore below the ground surface, or a combination of these. In some instances, a seismic excitation is generated by an active source in a directional section of a wellbore. For example, the seismic excitation can be generated by a perforation gun, a seismic air gun, or another type of active seismic source in a wellbore.

In some instances, multiple seismic excitations are generated. For example, a time-sequence of seismic excitation can be generated in a wellbore at multiple distinct seismic source locations. Each seismic excitation in the time-sequence can be generated by the same subset of seismic sources, or the seismic excitations can be generated by multiple distinct subsets of seismic sources. A subset of seismic sources can include a single seismic source or multiple seismic sources. An example of a time-sequence of seismic excitation is shown in FIGS. 3A-3E. In that example, the time-sequence of seismic excitation are generated at a series of locations along the length of the directional section of the fracture treatment injection wellbore. In some cases, a time-sequence of seismic excitations are generated at a single seismic source location.

In some implementations, the seismic excitation is generated in connection with a fracture treatment of a subterranean region. For example, the seismic excitation can be generated in the vicinity of a fracture treatment target region before a fracture treatment, after a fracture treatment, or during a fracture treatment of the fracture treatment target region. Generating a seismic excitation in connection with the fracture treatment may include generating the seismic excitation in a fracture treatment injection wellbore, or in another type of wellbore that is near or adjacent to the fracture treatment target region.

In some cases, the seismic excitation is generated in connection with performing a multi-stage fracture treatment. For example, the multistage fracture treatment may be applied to a fracture treatment target region through multiple completion intervals in a fracture treatment injection wellbore, and each of the seismic excitations can be generated by perforating a wellbore wall at one or more locations in each of the respective completion intervals. FIGS. 3A-3F and 4A-4D show examples of seismic excitations generated in connection with a multi-stage fracture treatment.

In some implementations, the seismic excitation is generated in a subterranean region that includes multiple subsurface layers. Examples of subterranean regions that include multiple subsurface layers are shown in FIGS. 6A, 7A-7B, and 8A-8B. One or more of the subsurface layers may include a subterranean reservoir, an overburden, or other types of layers. The reservoir may contain hydrocarbon fluids, water, or other types of fluids. In some instances, the seismic excitation is generated in a direction wellbore section that is defined in the subterranean reservoir, or in a directional wellbore section that is defined in a subsurface layer residing above or below the subterranean reservoir.

At 1004, a seismic response is detected. The seismic response is associated with the seismic excitation generated at 1002. For example, the seismic response can include all or part of the subterranean region's response to the seismic excitation. In some cases, the seismic response includes the propagated portion of the seismic signal generated by the seismic excitation. In some cases, the seismic response includes a reflected portion of the seismic signal generated by the seismic excitation. The seismic response can include additional or different types of seismic signals.

At 1004, the seismic response is detected in the subterranean region. For example, the seismic response can be detected by one or more seismic sensors in a directional wellbore section in the subterranean region. In some instances, the seismic response is detected by an array of seismic sensors in a wellbore. The array can include multiple seismic sensor locations distributed along the length of a vertical wellbore section, a directional wellbore section, or both. In some cases, the array of seismic sensor locations is defined by fiber optic distributed acoustic array installed (e.g., permanently or temporarily) in a wellbore. The seismic sensors can include one or more geophones, one or more fiber optic distributed acoustic sensing arrays, or other types of seismic sensing apparatus.

The seismic response can be detected in the same wellbore in which the seismic excitation was generated, or the seismic response can be detected in a different wellbore. In some instances, the seismic excitation is generated in a first wellbore section and the seismic response is detected in a second wellbore section. For example, the first and second wellbore sections can be horizontal sections of two distinct wellbores. The first and second wellbore sections can be parallel or they can have different orientations within the subterranean region. The seismic response can be detected in the same subsurface layer in which the seismic excitation was generated, or the seismic response can be detected in a different subsurface layer. For example, the seismic response detected in a subterranean reservoir can be based on a seismic excitation generated in a subsurface layer that resides above or below the subterranean reservoir. Similarly, the seismic excitation generated in a subterranean reservoir can be detected in the subterranean reservoir or in another subsurface layer above or below the subterranean reservoir.

In some instances, multiple seismic responses are detected based on multiple seismic excitations. For example, a time-sequence of seismic responses can be detected based on a corresponding time-sequence of seismic excitations (e.g., as shown in FIGS. 3A-3F and 4A-4D, or in another manner). Each seismic response in the time-sequence can be detected by a single subset of seismic sensors, or the seismic responses can be detected by multiple distinct subsets of seismic sensors. A subset of seismic sensors can include a single seismic sensor or multiple seismic sensors. In some instances, multiple seismic responses are detected based on a single seismic excitation. For example, seismic responses can be detected at multiple locations in a single wellbore (e.g., as shown in FIGS. 3A-3F, or in another manner), or seismic responses can be detected in multiple distinct wellbores in the subterranean region (e.g., as shown in FIGS. 6A-6D, or in another manner).

At 1006, the seismic data are processed. The seismic data may include seismic response data representing the seismic response detected at 1004, seismic excitation data representing the seismic excitation generated at 1002, or a combination of these. The seismic data may include additional or different information, or the seismic data may include a subset of seismic response data, a subset of seismic excitation data, or a combination of these and other types of data.

Processing the seismic data may include, for example, storing, formatting, filtering, transmitting, or other types of processing applied to the seismic data. In some cases, the seismic data are processed by sensors or processors installed in a wellbore, by surface equipment or telemetry systems associated with one or more wellbores, by a computing system or database, or by another type of system.

In some implementations, processing the seismic data includes generating a seismic velocity profile or a seismic velocity model based on the seismic data. The seismic velocity model can be generated based on seismic response data and possibly additional information. In some cases, multiple seismic velocity models are generated. For example, seismic velocity models corresponding to each respective time point in a time-sequence can be generated. As another example, seismic velocity models corresponding to each respective wellbore (e.g., in an array of receiver wellbores) can be generated.

In some cases the seismic velocity models generated from seismic response data can include one-dimensional seismic velocity models, two-dimensional seismic velocity models, three-dimensional seismic velocity models, or four-dimensional seismic velocity models. Typically, a two-dimensional seismic velocity model represents the acoustic impedance of a subterranean region across two spatial dimensions (e.g., horizontal dimensions, horizontal and vertical dimensions, or other dimensions). Similarly, a three-dimensional seismic velocity model typically represents the acoustic impedance of a subterranean region across three spatial dimensions (e.g., horizontal and vertical dimensions). A four-dimensional seismic velocity model can include three spatial dimensions and a time dimension. As such, a four dimensional seismic velocity model can indicate changes in acoustic impedance or other properties over time.

Seismic velocity models can be generated for various geological regions, structures, or other aspects of the subterranean region. For example, in some instances, a seismic velocity model is generated for a fracture treatment target region in a subterranean region. The seismic velocity model for a fracture treatment target region can represent the acoustic properties of the region to which a fracture treatment has been applied, to which a fracture treatment will be applied, or to which a fracture treatment is currently being applied. As another example, in some instances, a seismic velocity model is generated for all or part of the subterranean reservoir or another subsurface layer.

In some instances, one or more seismic velocity models are generated for multiple subsurface layers. For example, a seismic velocity model can be generated for a subterranean reservoir, and other seismic velocity models can be generated for other subsurface layers above or below the subterranean reservoir. The seismic velocity models can be used to identify differences among various sub-regions within a subterranean.

The region represented by the seismic velocity model may include one or more wellbores, fractures, layer boundaries, or other features. In some cases, processing the seismic data includes identifying boundaries, discontinuities, or other structures within a subterranean region based on reflected and transmitted components of a seismic signal. For example, properties of a reflected seismic signal may indicate parameters of a discontinuity within the subterranean region. In some cases, seismic reflection data can be processed to identify the locations of fractures, faults, fissures, and other types of discontinuities.

At 1008, the subterranean region is analyzed based on the seismic data. The analysis can be performed based on all or part of the processed seismic data (e.g., obtained by processing the seismic data at 1006), the unprocessed seismic data (e.g., obtained by detecting the seismic response at 1004), or a combination of processed and unprocessed seismic data. For example, the seismic data may be analyzed by analyzing one or more seismic velocity models constructed from the seismic data, by analyzing one or more seismic reflection models constructed from the seismic data, by analyzing the magnitude, amplitude, phase, arrival time, or other properties of seismic responses, or by analyzing a combination of these or other seismic information.

Various types of analysis may be used to analyze the subterranean region. In some instances, analyzing the subterranean region includes identifying properties of the subterranean region. For example, geomechanical properties of the subterranean region can be identified from the seismic response data. The geomechanical properties may include, for example, mechanical properties (e.g., Young's modulus, Poisson's ratio) of subterranean rock, stress properties (e.g., stress magnitude, stress direction, stress anisotropy) of subterranean rock, pore pressure of subterranean rock, or others. In some cases, fluid properties of the subterranean region can be identified from the seismic response data. For example, fluid content, fracture conductivity, or other fluid properties of the subterranean region can be identified.

In some instances, analyzing the subterranean region includes identifying the locations of fractures, wellbores, subsurface layer boundaries, or other structures in the subterranean region. For example, the orientation of a wellbore can be identified relative to the orientation of a fracture, the orientation of a subsurface layer boundary, or the orientation of another structure in the subterranean region. As another example, the distance between a wellbore and a fracture, between a wellbore and a subsurface layer boundary, or between a wellbore and another structure in the subterranean region can be identified from the seismic data. In some cases, identifying the location of a wellbore can include identifying the bottom hole location, the vertical trajectory, the horizontal trajectory, the angle, the curvature, or other spatial parameters of a wellbore. The location of a wellbore can be identified in terms of spatial coordinates (e.g., latitude, longitude, and depth) or other terms.

In some cases, analyzing the subterranean region includes analyzing a fracture treatment of the subterranean region. For example, the analysis may include identifying fracture propagation induced by injecting fluid through a fracture treatment injection well, identifying changes in geomechanical properties induced by injecting fluid through the fracture treatment injection wellbore, identifying changes in fracture conductivity induced by injecting fluid through the fracture treatment injection wellbore, or identifying other types of information. Identifying fracture propagation induced by a fracture treatment can include identifying the growth of existing fractures, the initiation of new fractures, or other types of changes in the properties of fractures in the subterranean region. The fracture treatment can be analyzed in real time while the fracture treatment is being applied or after the fracture treatment has ended. For example, seismic data can be iteratively collected, processed, and analyzed during a fracture treatment as described, for example, with respect to FIGS. 3A-3F, 4A-4D and FIG. 9A.

In some implementations, an individual stage of the fracture treatment can be analyzed based on the seismic data. For example, seismic responses can be detected based on wellbore perforations performed before and after the individual stage of a multistage fracture treatment (e.g., as shown in FIGS. 3A-3F and 4A-4D, or in another manner). A comparison of the properties of the fracture treatment target region before and after the individual stage of the fracture treatment can indicate the effectiveness or ineffectiveness of the individual stage. For example, growth or initiation of new fractures, changes in fracture connectivity, changes in pore pressure, or other changes in the fracture treatment target region can indicate the effects of an individual stage (or multiple stages) of the fracture treatment.

In some instances, analyzing the subterranean region includes fracture mapping based on the seismic data. Fracture mapping can, in some instances, generate a map (e.g., 2D, 3D, or 4D map) of fractures in a subterranean region. The map can indicate the size, shape, and other properties of fractures in the subterranean region. In some instances, natural fractures, induced fractures, or a combination of natural and induced fractures can be identified by a fracture mapping process. In some instances, propped fractures (i.e., fractures that are held open by injected proppant material), un-propped fractures (i.e., fractures that are not substantially held open by proppant material), closed fractures, open fractures, or a combination of these and other types of fractures can be identified from the seismic data.

In some instances, a fracture treatment can be assessed based on the seismic data. For example, the effectiveness of a fracture treatment can be assessed based on the presence or absence of fracture growth in a fracture treatment target region, the presence or absence of changes in geomechanical properties, fluid properties, or other properties in a fracture treatment target region. In some cases, the fracture treatment is assessed by comparing predicted fracture growth (e.g., produced by a fracture simulator) against actual fracture grown identified from the seismic data. Assessing the fracture treatment may include comparing other types of treatment objectives (e.g., effective permeability, stimulated volume, etc.) against actual results of the fracture treatment. The seismic response data can be combined with other types of information (e.g., microseismic data, pressure history data, etc.) for the assessment.

In some instances, the location of a fracture treatment injection wellbore (or another type of wellbore) can be identified from the seismic data. For example, the location of the fracture treatment injection wellbore relative to a fracture, another wellbore, a stratigraphic layer boundary, or another structure in a subterranean region can be identified. In some instances, the location of the fracture treatment injection wellbore relative to one or more fractures or other structures in the subterranean region can be used to determine parameters for one or more stages of the fracture treatment to be applied through the fracture treatment injection wellbore. For example, a type or size of proppant material, a rate, pressure, or location of fluid injection, or other fracture treatment parameters can be determined from analysis of the seismic data.

In some cases, analyzing the subterranean region includes analyzing production of resources from the subterranean region. For example, changes in fluid pressure, hydrocarbon saturation, water saturation, or other types of changes in a subterranean reservoir can be identified from the seismic response data. The hydrocarbon saturation can indicate the fraction of pore space occupied by hydrocarbons, and the water saturation can indicate the fraction of pore space occupied by water. The changes can be identified, for example, based on a comparison of seismic responses collected at distinct time points in a time-sequence of seismic responses. Production can be analyzed in real time while the reservoir is being produced or after production has ended. For example, seismic data can be iteratively collected, processed, and analyzed during production as described, for example, with respect to FIG. 9B. In some instances, the changes in fluid pressure or fluid saturation are detected based on changes in seismic velocity models for different time points. The changes can be identified in another manner.

Changes (e.g., increases or decreases) in fluid saturation (e.g., hydrocarbon saturation, water saturation, etc.) may indicate regions of high production, regions of low production, or other types of information. In some cases, completion intervals or perforation clusters associated with a high or low rate of production can be identified based on seismic data. The changes in saturation may indicate the depletion of hydrocarbon resources in a portion of the subterranean reservoir. For example, depletion may be identified based on the rate at which hydrocarbon saturation decreases over time. Relatively small or slow changes in hydrocarbon saturation may indicate the presence of hydrocarbon fluids that were bypassed by a phase of production. For example, bypassed hydrocarbon fluids may be identified based on spatial or temporal variations in hydrocarbon saturation in the subterranean region. Changes in water saturation can indicate regions receiving treatment fluid or water encroachment during production. In some instances, high water saturation can be an indicator of hazardous conditions.

In some instances, resource production can be assessed based on the seismic data. For example, the effectiveness of a well design or completion design used for production can be assessed based on the presence or absence of bypassed fluids, the presence or absence of depleted regions, or other properties of the subterranean region identified from the seismic data. In some cases, production is assessed by comparing predicted production (e.g., from a reservoir simulator) against actual production. Assessing production may include comparing other types of production objectives (e.g., costs, rate of production, content of fluids produced, etc.) against actual production. The seismic response data can be combined with other types of information for the assessment.

In some cases, spatial variations in the fracture conductivity of the subterranean rock can be identified from the seismic response data. For example, the fracture conductivity of the subterranean rock can represent the effective permeability for the fractured rock between dominant fractures in the subterranean region. As such, the fracture conductivity can represent the ability of fluid to flow through the fractured rock; similarly, permeability can represent the ability of fluid to flow through an un-fractured rock matrix. In some cases, the spatial variations in fracture conductivity can be identified from spatial variations in the seismic velocity model. The spatial variations can be identified by other techniques.

In some cases, analyzing the subterranean region includes identifying fluid movement in the subterranean region based on the seismic response data. For example, movement of a fluid front can be identified based on a time-sequence of seismic responses. In some instances, movement of native reservoir fluid (e.g., oil, natural gas, brine, etc.) can be identified based on seismic response data. In some instances, movement of injected fluids (e.g., fracturing fluid, heated treatment fluid, acidizing treatment fluid, etc.) can be identified based on seismic response data.

The analysis of fluid movement in the subterranean region can be performed in real time during well system operations or at other times during the life of a well. For instance, movement of fracturing fluid in the fracture treatment target region can be identified in real time during a fracture treatment, or movement of hydrocarbon fluid in a subterranean reservoir can be identified in real time during production. Other types of fluids can be monitored in the subterranean region before, after, or during these and other types of well system operations.

At 1010, the analysis is applied to well system operations. For example, the analysis of the subterranean region performed at 1008 can be applied to treatment operations, drilling operations, production operations, or other types of operations in a well system. In some instances, the analysis is performed in real time during the well system operations, and the well system operations are then modified in real time based on the analysis. In some cases, the analysis from one subterranean region or well system is applied to another subterranean region or to another well system. As such, the analysis can generally be applied to any type of well system operations and at any time.

In some implementations, the analysis of the subterranean region is applied to drilling operations. For example, the seismic data can be collected and processed while a wellbore is being drilled in the subterranean region, and the drilling operations can be controlled based on information obtained by analyzing the seismic data. In some instances, the location of a wellbore being drilled is identified from seismic response data, and a drilling direction (for further drilling of the wellbore) is determined based on the identified location. The drilling direction can be determined in real time while drilling or at another time. For example, seismic data can be iteratively collected, processed, and analyzed while drilling as described with respect to FIG. 7A. In some cases, the analysis can be combined with other information (e.g., a well system survey, etc.) to determine drilling parameters for drilling a wellbore. The drilling parameters can be determined, for example, for the wellbore being drilled or for another wellbore that has not yet been initiated.

In some implementations, the analysis of the subterranean region is used to determine a completion design for a wellbore in the subterranean region. For example, the completion design can be determined based on observed fracture propagation (e.g., fracture initiation or growth), stratigraphic information, geomechanical properties, fracture parameters, and other types of information extracted from the seismic data. In some instances, the type of treatment (e.g., fracture treatment, heat treatment, acidizing treatment, stimulation treatment, etc.) to be applied to a wellbore is determined from seismic data. In some instances, a sequence of the treatments (i.e., the order and timing for applying multiple treatments) or a sequence of locations for the treatments (i.e., the order of completion intervals or stages, etc.) is determined based on information extracted from the seismic data. In some instances, a type of completion hardware (e.g., flow control devices, production tubing, packers, etc.) or a location for the completion hardware is determined based on information extracted from the seismic data.

In some instances, determining a completion design includes determining a spacing between neighboring wellbore perforation clusters, a spacing between neighboring packers or seals in a wellbore, a spacing between neighboring flow control devices, or other spacing parameters for completion hardware to be installed in the wellbore. In some cases, determining a completion design includes determining the size or location for one or more individual stages of the multistage fracture treatment. For example, the length-span and position of an individual stage can be determined based on the presence or absence of natural fractures or the presence or absence of high stress anisotropy in the fracture treatment target region. In some cases, the completion design is determined based on long-term or short-term production objectives for a particular wellbore or a well system. In some instances, the completion design is determined based on physical, economic, or other types of constraints for a wellbore or well system.

In some instances, the analysis of the subterranean region is applied to fracture stimulation operations. For example, the information identified from the seismic data can be used to assess a fracture propagation model used by a fracture treatment simulator. In some instances, the assessment validates the fracture propagation model. For example, the assessment can validate the fracture propagation model by identifying that the geomechanical properties, fracture properties, fluid properties, or a combination of these and other properties of the fracture treatment target region are well-represented by the existing fracture propagation model.

In some instances, the fracture propagation model is calibrated or otherwise modified based on the assessment. The fracture propagation model can be calibrated such that it models fracture propagation in the fracture treatment target region with better accuracy. For example, the geomechanical properties, fracture properties, fluid properties and other properties of the fracture treatment target region may not be well-represented by the parameters of the un-calibrated fracture propagation model, and the calibrating the parameters may cause the fracture propagation model to better-represent the subterranean region.

In some implementations, the fracture propagation model is assessed and calibrated in real time during the fracture treatment. In some cases, the fracture propagation model is calibrated in real time based on geomechanical properties of subterranean rock identified from seismic data, based on the locations or parameters of fractures in the subterranean region identified from the seismic data, or based on a combination of these and other types of information.

In some instances, the calibration can be performed based on real time simulations. For example, a computer system can iteratively assess the fracture propagation model and recalibrate the fracture propagation based on the analysis of new seismic response data received over time (e.g., continually, periodically, intermittently) during the fracture treatment. The computer system can compare the actual fracture propagation observed in the fracture treatment target region against the simulated fracture propagation predicted by a fracture simulation software program. Based on the comparison, the fracture propagation model can be modified, for example, if the actual fracture propagation and the simulated fracture propagation do not match. Similarly, the computer system can compare the actual changes in geomechanical properties observed in the fracture treatment target region against the simulated changes in geomechanical properties predicted by the fracture simulation software program. Based on the comparison, the fracture propagation model can be modified, for example, if the actual geomechanical changes do not match the simulated you mechanical changes.

In some cases, the analysis of the subterranean region is applied to designing a fracture treatment. For example, the fracture treatment for a fracture treatment target region can be designed based on geomechanical properties of the subterranean region identified from seismic response data. As another example, the fracture treatment for a fracture treatment target region can be designed based on simulations of a fracture treatment using a calibrated fracture propagation model, where the fracture propagation model has been calibrated based on the seismic response data. In some instances, the fracture treatment is designed in advance, for example, before the fracture treatment has been initiated. In some instances the fracture treatment is designed (e.g., modified, updated, etc.) in real time while the fracture treatment is being applied to the fracture treatment target region.

In some implementations, the analysis of the subterranean region is used to calibrate a reservoir model for reservoir simulations. For example, the fracture conductivity of a subterranean reservoir identified from seismic data can be used to calibrate the reservoir model, and the reservoir model can be used in a reservoir simulation to simulate the flow of fluids in the subterranean reservoir. As another example, the locations and other properties of fractures in the subterranean reservoir can be used to calibrate the reservoir model.

In some instances, the calibrated reservoir model is used for production history matching. For example, a reservoir simulator can use the reservoir model to simulate production from the subterranean reservoir, and the simulated production can be compared against actual production. If the simulated production matches the actual production, the reservoir model can be validated. If the simulated production and the actual production do not match, the reservoir model or other parameters of a reservoir simulator can be calibrated to improve history matching. For example, the conductivity layers of the reservoir model, the fracture parameters of the reservoir model, or other parameters can be modified to better-represent the production parameters of a subterranean reservoir.

In some instances, production is simulated in real time during production operations. The real time reservoir simulations can be used to analyze or assess production. For example, reservoir simulations can be used to identify depleted regions, bypassed regions, high-producing regions, low-producing regions, or other types of regions within a subterranean reservoir. In some instances, a subsequent production phase can be designed based on the simulations. For example, the subsequent production phase can include additional or different wellbores, additional or different completion parameters, additional or different treatments, or other types of operations designed to access bypassed or otherwise un-accessed hydrocarbon fluids in the reservoir.

Some of the subject matter and operations described in this specification can be implemented in digital electronic circuitry, or in computer software, firmware, or hardware, including the structures disclosed in this specification and their structural equivalents, or in combinations of one or more of them. Some of the subject matter described in this specification can be implemented as one or more computer programs, i.e., one or more modules of computer program instructions, encoded on a computer storage medium for execution by, or to control the operation of, data-processing apparatus. A computer storage medium can be, or can be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate physical components or media (e.g., multiple CDs, disks, or other storage devices).

The term "data-processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them.

A computer program (also known as a program, software, software application, script, or code) can be written in any form of programming language, including compiled or interpreted languages, declarative or procedural languages. A computer program may, but need not, correspond to a file in a file system. A program can be stored in a portion of a file that holds other programs or data (e.g., one or more scripts stored in a markup language document), in a single file dedicated to the program, or in multiple coordinated files (e.g., files that store one or more modules, sub programs, or portions of code). A computer program can be deployed to be executed on one computer or on multiple computers that are located at one site or distributed across multiple sites and interconnected by a communication network.

Some of the processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and processors of any kind of digital computer. Generally, a processor will receive instructions and data from a read-only memory or a random-access memory or both. A computer can include a processor that performs actions in accordance with instructions, and one or more memory devices that store the instructions and data. A computer may also include, or be operatively coupled to receive data from or transfer data to, or both, one or more mass storage devices for storing data, e.g., magnetic disks, magneto optical disks, or optical disks. However, a computer need not have such devices. Devices suitable for storing computer program instructions and data include all forms of non-volatile memory, media and memory devices, including by way of example semiconductor memory devices (e.g., EPROM, EEPROM, flash memory devices, and others), magnetic disks (e.g., internal hard disks, removable disks, and others), magneto optical disks, and CD ROM and DVD-ROM disks. In some cases, the processor and the memory can be supplemented by, or incorporated in, special purpose logic circuitry.

To provide for interaction with a user, operations can be implemented on a computer having a display device (e.g., a monitor, or another type of display device) for displaying information to the user and a keyboard and a pointing device (e.g., a mouse, a trackball, a tablet, a touch sensitive screen, or another type of pointing device) by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

A computer system may include a single computing device, or multiple computers that operate in proximity or generally remote from each other and typically interact through a communication network. Examples of communication networks include a local area network ("LAN") and a wide area network ("WAN"), an inter-network (e.g., the Internet), a network comprising a satellite link, and peer-to-peer networks (e.g., ad hoc peer-to-peer networks). A relationship of client and server may arise by virtue of computer programs running on the respective computers and having a client-server relationship to each other.

While this specification contains many details, these should not be construed as limitations on the scope of what may be claimed, but rather as descriptions of features specific to particular examples. Certain features that are described in this specification in the context of separate implementations can also be combined. Conversely, various features that are described in the context of a single implementation can also be implemented in multiple embodiments separately or in any suitable sub-combination.

A number of examples have been described. Various modifications can be made without departing from the scope of the present disclosure. Accordingly, other embodiments are within the scope of the following claims.

What is claimed is:

1. A seismic analysis method comprising:
receiving seismic response data for a seismic response associated with a seismic excitation in a subterranean region, the seismic excitation generated in a first directional wellbore section in the subterranean region, the seismic response detected in a second directional wellbore section in the subterranean region; and
identifying, by operation of a computer system, an amount of change in geomechanical properties of subterranean rock in a fracture treatment target region in the subterranean region based on the seismic response data, wherein the seismic data correspond to seismic responses detected before and after a fracture treatment in the fracture treatment region.

2. The method of claim 1, wherein identifying geomechanical properties comprises computing at least one of:
Young's modulus of the subterranean rock; or
Poisson's ratio of the subterranean rock.

3. The method of claim 1, wherein identifying geomechanical properties comprises computing at least one of:
a magnitude of stress in the subterranean rock;
a direction of stress in the subterranean rock; or
a stress anisotropy in the subterranean rock.

4. The method of claim 1, wherein identifying geomechanical properties comprises computing pore pressure of the subterranean rock.

5. The method of claim 1, comprising:
generating a seismic velocity model for the fracture treatment target region based on the seismic response data; and
identifying the geomechanical properties based on the seismic velocity model.

6. The method of claim 1, wherein the seismic response data correspond to a seismic response detected before a fracture treatment of the subterranean region, and the method further comprises designing the fracture treatment based on the geomechanical properties.

7. The method of claim 6, wherein designing the fracture treatment comprises:
calibrating a fracture propagation model based on the geomechanical properties;
simulating the fracture treatment using the calibrated fracture propagation model.

8. The method of claim 1, wherein the seismic response data correspond to a seismic response detected after a fracture treatment of the subterranean region, and the method further comprises assessing the fracture treatment based on the geomechanical properties.

9. The method of claim 1, wherein the seismic response data correspond to a seismic response detected after a fracture treatment of the subterranean region, and the method further comprises assessing a fracture propagation model based on the geomechanical properties.

10. The method of claim 1, comprising, in real time during a fracture treatment of the subterranean region, identifying geomechanical properties of the subterranean rock based on the seismic response data.

11. The method of claim 10, further comprising, in real time during the fracture treatment, assessing the fracture treatment based on the identified geomechanical properties.

12. The method of claim 11, further comprising, in real time during the fracture treatment, modifying the fracture treatment based on the assessment.

13. The method of claim 1, wherein the first and second directional wellbores deviate from vertical.

14. A computing system comprising:
data processing apparatus; and
memory storing computer-readable instructions that, when executed by the data processing apparatus, cause the data processing apparatus to perform operations comprising:
receiving seismic response data for a seismic response associated with a seismic excitation in a subterranean region, the seismic excitation generated in a first directional wellbore section in the subterranean region, the seismic response detected in a second directional wellbore section in the subterranean region; and
identifying an amount of change in geomechanical properties of subterranean rock in a fracture treatment target region in the subterranean region based on the seismic response data, wherein the seismic data correspond to seismic responses detected before and after a fracture treatment in the fracture treatment region.

15. The system of claim 14, wherein at least one of the first directional wellbore section or the second directional wellbore section is defined in a subterranean reservoir comprising at least a portion of the fracture treatment target region.

16. The system of claim 14, wherein identifying geomechanical properties comprises computing at least one of:
Young's modulus of the subterranean rock; or
Poisson's ratio of the subterranean rock.

17. The system of claim 14, wherein identifying geomechanical properties comprises computing at least one of:
a magnitude of stress in the subterranean rock;
a direction of stress in the subterranean rock; or
a stress anisotropy in the subterranean rock.

18. The system of claim 14, wherein identifying geomechanical properties comprises computing pore pressure of the subterranean rock.

19. The system of claim 14, the operations further comprising:
generating a seismic velocity model for the fracture treatment target region based on the seismic response data; and
identify the geomechanical properties based on the seismic velocity model.

20. The system of claim 14, wherein the first and second directional wellbores deviate from vertical.

21. A non-transitory computer-readable medium storing instructions that, when executed by data processing apparatus, cause the data processing apparatus to perform operations comprising:
receiving seismic response data for a seismic response associated with a seismic excitation in a subterranean region, the seismic excitation generated in a first directional wellbore section in the subterranean region, the seismic response detected in a second directional wellbore section in the subterranean region; and
identifying an amount of change in geomechanical properties of subterranean rock in a fracture treatment target region in the subterranean region based on the seismic response data, wherein the seismic data correspond to seismic responses detected before and after a fracture treatment in the fracture treatment region.

22. The computer-readable medium of claim 21, wherein the seismic response data correspond to a seismic response detected before a fracture treatment of the subterranean region, and the operations further comprise designing the fracture treatment based on the geomechanical properties.

23. The computer-readable medium of claim 21, wherein the seismic response data correspond to a seismic response detected after a fracture treatment of the subterranean region, and the operations further comprise assessing the fracture treatment based on the geomechanical properties.

24. The computer-readable medium of claim 21, the operations comprising, in real time during a fracture treatment of the fracture treatment target region, identifying geomechanical properties of the subterranean rock based on the seismic response data.

* * * * *